US012582026B2

(12) United States Patent
Copeland, Jr. et al.

(10) Patent No.: US 12,582,026 B2
(45) Date of Patent: *Mar. 24, 2026

(54) AUTONOMOUS ROBOTIC SYSTEM AND METHOD FOR CONTROLLING DISEASE INCIDENCE IN A TARGET C4 TURF GRASS AREA

(71) Applicant: SS Turf Technologies, LLC, Orangeburg, SC (US)

(72) Inventors: Benjamin Copeland, Jr., Fort Valley, GA (US); Nicholas Sagnella, Charlotte, NC (US)

(73) Assignee: SS Turf Technologies, LLC, Orangeburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,420

(22) Filed: May 2, 2024

(65) Prior Publication Data

US 2024/0276910 A1     Aug. 22, 2024

Related U.S. Application Data

(63) Continuation of application No. 18/373,148, filed on Sep. 26, 2023, now Pat. No. 12,048,268, which is a
(Continued)

(51) Int. Cl.
*A01D 34/00*          (2006.01)
*A01D 101/00*          (2006.01)
(Continued)

(52) U.S. Cl.
CPC ........... *A01D 34/008* (2013.01); *A01G 7/045* (2013.01); *G05D 1/0219* (2013.01);
(Continued)

(58) Field of Classification Search
CPC .... A01D 34/008; A01D 2101/00; G05D 1/65; G05D 1/648; G05D 1/248; G05D 1/0219;
(Continued)

(56) References Cited

U.S. PATENT DOCUMENTS

2015/0322452 A1* 11/2015 Wang ................ C12N 15/8216
800/290

FOREIGN PATENT DOCUMENTS

CN          105981594 A  * 10/2016
WO     WO-2019125809 A1 *  6/2019

OTHER PUBLICATIONS

CN-105981594-A (Wang et al. ) (Oct. 5, 2016) (Year: 2016).*
The parent U.S. Appl. No. 18/373,148 and U.S. Appl. No. 17/235,170 and all prior art cited in the prosecutions thereof.

* cited by examiner

*Primary Examiner* — Phutthiwat Wongwian
(74) *Attorney, Agent, or Firm* — Smith Tempel Blaha LLC; Matthew T. Hoots

(57) ABSTRACT

A method and system for controlling disease incidence of a turfgrass in a target area, includes: providing an autobot capable of automatically applying a UVC light treatment to the target grass area, wherein the target grass area comprises C4 turfgrass. The method and system includes coupling a UVC light subsystem to the autobot such that the UVC light subsystem is suspended above the C4 turfgrass within the target grass within a first predetermined range. Next, UVC light is generated by the UVC light subsystem with a wavelength within a second predetermined range. Subsequently, the UVC light is emitted from the UVC light subsystem to the C4 turfgrass at an intensity within a third predetermined range. And the UVC light is moved across the C4 turfgrass within the target grass area using the autobot at night at a speed within a fourth predetermined range.

17 Claims, 33 Drawing Sheets

Related U.S. Application Data continuation of application No. 17/235,170, filed on
Apr. 20, 2021, now Pat. No. 11,805,726.

(51) Int. Cl.
    *A01G 7/04*            (2006.01)
    *G05D 1/00*            (2024.01)
    *G05D 1/248*          (2024.01)
    *G05D 1/648*          (2024.01)
    *G05D 1/65*            (2024.01)
    *H04W 4/021*         (2018.01)

(52) U.S. Cl.
    CPC ......... *G05D 1/0223* (2013.01); *G05D 1/0278*
             (2013.01); *G05D 1/248* (2024.01); *G05D*
       *1/648* (2024.01); *G05D 1/65* (2024.01); *H04W*
           *4/021* (2013.01); *A01D 2101/00* (2013.01)

(58) Field of Classification Search
    CPC .... G05D 1/0223; G05D 1/0278; A01G 7/045;
                                    H04W 4/021
    USPC ...................................................... 56/10.2 A
    See application file for complete search history.

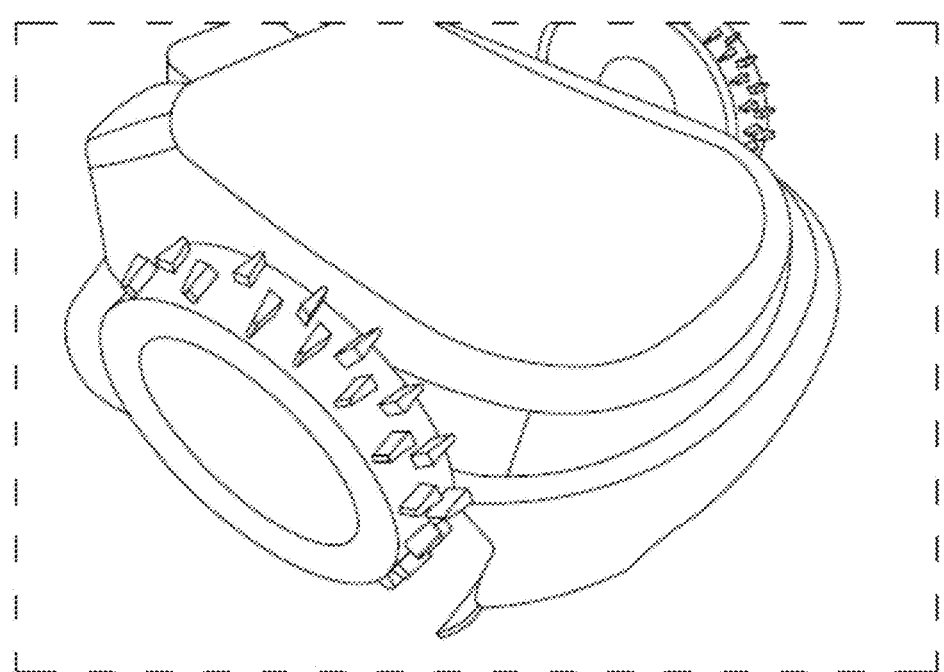
*FIG. 5*

700

106

106

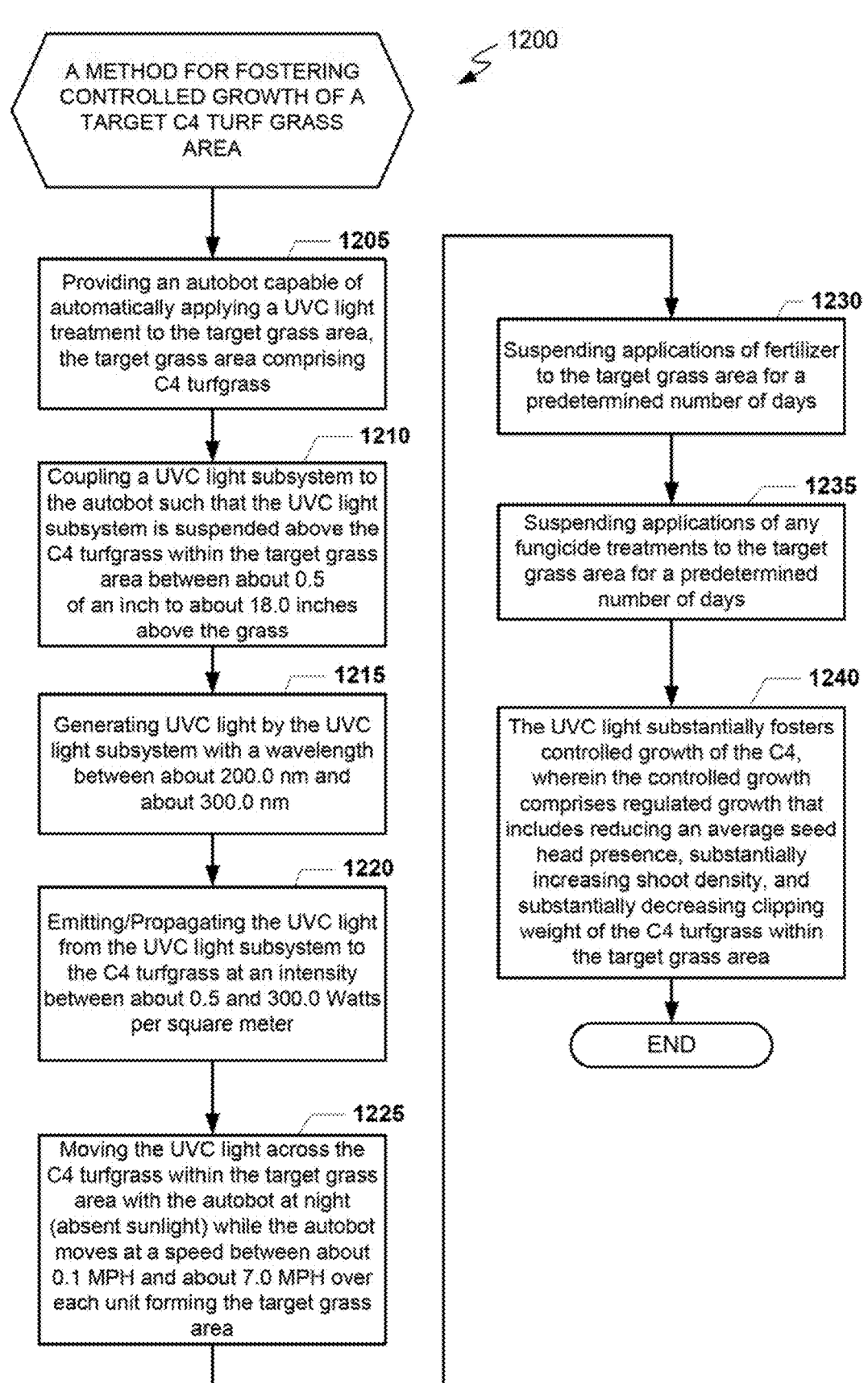

1200

A METHOD FOR FOSTERING CONTROLLED GROWTH OF A TARGET C4 TURF GRASS AREA

1205

Providing an autobot capable of automatically applying a UVC light treatment to the target grass area, the target grass area comprising C4 turfgrass

1210

Coupling a UVC light subsystem to the autobot such that the UVC light subsystem is suspended above the C4 turfgrass within the target grass area between about 0.5 of an inch to about 18.0 inches above the grass

1215

Generating UVC light by the UVC light subsystem with a wavelength between about 200.0 nm and about 300.0 nm

1220

Emitting/Propagating the UVC light from the UVC light subsystem to the C4 turfgrass at an intensity between about 0.5 and 300.0 Watts per square meter

1225

Moving the UVC light across the C4 turfgrass within the target grass area with the autobot at night (absent sunlight) while the autobot moves at a speed between about 0.1 MPH and about 7.0 MPH over each unit forming the target grass area

1230

Suspending applications of fertilizer to the target grass area for a predetermined number of days

1235

Suspending applications of any fungicide treatments to the target grass area for a predetermined number of days

1240

The UVC light substantially fosters controlled growth of the C4, wherein the controlled growth comprises regulated growth that includes reducing an average seed head presence, substantially increasing shoot density, and substantially decreasing clipping weight of the C4 turfgrass within the target grass area

END

FIG. 12

2020 Uvc Field Experiment, SeaStar seashore paspalum research green, UGA Griffin Campus, Grif Decode : Date to days after treatment initiation UVC treatments were nightly from May 4, 2020 until Sept. 9, 2020

| Date | Days after treatments initiated |
|---|---|
| 5.4.20 | 0 |
| 5.12.20 | 8 |
| 5.21.20 | 17 |
| 5.28.20 | 22 |
| 6.4.2 | 31 |
| 6.11.20 | 38 |
| 6.16.20 | 43 |
| 7.9.20 | 66 |
| 7.17.20 | 74 |
| 7.24.20 | 81 |
| 7.30.20 | 87 |
| 8.6.20 | 94 |
| 8.14.20 | 102 |
| 8.21.20 | 109 |
| 8.28.20 | 116 |
| 9.4.20 | 123 |
| 9.11.20 | 130 |
| 9.18.20 | 137 |
| 10.1.20 | 150 |
| 10.8.20 | 157 |
| 10.15.20 | 164 |
| 10.23.20 | 172 |
| 10.29.20 | 178 |

Seashore Paspalum Surface Firmness (inches)

GRAPH 18

GRAPH 19

GRAPH 27
Average increase in mycelial diameter (%) after 2 treatments of 5min and 10min every 24h at room temperature GRAPH 28
Average increase in mycelial diameter (%) after 2 treatments of 2min, 4min and 6min every 24h at room temperature

GRAPH 29
Average increase in mycelial diameter (%) after 2 treatments of 2min every 24h at nighttime at room temperature

GRAPH 30
Average increase in mycelial diameter (%) after 6 treatments of 2min every 24h at nighttime at 4C

Control          5min          10min

PHOTO A
Aspect after 3days of treatments of 5min and 10min
every 24h at room temperature - Test 3

Control        2min        4min        6min

PHOTO B
Aspect after 3 days of treatments of 2min, 4min, and 6min
every 24h at room temperature - Test 4

Control                                    2min

PHOTO C
Aspect after 8 days of treatments of 2min every
24h in the night-time at room temperature
- Test 5

Control                                    2min

PHOTO D
Aspect after 8 days of treatments of 2min every 24h
in the night-time at room temperature - Test 5

Control          1min          2min

PHOTO E
Aspect of isolates from Test 2 after 8 days of treatments of
1min and 2min at room temperature with no treatment -
Test 2

Control          5min          10min

PHOTO F
Aspect of isolates from Test 3 after 14 days of
treatments of 5min and 10min at room temperature with
no treatment - Test 3

GRAPH 34
Evolution of the mycelial dimeter (cm) at room temperature with no treatment during 4 days after the end of the treatments - Test 9

GRAPH 35
UV-C light intensity for different times of exposure

GRAPH 36
UV-C light intensity for different distances from the LED lamps

AUTONOMOUS ROBOTIC SYSTEM AND METHOD FOR CONTROLLING DISEASE INCIDENCE IN A TARGET C4 TURF GRASS AREA

TECHNICAL FIELD

The present invention relates to an autonomous robot, in particular to an autonomous robot which fosters controlled growth of warm season C4 turfgrass.

BACKGROUND

Ultraviolet ("UV") light may be used to remove or eliminate microorganisms, pathogens, algae, and fungi in various environmental applications. Moreover, UV light treatments are incorporated in air purification, water purification, aquarium and pond maintenance, laboratory hygiene and food and beverage protection systems known in the art.

Generally, for systems known in the prior art, UV treatment is performed inside a specialized UV exposure chamber to eliminate microorganisms in air and water. Embodiments of the solution proposed in this specification, however, recognize that the usage of UV treatment for an outdoor environment, such as a grass field, can be an efficient and safer alternative to other treatment methods, particularly chemical-based treatment methods, because UV treatment does not produce any residual chemical or radiation in the air or water and is harmless to untargeted organisms and plants.

Another problem, besides pathogens and microorganisms, faced by turf growers is how quickly turf may grow early in its growing season once warm season turfgrass has exited its dormant state. Usually, warm season turfgrass growth accelerates very quickly once the turfgrass has exited its dormant state which is usually attributed to outdoor temperatures staying at a certain threshold for a period of days (i.e. at a temperature of at least 64 F for three or more days).

At the beginning of a growing season (i.e. in the first month of several months of growth), warm season turfgrass may require mowing every seven days for the first month, and then every ten days for the second month. This frequency of mowing can become challenging when large surface areas of warm season turfgrass are being maintained.

What is needed in the art is a method and system which may substantially control the growth of turfgrass such that a slope tracking a growth rate of the turfgrass is substantially decreased.

SUMMARY

The present solution cures and solves technical problems existing in the prior art. In response to these problems, the present solution provides an autonomous robotic method and system for substantially fostering controlled growth of a target warm season C4 turfgrass area, that comprises: providing an autobot capable of automatically applying a UVC light treatment to the target grass area, wherein the target grass area comprises C4 turfgrass.

A warm season C4 turfgrass is *Paspalum vaginatum*, also commonly known as "seashore *Paspalum*." Other C4 turfgrasses include, but are not limited to, turfgrasses in the Poaceae family such as *Paspalum* spp. (spp.=all related species in genus) including, but not limited to, *Paspalum notatum* (Bahia Grass); *Stenotaphrum* spp. including, but not limited to, *Stenotaphrum secundatum* (St. Augustine Grass); *Bouteloua* spp. including, but not limited to, *Boutel-*

*oua dactyloides* (Buffalo Grass); *Eremochloa* spp. including, but not limited to, *Eremochloa ophiuroides* (Centipede Grass); *Axonopus* spp. including, but not limited to, *Axonopus affinis* (Carpet Grass); *Cynodon* spp. including, but not limited to, *Cynodon transvaalensis, Cynodon dactylon* (Bermuda Grass), and *Cynodon dactylon* x *Cynodon transvaalensis; Zoysia* spp. including, but not limited to, *Zoysia matrella, Zoysia japonica, Zoysia matrella* x *Zoysia japonica*, and *Zoysia tenuifolia*

As understood by one of ordinary skill in the art, C4 turfgrasses uses C4 photosynthesis to turn light, carbon dioxide, and water into sugars. Meanwhile, most non-warm season grasses opposite to *Paspalum vaginatum*, use C3 photosynthesis to turn light, carbon dioxide, and water into sugars.

The method and system includes coupling a UVC light subsystem to the autobot such that the UVC light subsystem is suspended above the C4 turfgrass within the target grass area between about 0.5 of an inch to about 18.0 inches; and preferably between about 0.75 of an inch to about 6.0 inches; and most preferably between about 1.0 of an inch to about 1.5 inches. Next, UVC light is generated by the UVC light subsystem with a wavelength between about 200.0 nm and 300.0 nm; and preferably between 245.0 nm to about 275.0 nm; and most preferably between about 250.0 nm to about 270.0 nm.

Subsequently, the UVC light is emitted from the UVC light subsystem to the C4 turfgrass at an intensity between about 0.5 Watt per square meter and 300.0 Watts per square meter; preferably between about 2.0 Watts and 50 Watts per square meter; and most preferably between about 3.0 Watts and 4.0 Watts per square meter. The UVC light is moved across the C4 turfgrass within the target grass area using the autobot at night at a speed between about 0.1 MPH and about 7.0 MPH; and preferably between about 0.3 MPH and about 3.0 MPH; and most preferably between 0.5 MPH and about 1.0 MPH.

And unexpectedly, the growth of the C4 turfgrass is substantially regulated wherein clipping weight of the C4 turfgrass within target grass area is substantially reduced. Further, and unexpectedly, an average seed head presence with the C4 turfgrass is substantially reduced, while a shoot density of the C4 turfgrass is also substantially increased.

Specifically, the method and system may decrease clipping weight of the C4 turfgrass by at least 50.0% compared to target grass areas not receiving UVC light treatments.

The method and system may also provide increased shoot density of at least 60% in warm season C4 turfgrass compared to target grass areas not receiving UVC light treatments, and preferably, of at least 70% within the C4 turfgrass of the target grass area. Further, the method and system may provide at least a 60.0% average reduction in seed head presence compared to target grass areas not receiving UVC light treatments, and preferably, greater than 70% average reduction in seed head presence within the C4 turfgrass of the target grass area.

Generally, based on the unexpected results noted above, the method and system may substantially control the growth of C4 turfgrass such that a slope tracking a growth rate of the C4 turfgrass is substantially decreased compared to normal growth/growth of C4 turfgrass which does not receive UVC treatments according to at least one of seven (7) parameters that are noted below. This controlled growth of the C4 turfgrass includes growth that is substantially regulated compared to C4 turfgrass which does not receive UVC light according to the at least one of seven (7) parameters noted below.

The inventors have discovered the following seven (7) parameters that may contribute to these unexpected results for regulating growth of warm season C4 turfgrass:

a) applying UVC light to warm season C4 turfgrass between about 200.0 nm and 300.0 nm; and preferably between 245.0 nm to about 275.0 nm; and most preferably between about 250.0 nm to about 270.0 nm;

b) applying the UVC light to the C4 turfgrass within the ranges listed above during night time (absent sunlight);

c) applying the UVC light to the C4 turfgrass with an intensity between about 0.5 Watt per square meter and 300.0 Watts per square meter; preferably between about 2.0 Watts and 50 Watts per square meter; and most preferably between about 3.0 Watts and 4.0 Watts per square meter;

d) applying the UVC light to the C4 turfgrass at a height above the C4 turfgrass between about 0.5 of an inch to about 18.0 inches; and preferably between about 0.75 of an inch to about 6.0 inches; and most preferably between about 1.0 of an inch to about 1.5 inches;

e) applying the UVC light to the C4 turfgrass at a rate traversing the C4 turfgrass of between about 0.1 MPH and about 7.0 MPH; and preferably between about 0.3 MPH and about 3.0 MPH; and most preferably between 0.5 MPH and about 1.0 MPH;

f) applying the UVC light noted above using an automatic robot at night (absent sunlight); and g) applying the UVC light to the C4 turfgrass without applying any fertilizer and without applying any fungicide treatments.

The above-described and additional features may be considered, and will become apparent in conjunction with the drawings, in particular, and the detailed description that follows.

This summary is provided to introduce a selection of concepts that are further described below in the detailed description and illustrated in the several detailed figures. This summary is not intended to identify key or essential features of the claimed subject matter, nor is it intended to be used as an aid in limiting the scope of the claimed subject matter.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 5 illustrates a perspective view of an exemplary autonomous robot ("autobot") according to the solution;

FIG. 12 is a logical flowchart illustrating an exemplary method for fostering controlled growth of the target grass area;

FIG. 13 is a table listing collection dates for data taken during two experiments of a target grass area;

FIG. 14 is a table that lists the green surface firmness data recorded for the target grass areas of the first experiment;

and

Figure 53:
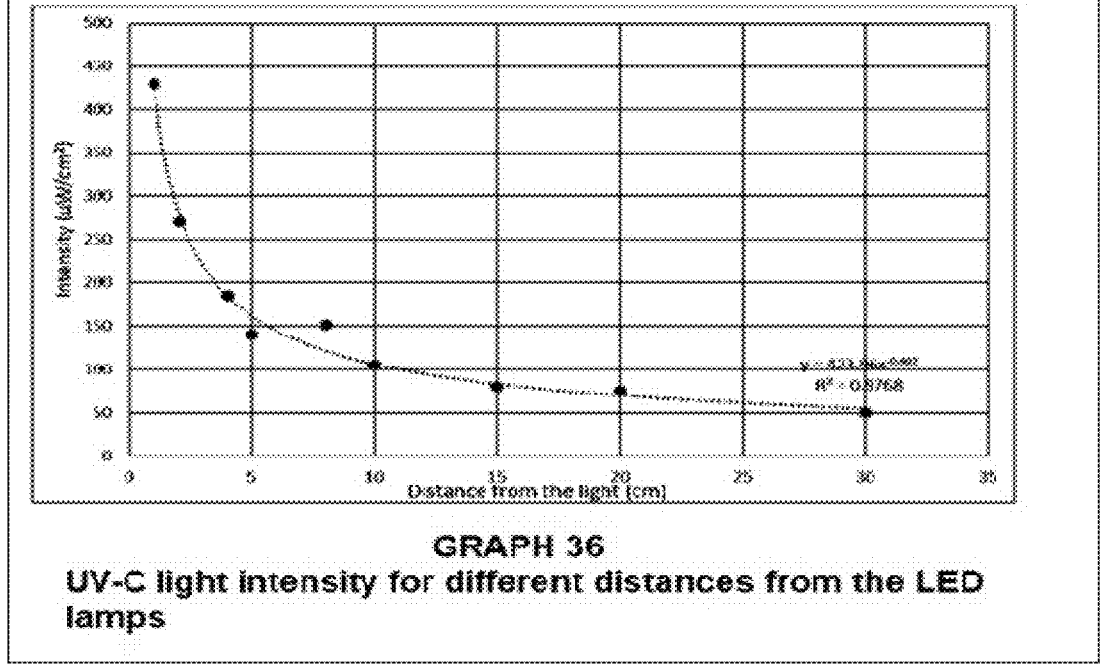

FIG. 53 is a thirty-sixth Graph 36 that tracks UV-C light intensity for different distances from the LED lamps.

DETAILED DESCRIPTION

The present solution is best understood with reference to the detailed figures and description set forth herein. Various exemplary embodiments are discussed with reference to the figures. One of ordinary skill in the art, however, will readily appreciate that the detailed descriptions provided herein with respect to the figures are offered merely for explanatory purposes and do not necessarily encompass the entirety of the novel solution, as the methods and systems may extend beyond the described embodiments. For instance, the teachings presented herein and the needs of a particular application may yield multiple alternative and suitable approaches to implement the functionality of any detail described herein. Therefore, any approach may extend beyond certain exemplary implementation choices in the following embodiments.

Embodiments of the solution include an autonomous robot ("autobot") with an ultraviolet light emitting subsystem, and specifically, a UVC light emitting subsystem.

As understood by on one of ordinary skill in the art, the UV radiation spectrum is divided into three regions known as UVA, UVB and UVC. Sunlight contains the UV radiation spectrum. As sunlight passes through the atmosphere, all UVC and most UVB is absorbed by ozone, water vapor, oxygen and carbon dioxide. UVA is not filtered as significantly by the atmosphere.

The UV radiation spectrum covers the wavelength range between 100.0 to 400.0 nm and is divided into three bands as understood by one of ordinary skill in the art:

UVA (315.0-400.0 nm)

UVB (280.0-315.0 nm)

UVC (100.0-280.0 nm)

It is within this UVC range or band in combination with other steps of a method and system that the inventors have discovered unexpected results with respect to C4 plants. Specifically, the Applicant has evidence of unexpected results derived from method steps for applying UVC light during night (absent sunlight) to warm season C4 grasses which are C4 defined below.

The evidence of the unexpected results is found in at least four experiments described below. The four experiments tested a warm season C4 turfgrass known as *Paspalum vaginatum*, also commonly known as "seashore *Paspalum*."

As understood by one of ordinary skill in the art, *Paspalum vaginatum* uses C4 photosynthesis to turn light, carbon dioxide, and water into sugars. Meanwhile, most non-warm season grasses opposite to *Paspalum vaginatum*, use C3 photosynthesis to turn light, carbon dioxide, and water into sugars.

The majority of plant species on Earth uses C3 photosynthesis, in which the first carbon compound produced contains three carbon atoms. Such plant species which use C3 photosynthesis are often known as C3 plants. In C3 photosynthesis, carbon dioxide enters a plant through its stomata (microscopic pores on plant leaves), where amidst a series of complex reactions, the enzyme Rubisco fixes carbon into sugar through the Calvin-Benson cycle.

Meanwhile, for plants which use C4 photosynthesis, like *Paspalum vaginatum*, such plants are referred to as C4 plants, and also C4 turfgrass. In C4 photosynthesis, a four-carbon compound is produced without photorespiration which occurs in C3 plants. And unlike C3 plants which have open stomata during photosynthesis, C4 plants retain water during photosynthesis because their stomata are closed.

C4 plants avoid photorespiration (used by C3 plants) by using another enzyme, instead of Rubisco, called Phosphoenolpyruvate (PEP) carboxylase during the first step of carbon fixation during photosynthesis. PEP is more attracted to carbon dioxide molecules and is, therefore, much less likely to react with oxygen molecules. PEP fixes carbon dioxide into a four-carbon molecule, called malate, that is transported to the deeper bundle sheath cells that contain Rubisco. The malate in a C4 plant is then broken down into a compound that is recycled back into PEP and carbon dioxide that Rubisco fixes into sugars-without having to deal with the oxygen molecules that are abundant in the mesophyll cells.

As noted above, C4 plants include warm season C4 turfgrasses such as *Paspalum vaginatum*. Other warm season grasses, besides *Paspalum vaginatum*, include, but are not limited to Bahia Grass (*Paspalum notatum*); St. Augustine (*Stenotaphrum secundatum*); Buffalo Grass (*Bouteloua dactyloides*); Centipede (*Eremochloa ophiuroides*); Carpet Grass (*Axonopus*); *Cynodon* spp, including, but not limited to, *Cynodon transvaalensis* spp (spp=multiple species), *Cynodon* dactylon, *Cynodon dactylon* spp, *Cynodon dactylon* X *Cynodon transvaalensis*, and *Cynodon dactylon* x *Clathrus* (C.) *transvaalensis*, and *Bermuda cynodon dactylon; Zoysia* spp, including, but not limited to, *Zoysia matrella, Zoysia japonica, Zoysia matrella* x *Zoysia Japonica, Zoysia Japonica*, and *Zoysia tenuifolia.*

"Warm season" grasses are defined as follows: warm season grasses are generally native to tropical and subtropical regions worldwide, between 30.0-35.0° N-S latitude (Zuloaga & Morrone 2001). They may occupy coastal salt and brackish water marshes and other wet habitats worldwide, and usually in areas subjected to different environmental disturbances (Burkart et al. 1990).

Freezing is the principal abiotic stress constraint involved in the geographic distribution of warm season grasses. Freezing tolerance has been reported for some warm season grasses, including a few cultivars of *Paspalum vaginatum*, which have a tolerance range between −4 and −7° C. under field conditions, and between −8 and −9° C. in acclimated plants.

The inventors have discovered that UVC radiation or light applied at night to warm season C4 turfgrass, such as *Paspalum vaginatum*, as part of a specific sequence of steps yields unexpected results. These unexpected results include, but are not limited to, substantially reducing the number of dollar spot infection centers, substantially reducing the average seed head presence, substantially increasing shoot density, and substantially decreasing clipping weight in the C4 turfgrass, and specifically, in *Paspalum vaginatum.*

The inventors have discovered the following seven (7) parameters which may contribute to these unexpected results in warm season C4 turfgrass:

a) applying UVC light to warm season C4 turfgrass between about 200.0 nm and 300.0 nm; and preferably between 245.0 nm to about 275.0 nm; and most preferably between about 250.0 nm to about 270.0 nm;

b) applying the UVC light to the C4 turfgrass within the ranges listed above during night time (absent sunlight);

c) applying the UVC light to the C4 turfgrass with an intensity between about 0.5 Watt per square meter and 300.0 Watts per square meter; preferably between about 2.0 Watts and 50 Watts per square meter; and most preferably between about 3.0 Watts and 4.0 Watts per square meter;

d) applying the UVC light to the C4 turfgrass at a height above the C4 turfgrass between about 0.5 of an inch to about 18.0 inches; and preferably between about 0.75 of an inch to about 6.0 inches; and most preferably between about 1.0 of an inch to about 1.5 inches;

e) applying the UVC light to the C4 turfgrass at a rate traversing the C4 turfgrass of between about 0.1 MPH and about 7.0 MPH; and preferably between about 0.3 MPH and about 3.0 MPH; and most preferably between 0.5 MPH and about 1.0 MPH;

f) applying the UVC light noted above using an automatic robot at night (absent sunlight); and g) applying the UVC light to the C4 turfgrass without applying any fertilizer and without applying any fungicide treatments.

The unexpected results are discussed in detail in connection with the four experiments explained more fully below.

Generally, based on the unexpected results noted above, the method and system may substantially control the growth of C4 turfgrass such that a slope tracking a growth rate of the C4 turfgrass is substantially decreased compared to normal growth/growth of C4 turfgrass which does not receive UVC treatments according to the seven (7) parameters that are noted above.

ORGANIZATION OF DETAILED DESCRIPTION

The detailed description as provided below will have three sections. Section 1.0 will describe the equipment which is illustrated in FIGS. 1-11 and which may be used in the sequence of steps for applying UVC light at night to C4 plants for regulating their growth during their growing season. Section 2.0 will describe the sequence of steps in which the equipment is used to treat C4 plants. Section 3.0 will describe at least four experiments which yielded unexpected results for C4 plants, and specifically, C4 plants comprising *Paspalum vaginatum.*

As will be explained in more detail below, the equipment includes an autobot that is self-propelled and configured to systematically traverse a target grass area containing C4 plants, such as a field or lawn, while the ultraviolet light emitting subsystem exposes the target grass area to UVC light. Advantageously, in this way embodiments of the solution may substantially control growth of a target grass area comprising C4 plants. It is a further advantage of embodiments of the solution that the autobot may traverse the target grass area without manual propulsion and, therefore, may do so efficiently without the benefit of an ambient light source (like sunlight such as at night).

Moreover, because embodiments of the solution may traverse the target grass area in the dark, it is envisioned that the efficacy for pathogen removal via UVC light may be improved over prior art solutions. And unexpectedly, the inventors have discovered this UVC light may also substantially reduce the number of dollar spot infection centers, substantially reduce seed head presence, substantially increase shoot density, and substantially decrease clipping weight in the C4 turfgrass which forms the target grass area.

Embodiments of the present solution include various steps (outlined in Section 2.0 of the Detailed Description), which will be described below. Although the present solution is described with the purpose of removing pathogens from a target grass area such as a field or lawn, it will also be shown that the present solution yields unexpected results in the C4 plants that form the target grass area.

Section 1.0 of Detailed Description—Equipment

Figure 1:
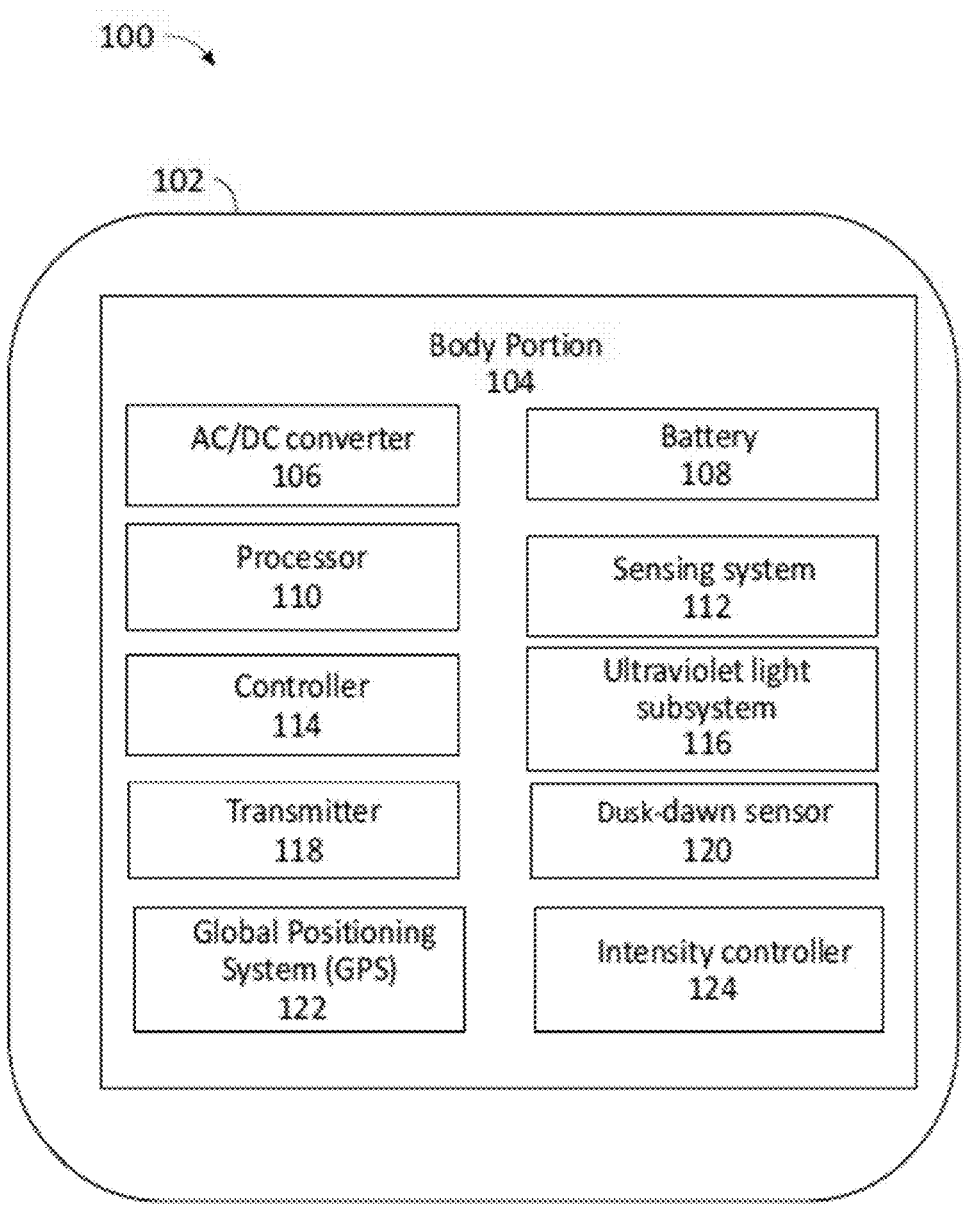
FIG. 1 illustrates a functional block diagram of an autonomous robot ("autobot") configured to foster controlled growth of the turfgrass in the target area, in accordance with one embodiment of the solution.

FIG. 1 illustrates a functional block diagram 100 of an autonomous robot ("autobot") 102 configured to foster controlled growth of the turfgrass in the target area in accordance with one embodiment of the solution. The autobot 102 includes a body portion 104, including a frame, to support various components of the autobot. In an exemplary embodiment, the autobot is in the form of an autonomous lawn mower, although it will be understood that not all autobots 102 according to the solution include mowing functionality or, for that matter, any functionality applicable to the target area beyond application of UV light via subsystem 116.

The components mounted within or on body portion 104 may comprise one or more of an AC/DC converter 106, a rechargeable battery 108, a processor 110, a sensing system 112, a controller 114, an ultraviolet-C light subsystem 116, a transmitter 118, a dusk-dawn sensor 120, a Global Positioning System (GPS) 120, and an intensity controller 124. Additionally, although not depicted in the FIG. 1 illustration, it will be understood that embodiments of an autobot 102 according to the solution may include a powertrain having one or more of an electric motor, wheels (or some other means for movement across the target area), axle(s), gearing, drives, etc.

The AC/DC converter 106 transforms alternating current (AC) input received from an electrical power supply (not shown in the FIG. 1 illustration) into direct current (DC) output. The battery 108 stores the direct current (DC) output, as would be understood by one of ordinary skill in the art. The electrical power supply is connected to a charge station to recharge the battery 108 when the autobot 102 is docked at the charge station. Energy stored in the battery 108 may be used to drive an electric motor and power the UV subsystem 116 as well as other components within the autobot 102. In an embodiment, the battery 108 transmits a battery level signal to the controller 114.

In an exemplary embodiment, the battery 108 may include a battery such as lithium ion battery or batteries having small current ratings with a long discharging cycle, such as an absorbent glass mat (AGM) battery, a sealed lead acid (SLA) battery, a flooded lead-acid battery, or a gel cell. Even so, it will be understood that embodiments of the solution are not limited to any particular type of battery, as one of ordinary skill in the art will be able to select a battery type and size in view of factors including, but not necessarily limited to, the size/weight of the autobot 102, the current draw requirements of the subsystem 116, the size of the target area to be covered between charging events, etc.

In an exemplary embodiment, the processor 110 may store data associated with various position markers in the target area and executable instructions pertaining to a coverage path of the target area. The position markers may be a plurality of underground reference points positioned along the desired coverage path. Examples of the processor 110 include, but are not limited to, special-purpose processing devices such as an application specific integrated circuit (ASIC), a digital signal processor (DSP), etc. Additionally, reference to the processor 110 may represent general-purpose processing devices such as a microprocessor, a central processing unit, etc. Further, reference to the processor 110 will be understood to include a memory component for storage of executable instructions, reference data, etc., as would be understood by one of ordinary skill in the art of electronics.

The sensing system 112 senses the presence of a position marker and transmits to the processor 110 a data signal in accordance therewith upon sensing the position marker. The processor 110 operates in response to the data signal received from the sensing system 112 to compare the data signal with the stored position markers in order to determine an actual position within the target area.

In view of the position marker sensed by the sensing system 112 and determined by the processor 110 based on the stored data associated with the position markers, the controller 114 controls and directs the movement of the autobot 102 along the desired coverage path of the target area. In this way, an embodiment of the solution that leverages position markers may systematically traverse the target area according to a predefined coverage path.

In other embodiments of the solution that leverage position markers, a visual positioning system that comprises a camera subsystem may be included in the sensing system 112. The visual positioning system, working with the processor 110, may be configured to determine the location of the camera-enabled autobot by decoding location coordinates from visual markers strategically placed around the target area and recognized by the camera subsystem. In such an application, markers are placed at specific locations throughout the target area, each marker encoding that location's positional coordinates: latitude, longitude and height off the ground. Measuring the visual angle from the autobot to the marker enables the processor to estimate the autobot's own location coordinates in reference to the marker. In this way, the autobot may manipulate the controller 114 to navigate the autobot around and within the target area.

In other embodiments of the solution, the sensing system 112 and/or GPS module 122 may comprise an inertial measurement unit ("IMU") that includes, inter alia, accelerometer(s) and gyroscope(s). An IMU may be integrated into a GPS based navigation system to achieve a dead reckoning capability and the ability to gather data indicative of the autobot's current speed, turn rate, heading, inclination and acceleration. The data generated by the IMU is communicated to the processor 110 which may use the data to calculate attitude, velocity and position of the UV autobot 100.

An exemplary implementation of an IMU understood by one of ordinary skill in the art may take the form of a Strap Down Inertial System that integrates angular rate from the gyroscope to calculate angular position. The angular position may be fused with the gravity vector measured by the accelerometers in a Kalman filter to estimate attitude. The attitude estimate may then be used to transform acceleration measurements into an inertial reference frame where they are integrated once to get linear velocity, and twice to get linear position.

For example, if an IMU comprised within a UV autobot moving along a certain direction vector were to measure the autobot's acceleration as 0.5 m/s² for 1 second, then after that 1 second the processor may calculate that the autobot must be traveling at 0.5 m/s and must be 0.25 m from its initial position (assuming $v_0=0$ and known starting position coordinates $x_0$, $y_0$, $z_0$). If combined with a digital map archive of the target area stored in the memory 112, the autobot may remotely transmit the location data to a central system to indicate where the autobot is located geographically within the target area in a certain moment, as with a GPS navigation system alone—but without the need to communicate with or receive communication from any outside components, such as satellites or land radio transponders, though external sources such as GPS may still be used by the autobot processor 110 in order to correct drift errors (as would be understood by one of ordinary skill in the art of positional tracking systems). This method of navigation is called dead reckoning.

Certain other embodiments of the solution may leverage Timing & Inertial Measurement Unit ("TIMU") ICs that are configured to conduct absolute position tracking on a single chip without GPS-aided navigation. As understood by one of ordinary skill in the art, a TIMU IC chip integrates a master timing clock into an IMU chip. An exemplary TIMU chip may include an integrated 3-axis gyroscope, a 3-axis accelerometer, and a 3-axis magnetometer. Together with the master timing clock, an exemplary TIMU chip may simultaneously measure the tracked movement of the associated autobot and combine the measurement with timing from the synchronized clock. Fusing the measurements, absolute position tracking of the autobot may be realized without the need to leverage external transmitters or transceivers (such as GPS).

In certain embodiments, the controller 114 may initiate a return signal to the autobot 102 on detecting that a battery level signal is below a predefined battery level and, in doing so, causes the autobot 102 to return to the charge station. The processor 110 may transmit a correction signal to the controller 114 in response to identifying a deviation of the actual position of the autobot 102 in the target area from the desired coverage path or return path. The controller 114 may adjust the directional movement of the autobot 102 on receiving the correction signal. As the autobot 102 traverses the target area along the coverage path, the ultraviolet light subsystem 116 may generate ultraviolet, type C (UVC) radiation with a predefined power output operable to remove pathogens. In certain embodiments, the processor 110 may store one or more of UVC radiation data and removed pathogens data.

The transmitter 118 is communicatively connected to the processor 110 and may be operable to wirelessly transmit the UVC radiation data and/or removed pathogens data to a remote computing device. The wireless communication between the transmitter 118 and a remote computing device, established by using wireless technologies, may include, but is not limited to, cellular protocols, SMS, MMS, short-wave radio protocols (e.g., Bluetooth), Wi-Fi, and Infrared. Examples of the remote computing device may include, but are not limited to, personal computers, laptops, personal digital assistants (PDAs), mobile devices, tablets, or any other computing device.

A dusk-dawn sensor 120 mounted on the body portion 104 may be leveraged to determine an optimal duration or time window to remove the pathogens from the target area.

In this way, an autobot 102 according to the solution may depart from its docking/charging station for application of UV light to the target area when the sensor 120 indicates to the processor 110 that ambient light is below (or above) a predefined level.

A Global Positioning System (GPS) 122 may be connected to the sensing system 112 and establish a geo-fence within which generation of ultraviolet-C (UVC) radiation occurs. In this way, the target area may be predefined using a geo-fence of GPS coordinates such that the GPS 122, working with the sensing system 112 and/or processor 110 and controller 114, recognizes boundaries of the target area. Similarly, in embodiments of the solution that leverage a GPS 122, the aforementioned coverage path within the target area may be predefined by a series of GPS coordinates.

In such an embodiment, the markers may be associated with specific GPS coordinates in lieu of markers physically sensed by the sensing system 112. It is further envisioned that embodiments of the solution may not use a predefined coverage path and, instead, may traverse the target area according to an algorithm that causes the controller 114 to randomly redirect the direction of movement within the geo-fence (whether the geo-fence is defined by GPS coordinates or a physical barrier or physical position indicators capable of being sensed by the sensing system 112), thereby statistically covering the entire target area over time. An embodiment of the solution that leverages GPS coordinates for defining a geo-fence and/or a coverage path within the target area will be described in more detail relative to the FIG. 2 illustration.

The FIG. 1 illustration further includes an intensity controller 124. It is envisioned that certain embodiments of the solution may include an intensity controller 124 that is operable to adjust a power output of the ultraviolet-C light subsystem 116. Depending on embodiment, the intensity controller 124 may adjust the power output (i.e., the intensity of the UV light output) of the ultraviolet-C light subsystem 116 in view of one or more triggers such as, but not limited to, ambient light levels, timing, location within the target area, and target area type (e.g., grass type in the target area, grass height, etc.). Moreover, it is envisioned that the intensity controller 124 may adjust the power output of the subsystem 116 according to user defined parameters.

Figure 2:
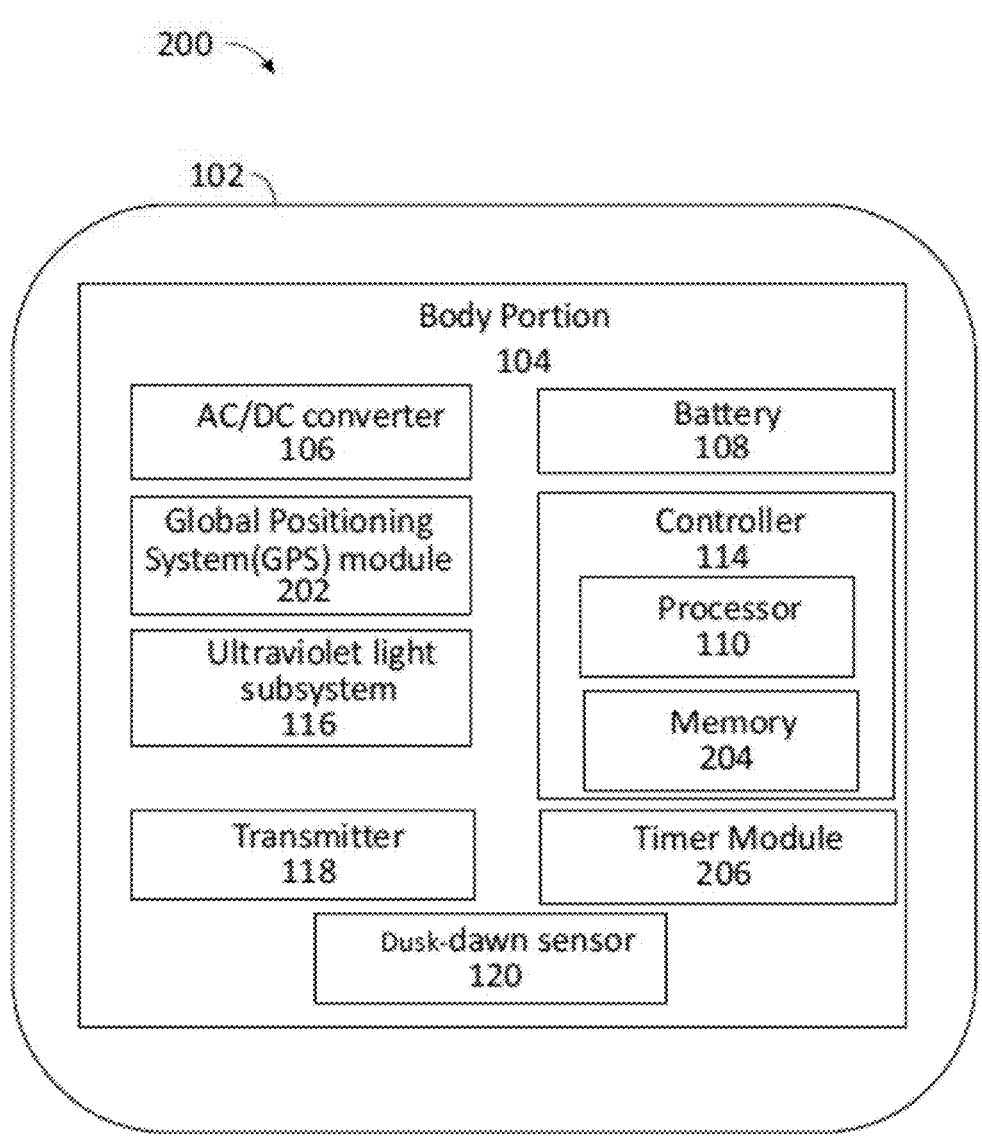
FIG. 2 illustrates a first functional block diagram of an autonomous robot ("autobot") configured to foster controlled growth of the turfgrass in the target area defined by a geo-fence, in accordance with one embodiment of the solution.

FIG. 2 illustrates a first functional block diagram 200 of an autonomous robot ("autobot") 102 configured to foster controlled growth of the turfgrass in the target area defined by a geo-fence, in accordance with one embodiment of the solution. The autobot 102 includes a body portion 104 to support various components of the autobot, as previously described relative to the FIG. 1 illustration. The various components shown in the FIG. 2 illustration include an AC/DC converter 106, a rechargeable battery 108, a Global Positioning System (GPS) module 202, a controller 114, an ultraviolet-C light subsystem 116, a transmitter 118, a timer module 206, and a dusk-dawn sensor 120.

The AC/DC converter 106 transforms alternating current (AC) input received from an electrical power supply into direct current (DC) output that is stored in battery 108, as would be understood by one of ordinary skill in the art. The electrical power supply is connected to a charge station to recharge the battery 108 when the autobot is docked at the charge station, as previously described.

Energy stored in the battery 108 may be used to drive an electric motor and power the UV subsystem 116 as well as other components within the autobot 102. The Global Positioning System (GPS) module 202 may be operable to generate a plurality of GPS coordinates representing a geographical location of the autobot 102 within the target area defined by a geo-fence. The controller 114 may be communicatively connected to the GPS module 202.

The controller 114 includes a processor 110 and a memory 204. The controller 114 may be configured to compare the geographical location of the autobot 102 with the GPS coordinates associated with the geo-fence and, based on the comparison, control the movement of the autobot 102 within the target area according to an algorithm for defining a coverage path of the target area. It is envisioned that the coverage path may be predefined (e.g., a coverage path defined by a series of adjacent rows) or randomly determined (e.g., a random change of direction such that the target area is eventually traversed in its entirety while certain areas within the target area are traversed a plurality of times as the movement of the autobot causes its path to crisscross).

Algorithms and predefined patterns for determining a coverage path will occur to those of skill in the art. In an embodiment, the processor 110 is further configured to store in the memory 204 one or more of UVC radiation data and removed pathogens data.

Figure 3:
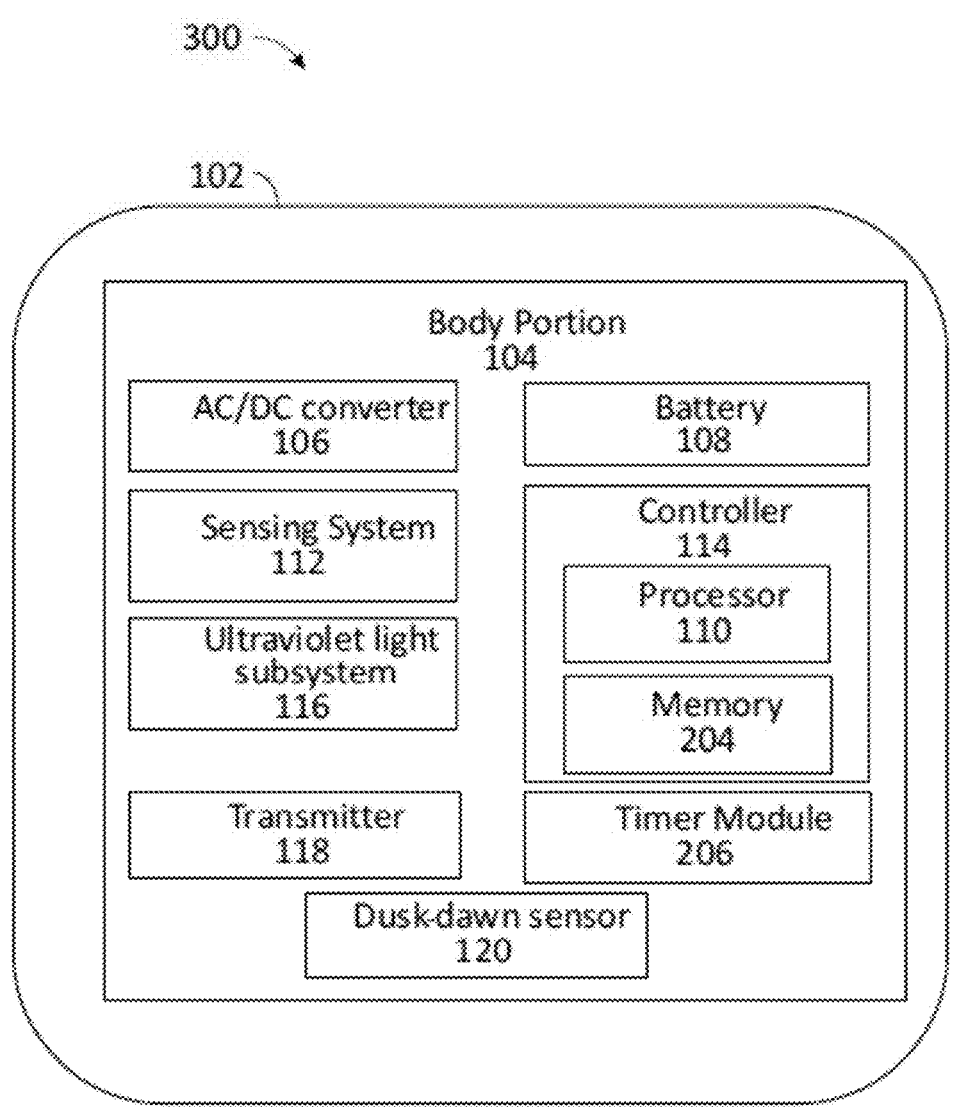
FIG. 3 illustrates a second functional block diagram of an autonomous robot ("autobot") configured to foster controlled growth of the turfgrass in the target area defined by a geo-fence, in accordance with one embodiment of the solution.

FIG. 3 illustrates a second functional block diagram 300 of an autonomous robot ("autobot") configured to foster controlled growth of the turfgrass in the target area defined by a geo-fence, in accordance with one embodiment of the solution. The autobot 102 includes a body portion 104 to support various components of the autobot, as previously described relative to the FIG. 1 illustration. The various components include an AC/DC converter 106, a rechargeable battery 108, a sensing system 112, a controller 114, an ultraviolet-C light subsystem 116, a transmitter 118, a timer module 206, and a dusk-dawn sensor 120.

The AC/DC converter 106 transforms alternating current (AC) input received from an electrical power supply into direct current (DC) output. The AC/DC converter 106 transforms alternating current (AC) input received from an electrical power supply into direct current (DC) output that is stored in battery 108, as would be understood by one of ordinary skill in the art. The electrical power supply is connected to a charge station to recharge the battery 108 when the autobot is docked at the charge station, as previously described. Energy stored in the battery 108 may be used to drive an electric motor and power the UV subsystem 116 as well as other components within the autobot 102.

The sensing system 112 may be operative to sense the presence of a boundary wire defining the perimeter of the target area and a charge station guide wire dissecting the target area. The controller 114 is connected to the sensing system 112. The controller 114 includes a processor 110 and a memory 204 and is configured to control the movement of the autobot 102 within the target area according to an algorithm for defining a coverage path of the target area, as previously described. In an embodiment, the processor 110 may be further configured to store in the memory 204 one or more of UVC radiation data and removed pathogens data.

The controller 114 may be configured to receive signals from the sensing system 112 and, based on the signals, adjust a movement direction of the autobot 102 according to the algorithm. The ultraviolet light subsystem 116 may be configured to generate ultraviolet, type C (UVC) radiation with a predefined power output useful for removing pathogens from the target area as the autobot 102 advances along the coverage path. The transmitter 118 may be connected to the processor 110 and operable to wirelessly transmit the UVC radiation data and/or removed pathogens data to a remote computing device.

Figure 4:
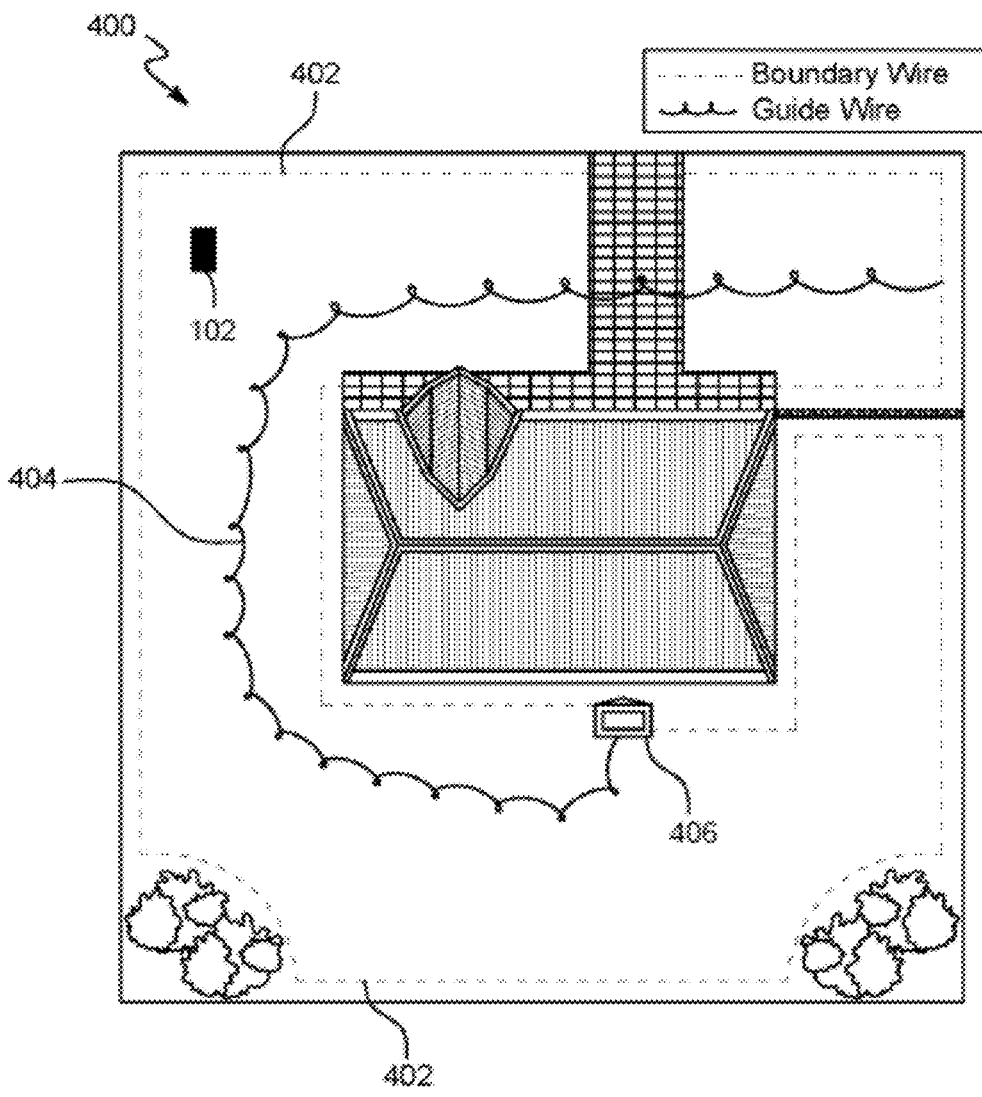
FIG. 4 illustrates an operational view of an autonomous robot ("autobot") configured to foster controlled growth of the turfgrass in the target area defined by a geo-fence, in accordance with one embodiment of the solution.

The timer module 206 may be in communication with the controller 114 and configured to generate timer signals defining an optimal duration for pathogen removal from the target area. The controller 114 may be further configured to, based on the timer signals, cause the autobot to advance along the coverage path or dock to the charge station. As will be described in more detail relative to the FIG. 4 illustration, the autobot 102 may find its way back to the docking station be recognizing the presence of the aforementioned guide wire. In an embodiment, the controller 114 may be configured to monitor a battery charge level and, upon determining that the battery charge level is below a predefined threshold, cause the autobot to dock at the charge station by directing movement of the autobot along the guide wire.

FIG. 4 illustrates an operational view 400 of an autonomous robot ("autobot") configured to foster controlled growth of the turfgrass in the target area defined by a geo-fence 402, in accordance with one embodiment of the solution. FIG. 4 shows that the boundary wire 402 (which defines the geo-fence in the particular application illustrated by FIG. 4—other applications may leverage GPS coordinates, Wi-Fi broadcast ranges, or other means for defining the geo-fence) is buried around the target area and a guide wire 404 is buried such that it strategically dissects the target area.

The sensing system 112 placed on the autobot 102 detects the boundary wire 402 and works with the controller 114 to change the direction of the autobot 102 to stay within the geo-fence 402. In an embodiment, the path algorithm may be predefined or random. When the battery 108 needs a charge, upon detecting the guide wire 404 the autobot 102 will follow the guide wire 404 back to the charging station 406.

Thus an exemplary embodiment of the present solution provides an autobot 102 that utilizes a sensing system 112 that keys off of the boundary wire 402 that defines the perimeter of a yard or grass field. The autobot 102 stays within the perimeter and leverages the algorithm to traverse the yard while the UV subsystem emits pathogen-killing light. The autobot 102 automatically returns to a charging station 406 when it needs a charge. In an embodiment, the autobot 102 leverages GPS to stay within the geofence that defines the yard or grass field instead of relying on the recognition of a boundary wire 402.

FIG. 5 illustrates a perspective view of an exemplary autonomous robot ("autobot") 500 according to the solution. As can be understood from the FIG. 5 illustration, the autobot 500 includes a pair of wheels. Each wheel may be driven independently from the other, thereby allowing the controller to change direction of movement for the autobot 500 by varying the rotational speed of one wheel relative to the other. The UVC light-emitting subsystem may be incorporated within the exemplary autobot 500 beneath the body such that it is not exposed outside of the body perimeter. In this way, application of the UVC light to the target area may be improved in high ambient light conditions.

Figure 6:
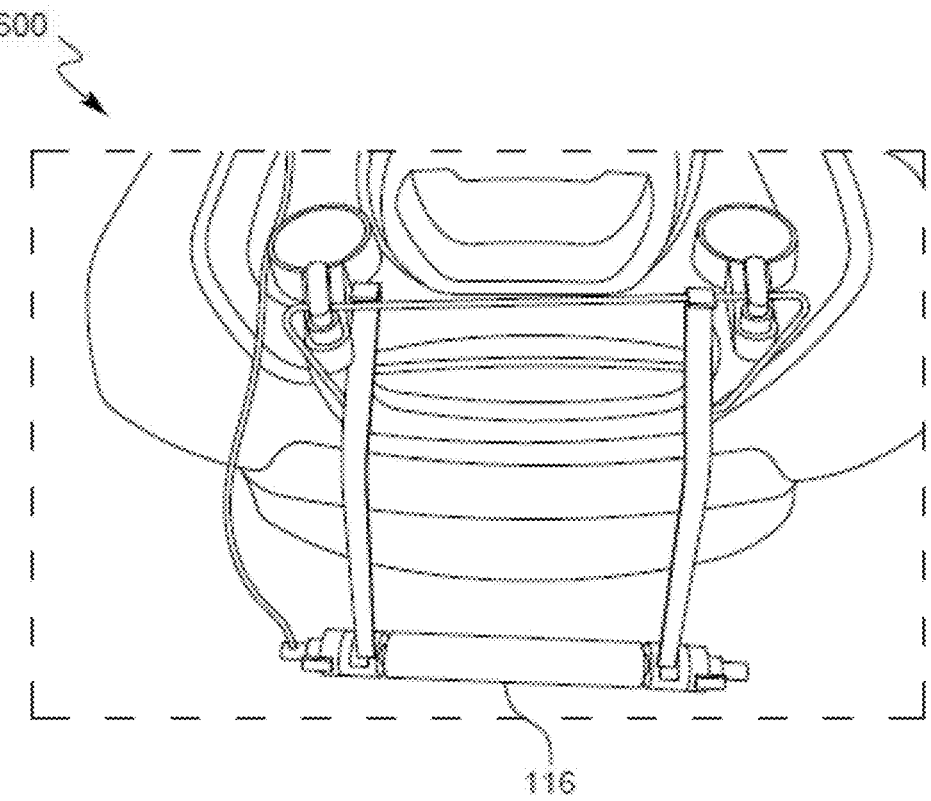
FIG. 6 illustrates an assembled view of an autonomous robot ("autobot") according to the solution comprising an exemplary ultraviolet light subsystem removably mounted to the body of the autobot.

FIG. 6 illustrates an assembled view of an autonomous robot ("autobot") 600 according to the solution comprising an exemplary ultraviolet-C (UVC) light subsystem 116 that is removably mounted external to the autobot body. The The exemplary UVC light subsystem 116 shown in the FIG. 6 illustration includes a single ultraviolet bulb removably mounted such that it is suspended out ahead of the autobot. Specifically, the UVC light subsystem 116 comprises a single ultraviolet bulb with a filament the produces UVC light. The UVC light subsystem of this exemplary embodiment may consume about 14.0 watts of electricity. The UVC light generated by the subsystem 116 may have wavelengths between about 250.0 nm and about 270.0 nm, and preferably between about 254.0 nm and about 265.0 nm.; and preferably at 254 nm for this exemplary embodiment.

The UVC light subsystem 116 is powered by the battery 108, as previously described. The ultraviolet subsystem 116 is configured to generate ultraviolet, type C (UVC) radiation with a predefined power output of about 14.0 watts (or a variable power output, in some embodiments), as previously described, and is operable to substantially fostering controlled growth, which may include regulating growth, of C4 turfgrass as the autobot 600 advances along a coverage path of the turfgrass.

Figure 7:
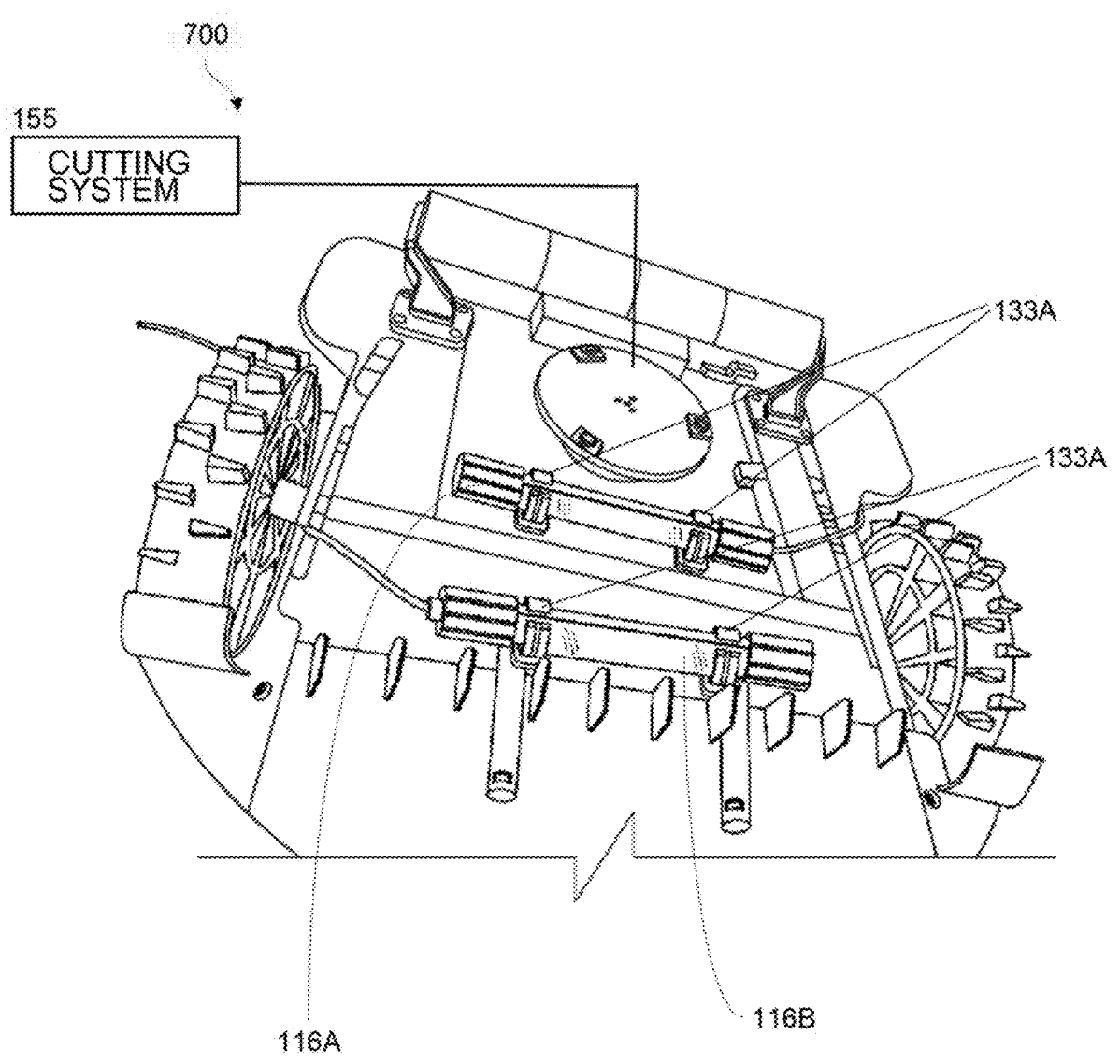
FIG. 7 illustrates an assembled view of an autonomous robot ("autobot") according to the solution comprising an exemplary ultraviolet light subsystem removably mounted to the underside of the autobot body.

FIG. 7 illustrates an assembled view of an autonomous robot ("autobot") 700 according to the solution comprising an exemplary ultraviolet-C light (UVC) subsystem 116 removably mounted to the underside of the autobot body using fastening mechanisms 133A, such as brackets. Other fastening mechanisms 133A are possible, and are included within the scope of this disclosure. Other fastening mechanisms 133A include, but are not limited to, brackets, rods, screws, rivets, etc. The fastening mechanism 133A (not illustrated in FIG. 7) may allow for an adjustment of height for the UVC subsystem 116 above the turfgrass, as understood by one of ordinary skill in the art.

In addition to the UVC light subsystem 116, the autoboot 700 may be equipped with a cutting system illustrated with a labeled rectangular box 155. A detailed illustration of the cutting system 155 is not essential for a proper understanding of the inventive system and method since one of ordinary skill in the art may mount one or more blades for cutting grass as known in the art, where these blades are mounted adjacent to the UVC subsystem 116.

The exemplary UVC light subsystem 116 shown in the FIG. 7 illustration includes a pair of ultraviolet bulbs 116A, 116B powered by the battery 108, as previously described. These pair of ultraviolet bulbs 116A also consume about 14.0 watts of electricity and are of a single filament type, similar to the embodiment described above in FIG. 6. The UVC light generated by this subsystem 116 may have wavelengths between about 200.0 nm and 300.0 nm; and preferably between 245.0 nm to about 275.0 nm; and most preferably between about 250.0 nm to about 270.0 nm, as described above.

The UV light subsystem 116 is configured to generate ultraviolet, type C (UVC) radiation with a predefined power output of about 14.0 watts (or a variable power output, in some embodiments), as previously described, and is operable to substantially control growth of C4 turfgrass, as the autobot 700 advances along a coverage path of the turfgrass.

Figure 8:
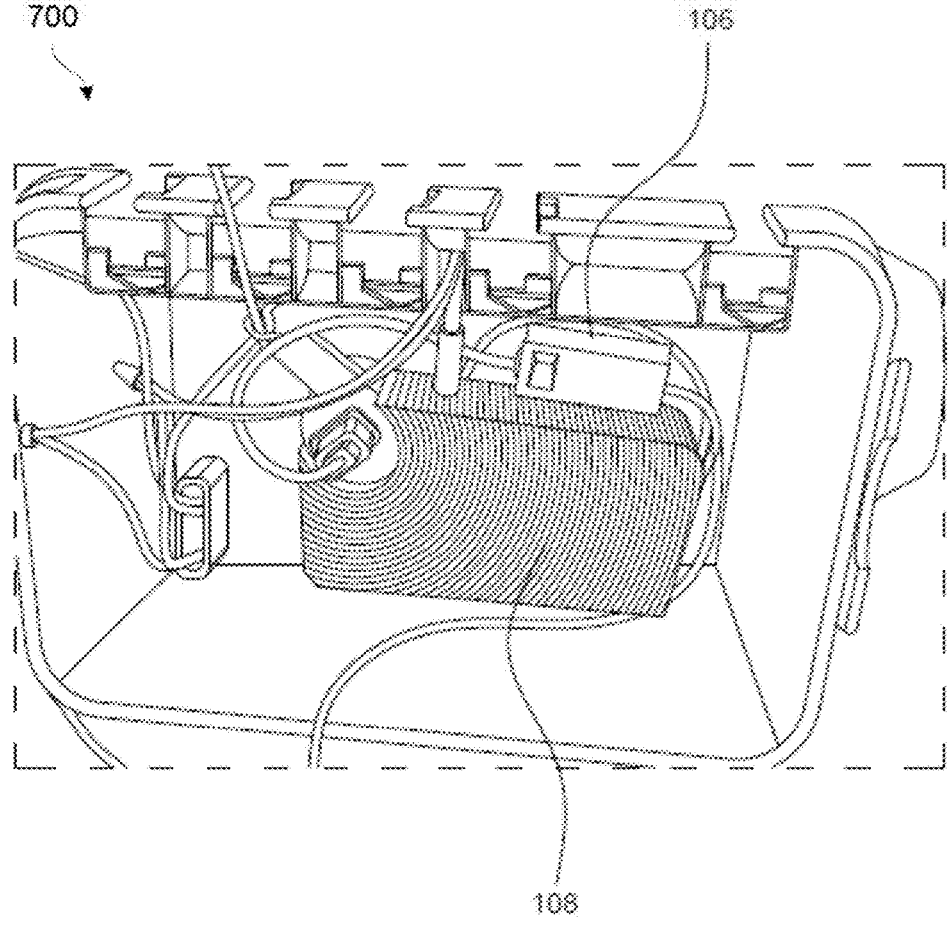
FIG. 8 illustrates an assembled view of an AC/DC converter and a battery comprised within an exemplary embodiment of an autonomous robot ("autobot") according to the solution.

FIG. 8 illustrates an assembled view 800 of an AC/DC converter 106 and a battery 108 that form part of an exemplary embodiment of an autonomous robot ("autobot") 700 according to the solution. As noted previously, the AC/DC converter 106 transforms alternating current (AC) input received from an electrical power supply into direct current (DC) output that is stored in battery 108, as understood by one of ordinary skill in the art.

Figure 9:
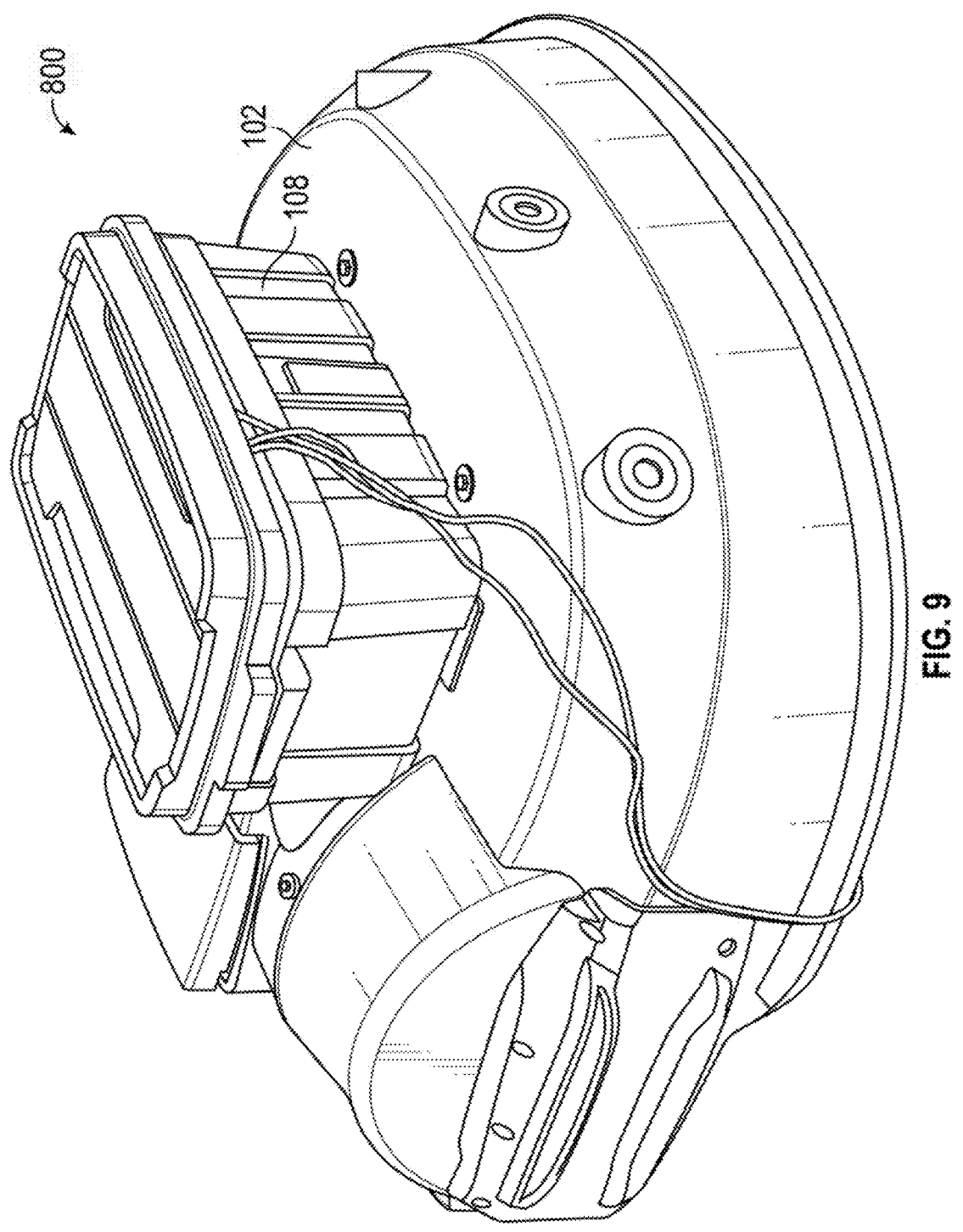
FIG. 9 illustrates an autonomous robot ("autobot") according to an alternative exemplary embodiment comprising an ultraviolet light subsystem removably mounted to the underside of the autobot body.

Referring now to FIG. 9, this figure illustrates an autonomous robot ("autobot") 800 according to an alternative exemplary embodiment comprising an exemplary ultraviolet-C light subsystem 116C (see FIG. 10) removably mounted to the underside of the autobot body 102. The UVC light subsystem 116C may be mounted to the underside by brackets 133B. Other brackets 133 are possible and are included within the scope of this disclosure, as mentioned above in connection with FIG. 7. The autobot 800 may comprise an Echo Robotics™ 1000 Turf Mower sold, as of this writing, by ECHO Incorporated, 400 Oakwood Rd, Lake Zurich, IL 60047 (see https://echorobotics.com/).

Figure 10:
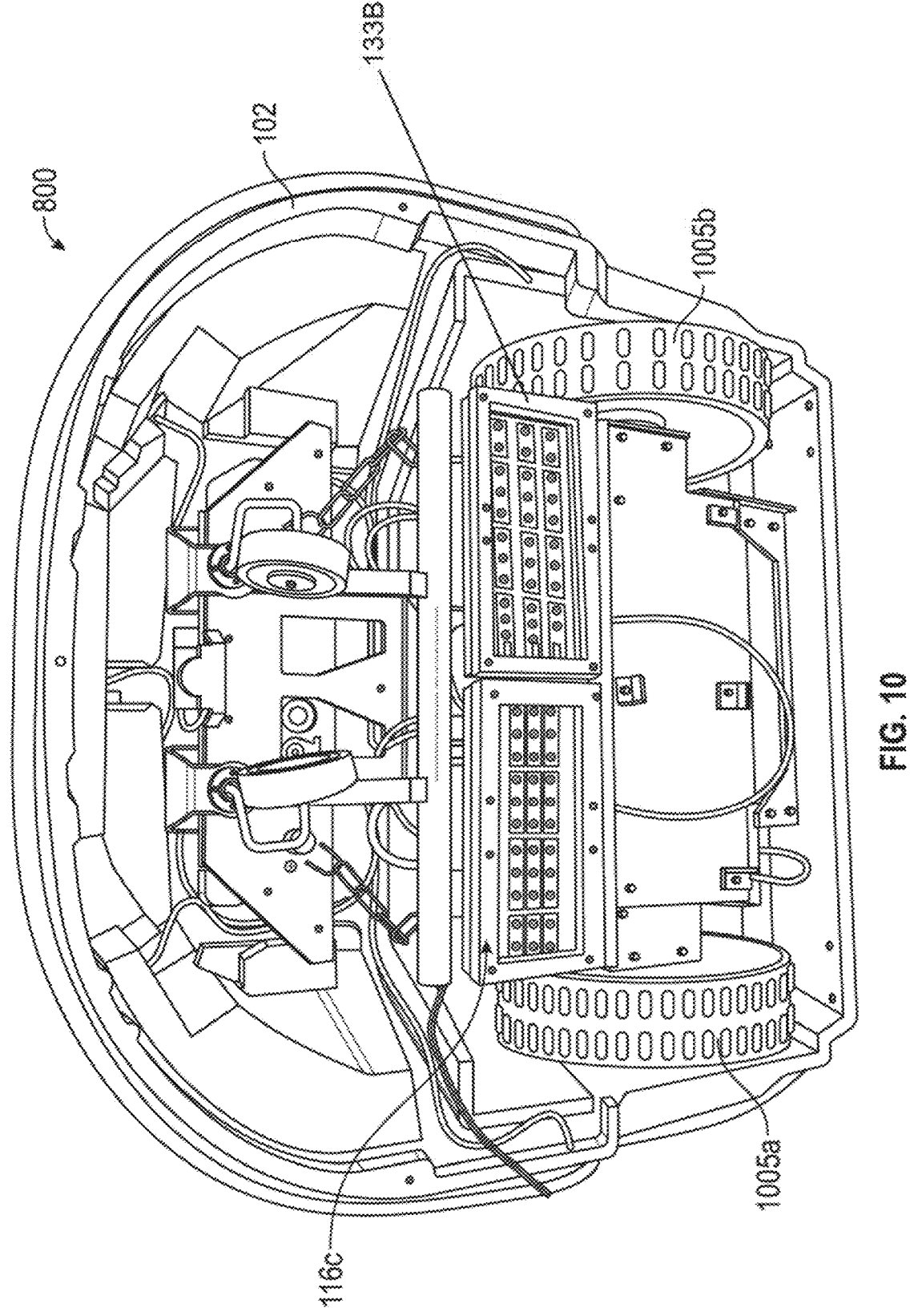
FIG. 10 illustrates an underside portion of the autobot illustrated in FIG. 9.

The autobot 800 was retro-fitted to deliver UVC light by removing the mowing mechanism and replacing the mowing mechanism a light subsystem 116C (see FIG. 10). The autobot has a ground speed between 0.1 MPH and about 7.0 MPH; and preferably between about 0.3 MPH and about 3.0 MPH; and most preferably between 0.5 MPH and about 1.0 MPH. The autobot 800 further comprises a battery 108 mounted on a top side of the autobot body 102. This battery 108 provides power to the light subsystem 116C (described below).

Referring now to FIG. 10 illustrates an underside portion of the autobot illustrated in FIG. 9. In FIG. 10, the light subsystem 116C comprises a 20-inch by 4-inch array of UVC lights suspended approximately between about 0.5 of an inch to about 18.0 inches; and preferably between about 0.75 of an inch to about 6.0 inches; and most preferably between about 1.0 of an inch to about 1.5 inches above the turfgrass.

The light array 116C may deliver a light intensity between about 0.5 Watt per square meter and 300.0 Watts per square meter; preferably between about 2.0 Watts and 50 Watts per square meter; and most preferably between about 3.0 Watts and 4.0 Watts per square meter. The UVC light subsystem 116C of this exemplary embodiment may consume about 108.0 watts of electricity. According to one exemplary embodiment, the UV light subsystem 116 may comprise Klaran™ brand Light Engines (LE)(KLARAN LE™) sold by Klaran of New York (www.Klaran.com).

The UVC light generated by the light array 116C has a wavelength between about 250.0 nm and about 270.0 nm, and preferably between about 254.0 nm and about 265.0 nm, and preferably at about 265.0 nm for this exemplary embodiment.

Figure 11:
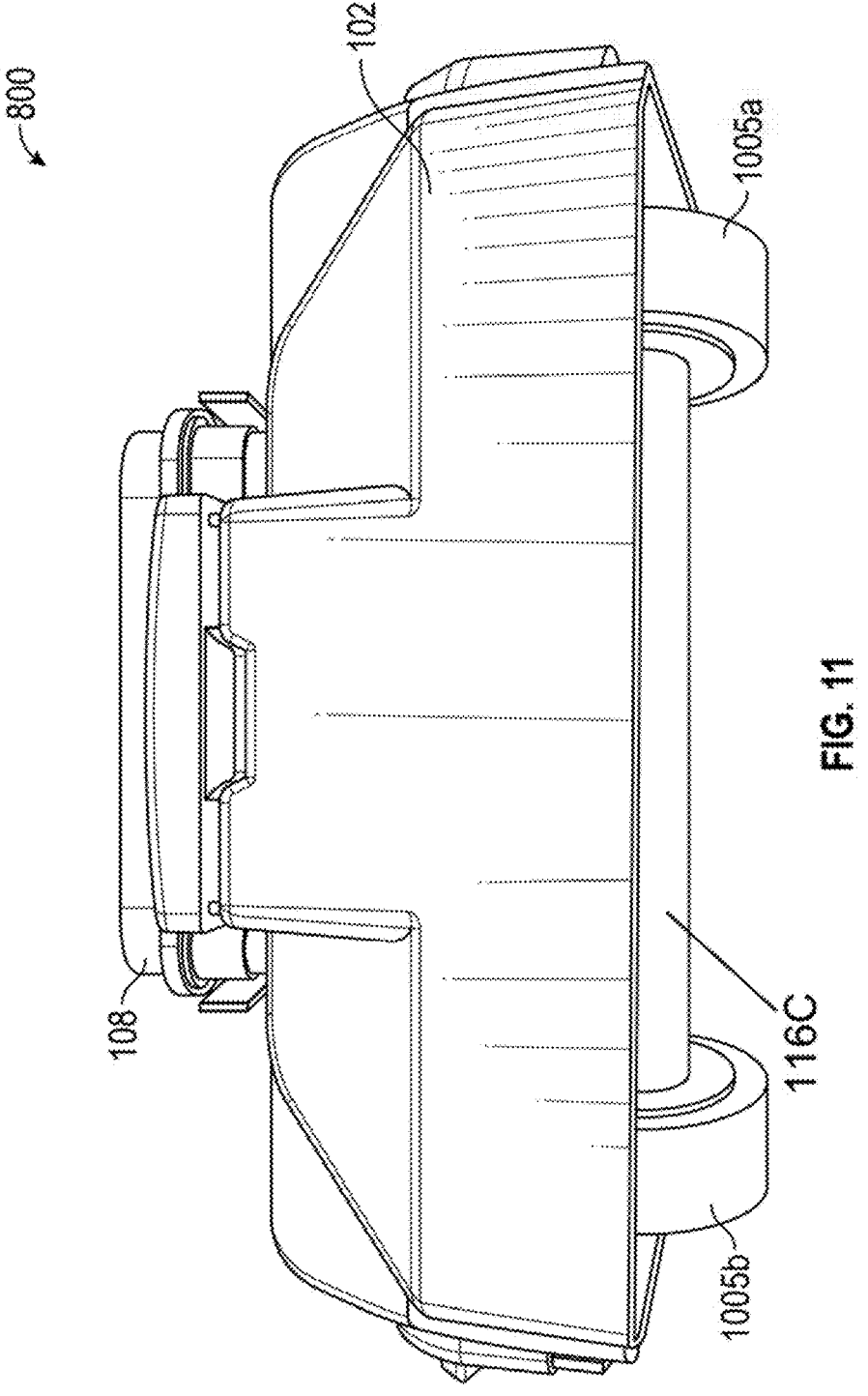
FIG. 11 illustrates a rear view of the autobot illustrated in FIGS. 9-10.

FIG. 11 illustrates a rear view of the autobot 800 illustrated in FIGS. 9-10. In this view, the two driven wheels 1005a, 1005b are also visible while the autobot 800 is an upright position traversing across the turfgrass 1150. As noted previously, the turfgrass 1150 comprises C4 turfgrass, that includes, but is not limited to *Paspalum vaginatum*, Bahia Grass (*Paspalum notatum*); St. Augustine (*Stenotaphrum secundatum*); Buffalo Grass (*Bouteloua dactyloides*); Centipede (*Eremochloa ophiuroides*); Carpet Grass (*Axonopus*); *Cynodon* spp, including, but not limited to, *Cynodon transvaalensis* spp (spp=multiple species), *Cynodon* dactylon, *Cynodon dactylon* spp, *Cynodon dactylon* X *Cynodon transvaalensis*, and *Cynodon dactylon* x *Clathrus* (*C.*) *transvaalensis*, and *Bermuda cynodon dactylon; Zoysia* spp, including, but not limited to, *Zoysia matrella, Zoysia japonica, Zoysia matrella* x *Zoysia Japonica, Zoysia Japonica*, and *Zoysia tenuifolia*.

Section 2.0 of Detailed Description—Method Steps

Referring now to FIG. 12, this figure is a logical flowchart illustrating a method 1200 substantially fostering controlled growth, which may include regulating growth, of the C4 turf grass area. Step 1205 is the first step of method 1200 in which an autobot 102, 500, 600, 700, 800 capably of automatically applying UVC light to the target C4 grass area is provided. The autobot 102 will be referred generally as autobot 102 from this point forward. However, any of the autobots 500, 600, 700, 800 of FIGS. 5-8 previously described may be employed.

The autobot 102 is capable of automatic movement (without human intervention) across the target grass area. That is, the autobot 102 is self-propelled (i.e. has an electric motor) for moving across the target grass area and navigates on its own and defines a pattern of how it will traverse the target grass area. The autobot 102 has a GPS module 202 for establishing a geo-fence 402 that defines the target grass area, as described above.

The target grass area comprises C4 turfgrass (defined above), that includes, but is not limited to *Paspalum vaginatum*, Bahia Grass (*Paspalum notatum*); St. Augustine (*Stenotaphrum secundatum*); Buffalo Grass (*Bouteloua dactyloides*); Centipede (*Eremochloa ophiuroides*); Carpet Grass (*Axonopus*); *Cynodon* spp, including, but not limited to, *Cynodon transvaalensis* spp (spp=multiple species), *Cynodon* dactylon, *Cynodon dactylon* spp, *Cynodon dactylon* X *Cynodon transvaalensis*, and *Cynodon dactylon* x *Clathrus* (C.) *transvaalensis*, and *Bermuda cynodon dactylon; Zoysia* spp, including, but not limited to, *Zoysia matrella, Zoysia japonica, Zoysia matrella* x *Zoysia Japonica, Zoysia Japonica*, and *Zoysia tenuifolia*.

Next, in step 1210, a UVC light subsystem 116 is couple to the autobot such that the UVC light subsystem 116 is suspended above the target grass area between about 0.5 of an inch to about 18.0 inches; and preferably between about 0.75 of an inch to about 6.0 inches; and most preferably between about 1.0 of an inch to about 1.5 inches above the C4 turfgrass.

Subsequently, in step 1215, UVC light is generated by the UVC light subsystem 116 with a wavelength between about 200.0 nm and 300.0 nm; and preferably between 245.0 nm to about 275.0 nm; and most preferably between about 250.0 nm to about 270.0 nm at the C4 turfgrass.

Next, in step 1220, the UVC light is emitted/propagated by the UVC light subsystem 116 to the turfgrass at an intensity between about 0.5 Watt per square meter and 300.0 Watts per square meter; preferably between about 2.0 Watts and 50 Watts per square meter; and most preferably between about 3.0 Watts and 4.0 Watts per square meter of the C4 turfgrass.

And in step 1225, the UVC light is moved across the target grass area with the autobot 102 at night (absent sunlight) while the autobot 102 moves at a speed between about 0.1 MPH and about 7.0 MPH; and preferably between about 0.3 MPH and about 3.0 MPH; and most preferably between 0.5 MPH and about 1.0 MPH across the C4 turfgrass within the target grass area.

Next, in step 1230, applications of fertilizer to the target grass area are suspended for a predetermined number of days. The predetermined number of days to suspend fertilizer applications maybe between 1 day to 129 days. And then in step 1235, applications of fungicide treatments to the target grass area are suspended for a predetermined number of days. The predetermined number of days to suspend fungicide treatments maybe between 1 day to 129 days.

And as unexpected results of at least steps 1205-1225, in step 1240, the method 1200 may substantially control the growth of the C4 turfgrass wherein the method 1200 may reduce an average seed head presence, substantially increase shoot density, and substantially decrease clipping weight of the C4 turfgrass within the target grass area.

Specifically, the method 1200 may provide at least a 60.0% average reduction in seed head presence, and preferably, greater than 70% average reduction in seed head presence within the C4 turfgrass of the target grass area. The method 1200 may also provide increased shoot density of at least 60%, and preferably, of at least 70% within the C4 turfgrass of the target grass area. And the method 1200 may decrease clipping weight of the C4 turfgrass by at least 50.0%.

Generally, based on the unexpected results noted above, the method and system may substantially control the growth of C4 turfgrass such that a slope tracking a growth rate of the C4 turfgrass is substantially decreased compared to normal growth/growth of C4 turfgrass which does not receive UVC treatments according to at least one of seven (7) parameters noted above and described in steps 1205-1225. This controlled growth of the C4 turfgrass includes growth that is substantially regulated compared to C4 turfgrass which does not receive UVC light according to the at least one of seven (7) parameters noted above and described in steps 1205-1225.

Section 3.0 of Detailed Description—Four (4) Experiments

Demonstrating Unexpected Results**
Section 3.1—Experiment 1 of 4

UV light, in general, has been shown to have anti-bacterial, anti-viral, and anti-fungal effects. Fungal diseases commonly impact turfgrass quality and function. An experiment was conducted to determine if UVC light applied to a seashore *Paspalum* turfgrass reduces disease incidence. The experiment was conducted during the 2020 growing season at the University of Georgia Griffin Campus in cooperation with the Patten Seed Company (Assignee of the application).

An Echo Robotics™-100 Turf Mower (See FIGS. 9-11 described above) was retro-fitted to deliver UVC light by removing the mowing mechanism and installing a 20-inch by 4-inch array 116C of UVC lights suspended approximately 1.0 inch above the surface of the turf. See FIG. 10 described above which illustrates the details for light array 116C. The light array 116C delivered a light intensity of approximately 3.5 W per m2 and the robot travel ground speed was about 0.45 mph.

The robot operated continuously each night from 11 pm to 4 am (5 hours) and covered approximately 2376 ft2 per hour. The UVC light array 116C emitted UVC light at a wavelength of about 265.0 nm.

The experiment was set up as a randomized block design with two treatments, non-treated control and UVC treated, with three replications for a total of six plots containing C4 plants or C4 turfgrasses, and specifically, *Paspalum vaginatum* also referred to as seashore *Paspalum* green. Each plot measured 10.0 by 20.0 ft on an established 'SeaStar' seashore *Paspalum* research putting green mowed five days per week (weekdays only) at a height of cut of 0.125 inches. The plots were 200 ft2 and the robot covered 2376 ft2 per hour which works out to about 5.06 minutes/plot/night. (on average).

Fertilization, and fungicide treatments to the experiment areas were suspended at the onset of the experiment in an effort to promote dollar spot disease, while other routine management practices such as rolling and topdressing were applied uniformly across the test area.

Specifically, plots were lightly topdressed according to industry standards with ⅛" sand monthly and rolled bi-weekly using a Salsco model 09010 gas greens roller (Salsco, Inc., Cheshire, CT).

The grass was mowed using a Jacobson Eclipse 2-122F walking greens mower (Jacobsen Manufacturing, Rancine, WI) every week day (5 days) and not cut on weekends. Height of cut was 0.125 inches throughout the experiment.

Irrigation was controlled by a Rain Bird ESP-SMT Smart Modular Control System (Rain Bird Corp., Azusa, CA). This system integrates weather information (rainfall, temperature, evapotranspiration (ET), etc.) with historic weather information for the specific site and soil type to create an optimized irrigation schedule that promotes healthy deep-rooted plants and conserves water.

So, scheduled irrigation amounts were automatedly adjusted daily based on specific weather conditions such as rainfall and ET at the site. (Not a traditional irrigation scheduler type clock)

Plot outlines were marked in white paint and on Apr. 24, 2020 boundary guide wires and a charging station for the robot were installed. Following a few test runs, the experiment began on May 4, 2020. UVC treatments continued nightly throughout the growing season and were halted on Sep. 9, 2020. However, the various impacts of these treatments were monitored weekly until early November 2020. Data collection dates are detailed in FIG. 13 and listed in table 1300.

Documented Unexpected Results for Experiment 1 of 4

As discussed above, UVC light was expected to decrease fungal diseases in the C4 plants (i.e. C4 turfgrass comprising *Paspalum vaginatum* also referred to as seashore *Paspalum* green) generally. However, the substantial reduction in the number of dollar spot infection centers, the substantial reduction in seed head presence, the substantial increase in shoot density, and the substantial decrease in clipping weight in the C4 turfgrass comprising *Paspalum vaginatum* were very unexpected to the inventors.

Section 3.1.1—Impact of UVC Light Treatments on Dollar Spot Incidence

Figure 15:
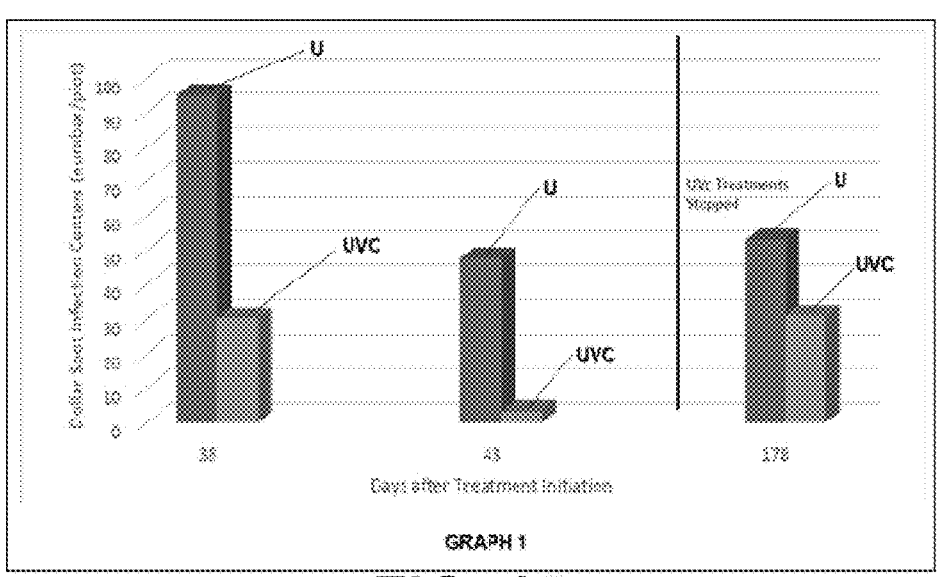
FIG. 15 provides first Graph 1 that tracks the effect of UVC treatments on a number of dollar spot infection centers in C4 turfgrasses at three dates.

Visual ratings of dollar spot infection were taken weekly on the target turfgrass areas comprising the C4 turfgrasses (i.e. warm season grasses comprising *Paspalum vaginatum*). Ratings were recorded as the percentage of the plot area showing visible disease with 0% indicating no visible disease and 100% as completely infected. Actual counts of dollar spot infection centers were made on three dates during the experiment. Graph 1 of FIG. 15 compares the counts of dollar spot infection centers between the control and UVC treated plots at 38, 43, and 178 days after treatment initiation (DATI).

See Graph 1 (FIG. 15) that illustrates an Effect of UVC treatments on number of dollar spot infection centers in C4 turfgrasses at three dates; U=control (untreated).

UVC treatment significantly (p=<0.001) reduced the number of dollar spot infection centers at all three observation dates. UVC treatment resulted in an average of a 67% reduction in number of dollar spot infection centers.

As understood by one of ordinary skill in the art, the p values as listed in this description, also referred to in the art as calculated probability, is the probability of finding the observed, or more extreme, results when the null hypothesis (H0) of a study question is true—the definition of 'extreme' depends on how the hypothesis is being tested. P is also described in terms of rejecting H0 when it is actually true, however, it is not a direct probability of this state. Most authors refer to statistically significant as P<0.05 and statistically highly significant as P<0.001 (less than one in a thousand chance of being wrong).

Although the average diameter of infections in the turfgrass was not measured, it was generally observed that UVC treated plots of the turfgrass had smaller infection diameters than the non-treated control plots. The UVC treatments in the turfgrass were ceased at 128 days after treatment initiation (DATI), however, the number of disease infection centers in the turfgrass recorded on DATI 178 indicated continued suppression of disease 50 days after treatment had ended.

Figure 16:
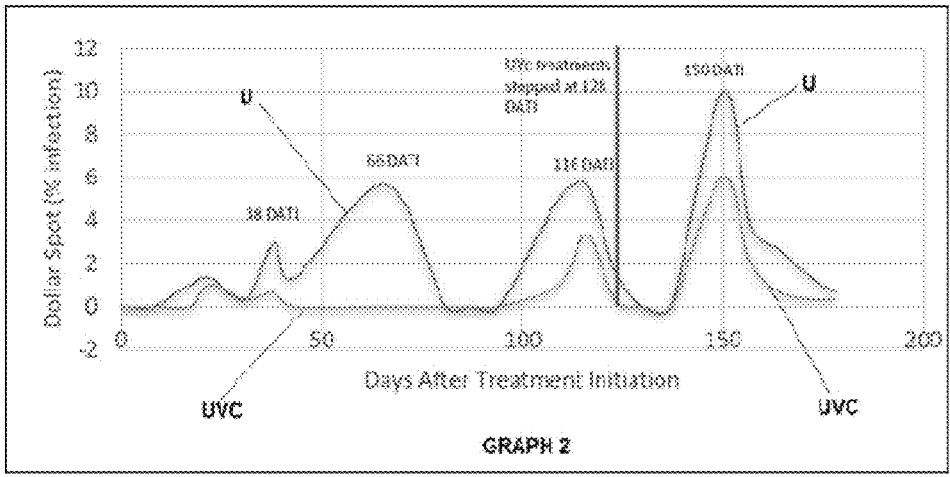
FIG. 16 provides second Graph 2 that tracks an impact of UVC treatment on occurrence of dollar spot on a seashore *Paspalum* green.

A summary of treatment differences in visual estimates of percentage infection with dollar spot in the turfgrass for the duration of the experiment are shown in Graph 2 of FIG. 16. Overall, dollar spot incidence in the experimental turfgrass was relatively low throughout the experiment with visual estimates of percent infection ranging from 0 to 10 percent. Mild disease infection outbreaks occurred in the turfgrass at 38, 66, 116 and 150 DATI. UVC treatment appeared very effective in suppressing dollar spot on the 66 DATI date. At this date, the percent disease for the non-treated control was 5.7% compared to 0% in the UVC treated plots.

UVC reduced disease incidence in the turfgrass at the 116 DATI by 41% but did not provide complete control. Interestingly, significant disease suppression was documented in the turfgrass at 150 DATI and 22 days after termination of UVC treatments (See Graph 2 of FIG. 16). When averaged over the entire duration of the experiment, UVC treatment resulted in about a 63.0% reduction of dollar spot incidence in the turfgrass, which was surprising and unexpected. The 63.0% reduction of dollar spot incidence in the was surprising and unexpected.

See Graph 2 (=FIG. 16) that illustrates an Impact of UVC treatment on occurrence of dollar spot on a seashore *Paspalum* green; U=control (untreated).

Section 3.1.2—Impact of UVC Treatments on Turf Appearance and Quality.

Turf quality was measured approximately weekly throughout the duration of the experiment using two methods. Normalized Difference Vegetative Index (NDVI) was measured using a handheld NDVI meter (Green Seeker Crop Sensor). Three images were also taken within each plot weekly using a digital camera fitted in a light box to ensure uniform lighting. Digital images were processed using Turf Analyzer and Field Analyzer software (https://www.turfanalyzer.com/) to provide estimates of percent green cover. Software settings for Field Analyzer were (67, 360, 0, 100, 0, 100).

NDVI scores for the UVC treated plots of the turfgrass initially trended slightly below the controls, but after about 30 days UVC plots of the turfgrass visually appeared to have better quality than the control plots of turfgrass. Photographs taken of the UVC treated plots of turfgrass and the control plots of turfgrass showed the UVC treated plots to have a more "green" color while the control plots (untreated) projected a light "brown" color and less green in color compared to the UVC treated plots.

Figure 17:
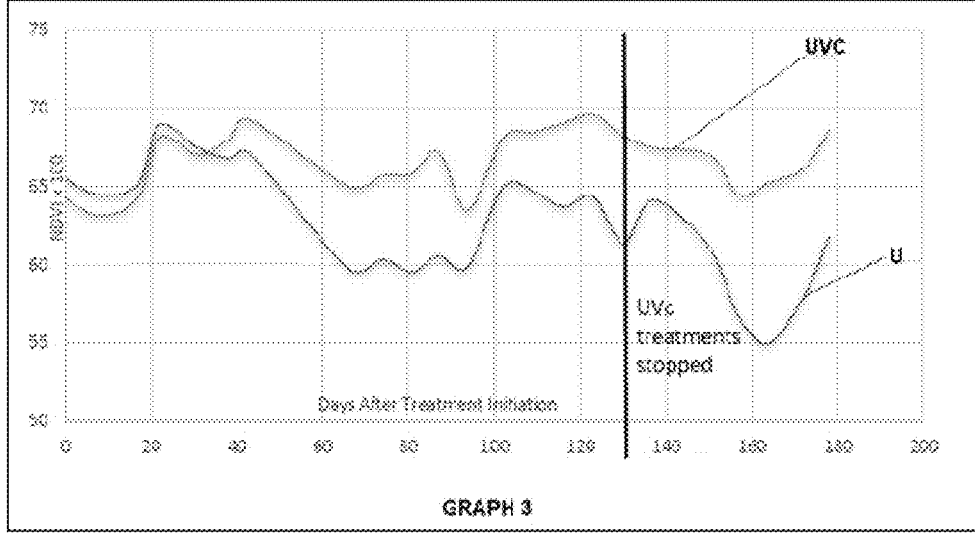
FIG. 17 provides third Graph 3 that tracks a comparison of normalized difference vegetative Index (NDVI) scores for non-treated control plots (U) and UVC treated plots (UVC) on a seashore *Paspalum* green from early May until late October 2020.

This trend continued throughout the duration of the experiment with the turf quality of UVC plots appearing dramatically better than quality of the non-treated control turfgrasses. NDVI scores were not statistically different from the non-treated controls until DATI 38 when NDVI scores of UVc treated plots of turfgrass were about 2% higher than the controls (p=<0.0124). All dates afterward showed very highly significant differences (usually p=<0.0001) in NDVI scores favoring UVc treated plots (See Graph 3 of FIG. 17).

See Graph 3 (=FIG. 17) that tracks a Comparison of Normalized Difference Vegetative Index (NDVI) scores for non-treated control plots (U) and UVC treated plots (UVC) on a seashore *Paspalum* green from early May until late October 2020; U=control (untreated).

Figure 18:
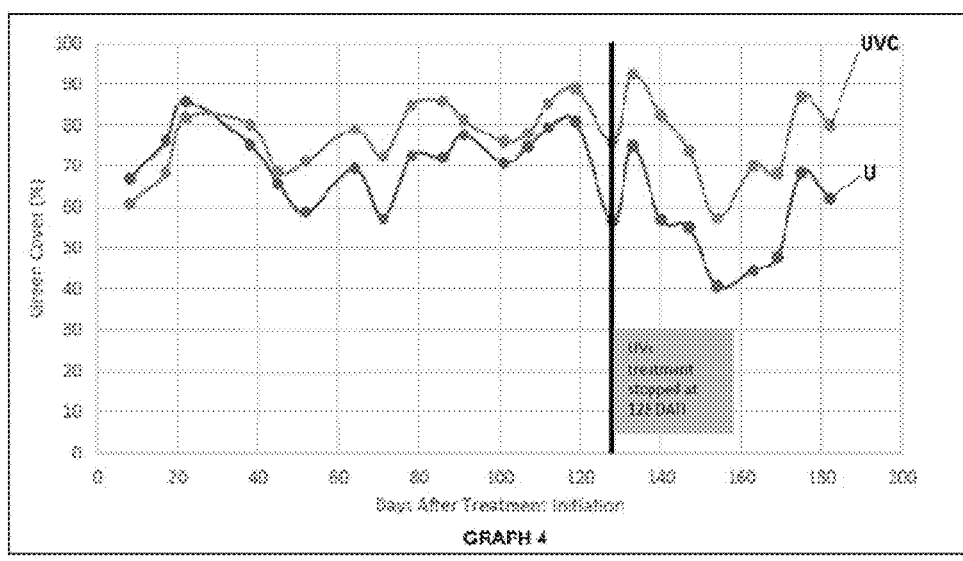
FIG. 18 provides a fourth Graph 4 that tracks a comparison of percent green cover (GC %) for un-treated control plots (U) and UVC treated plots (UVC) on a seashore *Paspalum* green from early May 2020 until early November 2020.

Turf quality trends throughout the life of this experiment as documented by digital image analysis were largely in agreement with NDVI scores discussed above and listed in Graph 3. Estimates of green cover are presented in Graph 4 of FIG. 18. Green cover % (GC %) ratings for the UVC treated plots of turfgrass initially trended significantly below the controls, but after about 30 days UVC plots of the turfgrass visually appeared to begin to improve in quality when compared to the control turfgrasses.

By 38 DATI, GC % ratings for UVC plots of the turfgrass were significantly better than ratings of the control turfgrasses (p=<0.0001). This trend continued throughout the duration of the experiment with the GC % scores of the UVC plots of turfgrass consistently trending higher than scores of the non-treat controls (See Graph 4 of FIG. 18). All dates afterward showed very highly significant differences (usually p=<0.0001) in GC % scores favoring UVc treated plots (See Graph 4).

Season-long averages for non-treated control plots and UVC treated plots were 66.3% and 77.1%, respectively. Overall, UVC treated plots showed a 16.3% improvement in estimates of green cover percentage compared to the non-treated control plots of the turfgrass. Interestingly, this trend of improved turf quality as documented both by NDVI and analysis of digital images continued well beyond the termination of UVC treatments at 128 DATI.

In the case of GC % estimated by digital images, strong statistical differences (p=<0.0001) showed marked improvement due to UVC treatment 54 days after termination of UVC treatments. This data provides strong evidence for persisting impacts on turf quality from daily robotic application of UVC light on warm season turfgrasses which may comprise seashore *Paspalum* green.

See Graph 4 (=FIG. 18) that tracks a Comparison of Percent Green Cover (GC %) for un-treated control plots (U) and UVC treated plots (UVC) on a seashore *Paspalum* green from early May 2020 until early November 2020. Estimates of GC % were calculated from digital images using Turf Analyzer software; U=control (untreated).

Section 3.1.3—Impact of UVC Treatments on Abundance of Seed Heads in C4 Turfgrass.

As noted previously, another unexpected finding of this experiment was a readily observable reduction in abundance of seed heads during times of flowering in UVC treated plots of turfgrass comprising the C4 plants (i.e. the warm season turfgrass comprising *Paspalum vaginatum*) as compared to non-treated control plots of warm season turfgrass comprising *Paspalum vaginatum*.

Figure 19:
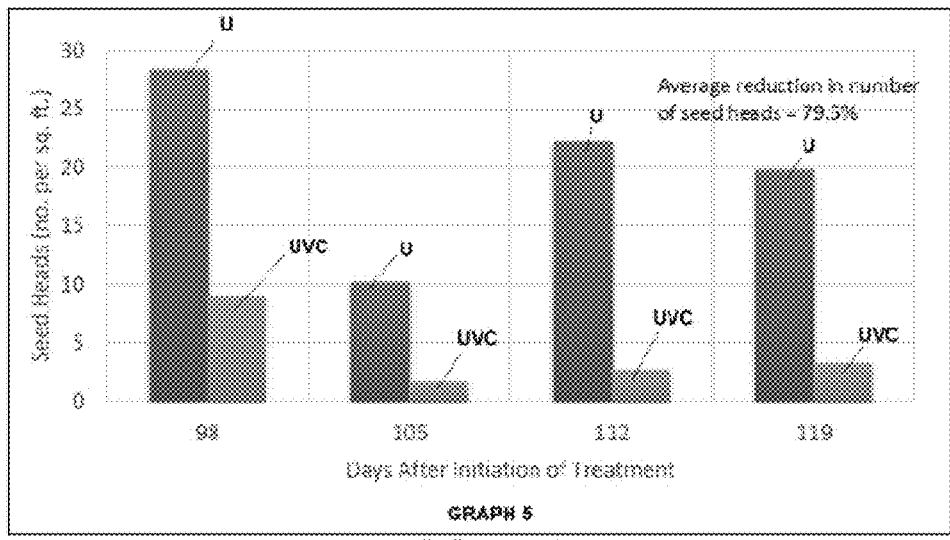
FIG. 19 provides a fifth Graph 5 that tracks a comparison of *Paspalum* seed head counts between UVC treated and non-treated control plots (U) taken at four dates during 2020 growing season.

To quantify this unexpected finding, the number of seed heads present were visually counted at three randomly sampled areas within each plot of the turfgrass. Sample areas were 6-inch circles each 0.785 ft2 in area. Counts were taken on Monday's following two days without mowing and at four times over the duration of the experiment. Mean numbers of seed heads present from these counts are shown in Graph 5 of FIG. 19.

See Graph 5 (=FIG. 19) that tracks a Comparison of *Paspalum* seed head counts between UVC treated and non-treated control plots (U) taken at four dates during 2020 growing season; U=control (untreated).

The numbers of seed heads present in UVC plots were dramatically reduced at all dates measured as compared the number present in non-treated control plots (p=<0.0001) of the warm season C4 turfgrass. The average reduction in seed head presence across all four sample dates due to UVC treatment was 79.5%. This 79.5% magnitude in average reduction in seed head presence in the warm season C4 turfgrass comprising *Paspalum vaginatum* was an unexpected finding that resulted in a dramatic improvement in overall appearance and quality in the C4 turfgrass.

Section 3.1.4—Impact of UVC Treatments on C4 Grass Shoot Density.

Yet another unexpected finding of this experiment was an increase in shoot density in UVC treated plots of the C4 turfgrass as compared to non-treated control plots of the C4 turfgrass. To quantify this finding, we manually counted the number of individual vegetative shoots present at three randomly sampled areas within each plot of the C4 turfgrass at four different sample dates across the duration of the experiment. Samples were 1.0-inch plugs taken with a standard soil probe, 0.785 inches2 in area. Raw counts were converted to shoots per square inch and are presented in Graph 6 (=FIG. 20).

Figure 20:
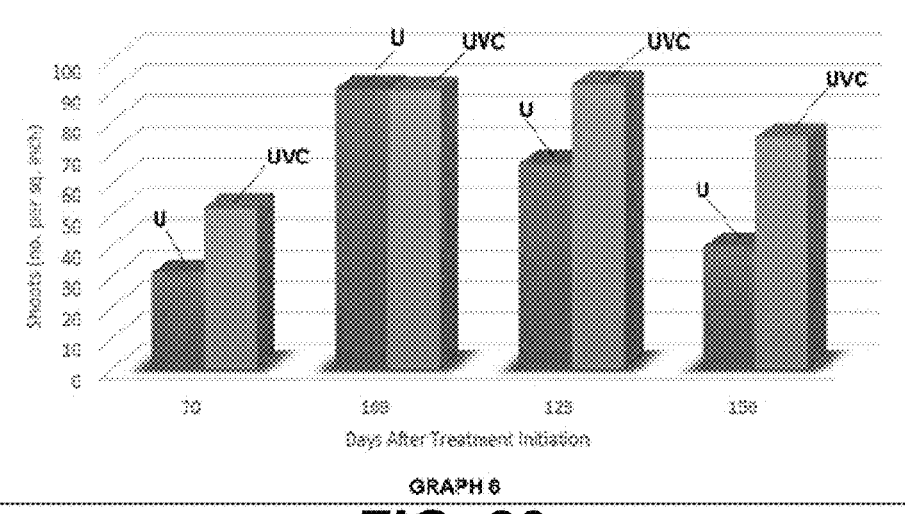
FIG. 20 provides a sixth Graph 6 that tracks a comparison of *Paspalum* vegetative shoot density between UVC treated and non-treated control (U) plots of C4 turfgrass at four dates during the 2020 growing season.

Shoot density was significantly increased in UVC treated plots of the C4 turfgrass at two of the four sampling dates (FIG. 20). Samples taken at 70 DATI indicated 67% higher shoot density (p=0.0006) in UVC treated plots of the C4 turfgrass as compared to the control plots of C4 turfgrass. Samples taken at 109 days after initiation of UVC treatments were numerically similar and not statistically different. At 123 DATI shoot density was 38% higher in UVc treated plots but not significantly different than the controls (p=0.1038).

Shoot density at 150 DATI and 22 days after termination of UVc treatments were 89% higher in UVC treated plots of the C4 turfgrass than in non-treated control plots of the C4 turfgrass and statistically different (p=0.0006) (See Graph 6=FIG. 20). When averaged over all sampling dates, shoot density in UVc treated plots was 35.8% higher than in non-treated control plots.

See Graph 6 (=FIG. 20) that tracks a Comparison of *Paspalum* vegetative shoot density between UVC treated and non-treated control (U) plots of C4 turfgrass at four dates during the 2020 growing season; U=control (untreated).

Section 3.1.5—Impact of UVC Treatments on Shoot Growth in the C4 Turfgrass.

Yet another unexpected finding of this experiment was a dramatic decrease in shoot growth observed in UVC treated plots of the C4 turfgrass when compared to non-treated control plots of the C4 turfgrass. To quantify this finding, mower clippings were collected from all plots of the C4 turfgrass over a period of several weeks. Clippings were collected from a single pass of the greens mower (22-inches wide) along the entire length of each plot (20 feet).

The resulting fresh clippings from the plots of C4 turfgrass were placed in labeled paper bags and dried in a forced air oven at about 50.0 C for about 48.0 hours and then weighed after allowing them to cool. Samples were collected at each mowing Monday through Friday but not on the weekends when plots were not mowed. Samples were collected for week 15 and weeks 18-21 of the experiment.

See Graph 7 (=FIG. 21) that tracks a Comparison of daily dry clipping weights from UVC and non-treated control plots (U) taken from a seashore *Paspalum* green the week of Aug. 10, 2020 (week 15); U=control (untreated).

Figure 21:
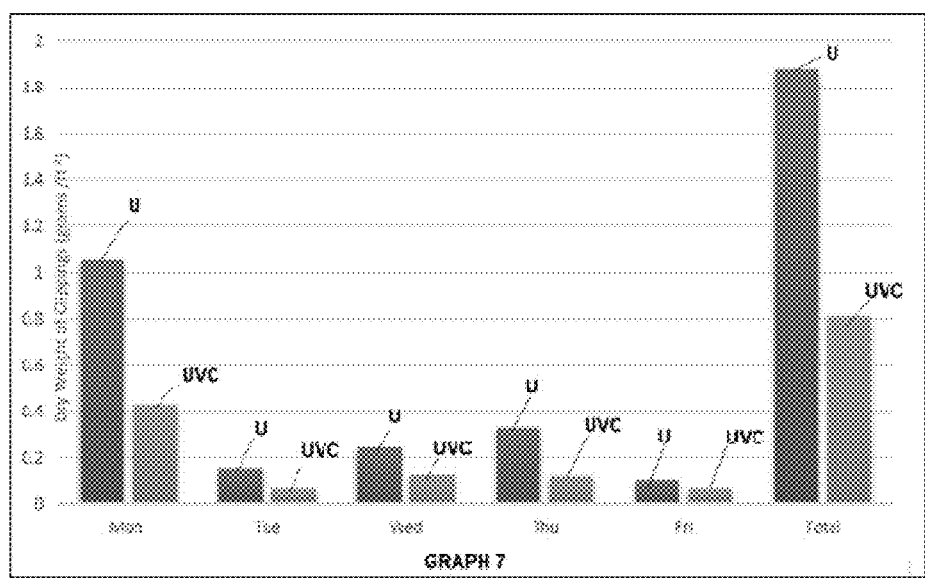
FIG. 21 provides a seventh Graph 7 that tracks a comparison of daily dry clipping weights from UVC and non-treated control plots (U) taken from a seashore *Paspalum* green the week of Aug. 10, 2020.

The dry weight of clippings harvested each day of the 15th week (August 10-14) are presented in Graph 7 (=FIG. 21). Logically clip weights were highest on Monday, following two consecutive days without mowing. Dry clipping weights were significantly lower in UVC treated plots each day. The weekly totals for dry clipping weights were significantly reduced (p=0.0216) by 56.8 percent in UVC treated plots of C4 turfgrass as compared to the control plots of C4 turfgrass (see Graph 7=FIG. 21).

Figure 22:
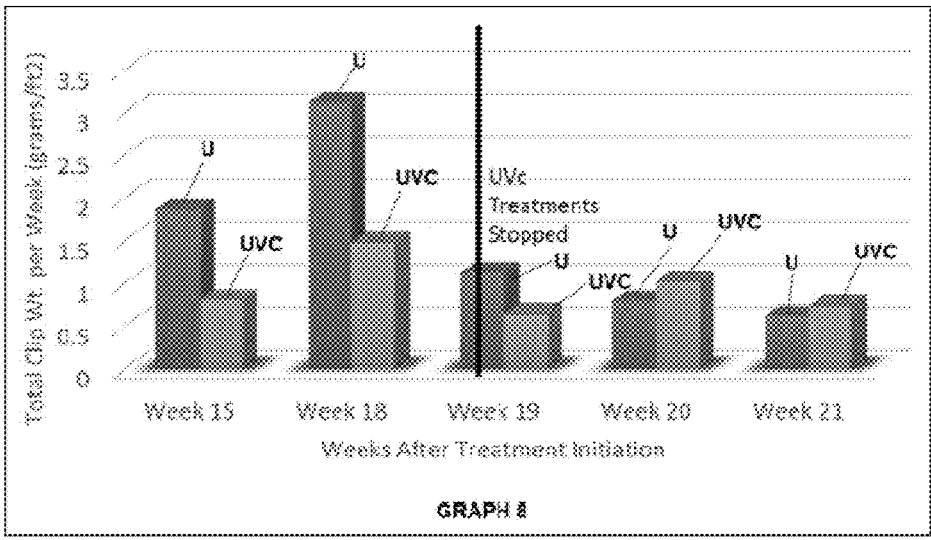
FIG. 22 provides an eight Graph 8 that tracks a comparison of weekly clipping weights from UVC and non-treated control plots (U) of C4 turfgrasses recorded at five different weeks during the 2020 growing season.

Weekly treatment totals of dry clipping weights taken during weeks 15, 18, 19, 20, and 21 are presented in Graph 8 (=FIG. 22). UVC treatments in the C4 turfgrasses were terminated during week 19. Clipping weights taken during UVC treatment (weeks 15, 18, and 19) all showed significant reductions in UVC treated plots of the C4 turfgrasses (p=0.0216, p=0.0093, and p=0.0169, respectively) with reductions of 56.8%, 52.2%, and 42.7%, respectively when compared to the non-treated control plots of C4 turfgrasses (See Graph 8 below=FIG. 22).

Clipping weights measured after termination of UVC treatment (weeks 20 and 21) were numerically higher, although not significantly different, in UVC treated plots of the C4 turfgrasses as compared to the control plots of the C4 turfgrasses indicating a slight "rebound" effect in the UVC treated plots of C4 turfgrasses after treatments were halted.

See Graph 8 (=FIG. 22) that tracks a Comparison of weekly clipping weights from UVC and non-treated control plots (U) of C4 turfgrasses recorded at five different weeks during the 2020 growing season; U=control (untreated).

Section 3.1.5—Impact of UVC Treatments on Ball Roll Distance for C4 Grasses.

Considering the changes observed in growth habit associated with the UVC light treatments as noted above, measurements were made to determine if these improvements in growth and appearance also impacted green performance in terms of improved ball roll distance (green speed) in the experimental C4 turfgrasses. A U.S. Golf Association (USGA) Stimpmeter® was used according to the Stimpmeter instruction booklet developed by the USGA and available online at the USGA Webpage https://www.usga.org/content/dam/usga/pdf/imported/StimpmeterBookletFINAL.pdf.

Figure 23:
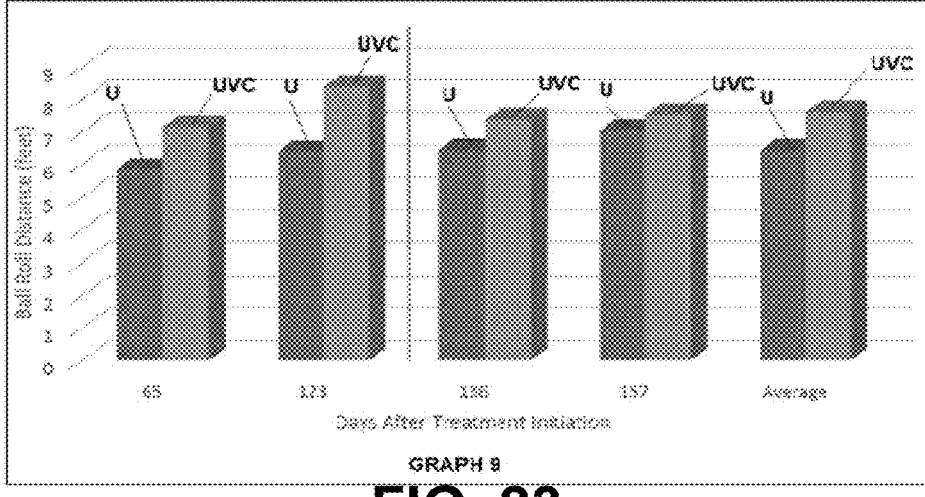
FIG. 23 provides a ninth Graph 9 that tracks an effect of UVC treatment on stimp ratings taken at four dates on C4 warm season grasses comprising *Paspalum vaginatum* during 2020.

Stimp readings were taken on each plot on four different occasions during the experiment. Graph 9 (=FIG. 23) graphically displays the results of these measurements as well as the average across the four measurements. Ball roll distance was significantly increased in UVC treated plots of the C4 turfgrasses at 65, 123, and 136 DATI (p=0.0459, p=<0.0001, p=0.0022, respectively) when compared to the non-treated control plots. At 157 DATI, ball roll was 0.5 feet greater in UVC treated plots of the C4 turfgrasses but was not statistically different from the non-treated control plots of the C4 turfgrasses. When averaged over all measurement dates, ball roll distance in UVC plots of the C4 turfgrasses was 1.2 feet or 18.8% greater than in non-treated control plots of the C4 turfgrasses.

See Graph 9 (=FIG. 23) that tracks an Effect UVC treatment on Stimp ratings taken at four dates on C4 warm season grasses comprising *Paspalum vaginatum* during 2020. The black vertical line represents the date of termination of UVC treatments; U=control (untreated).

Section 3.1.6—Discussion for Experiment 1 of 4

This experiment was highly successful in that it clearly met its objective by documenting that routine delivery of UVC light by a robot reduces the incidence of dollar spot on warm season C4 turfgrasses comprising seashore *Paspalum* green. One significant limitation of the experimental design used for this research was the lack of a control treatment to allow us to differentiate between the effects of UVC light and the effects of traffic imposed by the robot.

It is very likely that frequent light traffic imposed by the robot is responsible for observations of improved surface firmness and improved ball roll distance. Traffic could also be a contributing factor in increased shoot density and substantially regulating growth of the turf grass. Additionally, it is feasible that traffic could be a contributing factor in reducing disease by reducing the duration of leaf wetness.

Provisions have already been made to allow for an additional treatment of "traffic only" for future field research experiments.

Treatment with UVC light was halted in early September 2020 after it was discovered that some light arrays on the robot were not functioning. Graph 2 listed above documents dollar spot incidence throughout the duration of the experiment and indicates complete suppression of dollar spot at 66 DATI but only a significant reduction in dollar spot at 116 DATI. It is possible that reduced light intensity may have occurred earlier, gone unnoticed, and be associated with the limited suppression of disease in UVc treated plots at 116 DATI. Additional field and laboratory research will likely be necessary to accurately predict disease suppression levels.

Section 3.1.7—Summary for Experiment 1 of 4

An Echo Robotics™-100 Turf Mower retro-fitted to automatically deliver UVC light to warm season C4 turfgrass comprising *Paspalum vaginatum* (also referred to as seashore *Paspalum* green) on a nightly basis was tested for its ability reduce the incidence of dollar spot disease. UVC treatments reduced the number of dollar spot infection centers by at least 67.0% and the overall dollar spot incidence by at least 63.0% when compared to non-treated controls of C4 turfgrass.

Turf quality was monitored throughout the duration of the experiment primarily due to concerns of phytotoxicity associated with repeated exposure to UVC light. Initial, but minimal, decline was noted in turf quality in UVC light treated plots. This initial decline in turf quality was attributed to a traffic effect of the robot rather than exposure to UVC light. After approximately 30 days of UVC treatment, a significant and continued improvement was observed in turf quality for the duration of the experiment. That improvement in turf quality was significant and documented by both NDVI measurements and digital image analysis. In addition, the UVC enhanced turf quality and disease suppression persisted for more than seven weeks after UVC treatments had ended. The finding of improved turf quality in the warm season C4 turfgrass was unexpected.

Another unexpected finding of this experiment was that UVC treatment of the C4 turfgrass comprising *Paspalum vaginatum* resulted in 'growth regulatory' effects on the C4 turfgrass. In other words, growth of the C4 turfgrass was substantially regulated. The clipping weights noted above reflected this growth regulation. That is, significant reductions in growth (approximately 50%) as measured by clipping weights on samples collected during active UVc treatment were unexpected. One of the most surprising results was a readily observable reduction (at least a 79.5% decrease) in abundance of seed heads during flowering. An improvement in shoot density was also documented at three of four sampling dates. UVc treatment also improved green surface firmness by 19.0% were documented (See Experiment 2 of 4 in Section 3.2 and FIG. 14) and ball roll distance of the C4 turfgrass was also improved by at least 19.0%.

Thus, the method described above may provide at least a 50.0% average reduction in number of dollar spot infection centers, and preferably, greater than a 60% average reduction in number of dollar spot infection centers within the C4 turfgrass of the target grass area.

The method may further provide at least a 60.0% average reduction in seed head presence, and preferably, greater than 70% average reduction in seed head presence within the C4 turfgrass of the target grass area. The method may also provide increased shoot density of at least 60%, and preferably, of at least 70% within the C4 turfgrass of the target grass area. And the method may decrease clipping weight of the C4 turfgrass by at least 50.0%.

From the method described above, the inventors have discovered the following seven (7) parameters that may contribute to these unexpected results in warm season C4 turfgrass:

a) applying UVC light to warm season C4 turfgrass between about 250.0 nm and about 270.0 nm, and preferably between about 254.0 nm and about 265.0 nm, and preferably at about 265.0 nm;

b) applying the UVC light to the C4 turfgrass within the ranges listed above during night time (absent sunlight);

c) applying the UVC light to the C4 turfgrass with an intensity between about 3.0 and 4.0 W per M2, and preferably at about 3.5 W per square meter;

d) applying the UVC light to the C4 turfgrass at a height above the C4 turfgrass between about 0.5 inch to about 1.5 inches, and preferably at 1.0 inch above the C4 turfgrass;

e) applying the UVC light to the C4 turfgrass at a rate traversing the C4 turfgrass of between about 0.1 Mph to about 1.0 Mph, and preferably between 0.3 Mph to about 0.6 Mph, and most preferably at 0.45 Mph;

f) applying the UVC light noted above using an automatic robot at night (absent sunlight); and g) applying the UVC light to the C4 turfgrass without applying any fertilizer and without applying any fungicide treatments.

Section 3.2—Experiment 2 of 4

Figure 14:
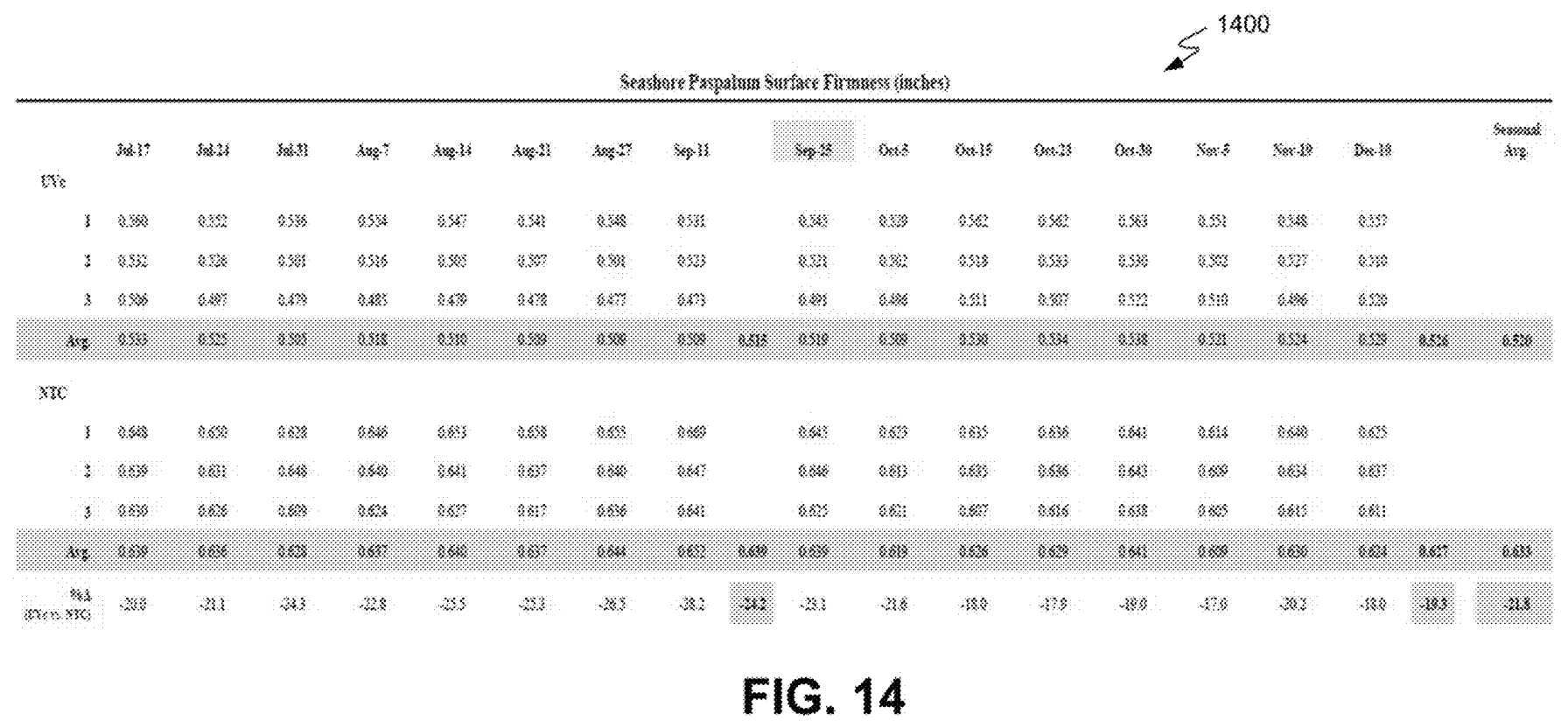

Table 1400 of FIG. 14 lists the green surface firmness data recorded for the target grass areas of Experiment 1 of 4. The data was produced using a device known as of this writing as the USGA TruFirm device. As known to one of ordinary skill in the art as of this writing, the USGA TruFirm device has an incorporated accelerometer, not subject to mechanical wear, that measures how fast the "hammer" comes to rest. The USGA TruFirm device was specifically developed to recreate golf ball impacts, and thus assist in preparation and monitoring greens for consistent tournament play day in and day out. Based on this measurement, which is highly reproducible and accurate, a penetration value can be calculated.

Each plot of Experiment 1 was segmented into nine areas (front-left, front-center, front-right, middle-left, middle-center, middle-right, back-left, back-center, and back right) with one random drop in each area. The surface firmness average for each plot consisted of nine total measurements randomly taken within each of the areas.

For each sampling date, measurements were taken from a representative spot within the areas. The exact same spot was not repeatedly sampled throughout the time data were collected. Repeated sampling of the same, exact spot would have compacted the soil and given erroneous data. Appendix A provides relevant weather data over the data collection dates (i.e. from May 4, 2020 through Sep. 9, 2020) for Experiment 1 and Experiment 2. In the description and claims of the present application, each of the verbs "comprise," "include" and "have," and conjugates thereof, are used to indicate that the object or objects of the verb are not necessarily a complete listing of members, components, elements, or parts of the subject or subjects of the verb.

Section 3.3—Experiment 3 of 4

Report for Controlled Environment Study on Effects of UV-C

Background

The unexpected effects of UV-C light on turfgrass growth were previously documented under field conditions. If this effect can be replicated in a growth chamber and what effect UV-C dosage has on plants requires further investigation. Previous research on how plants react to UV radiation has largely focused on the damaging effects of UV radiation, but the potential beneficial effect on growth habit, particularly when considering low doses and different wavelengths (i.e. UV-C) have not been sufficiently explored.

Objectives:

Test the effects of UV-C light treatment on turfgrass growth and performance, and generate a dose response curve in seashore *Paspalum* (*Paspalum vaginatum*) under UV-C treatment.

Methods:

Seastar plants harvested from mature field plots and transplanted into pots with a sand-based rootzone and allowed to establish for three weeks. After establishment in the greenhouse, plants were transferred to the Envirotron facility and placed in growth chambers (Conviron) set to 28/20° C. day/night, 60% RH and 14 h photoperiod (600 µmol PAR). UV-C treatments were initiated after plants finished a one-week acclimation in the growth chambers. A total of 7 replicates were used per treatment with 3 replicates being destructively harvested at the midpoint (4 weeks) while the remaining 4 at the trial's conclusion (8 weeks). Treatments consisted of control (no UV-C), 6 seconds, 1 minute, 6 minutes and 30 minutes, which were applied daily after the daylight period ended for duration of the 8 week experiment. The UV-C light array was ~5 cm from the top of the turf canopy with an intensity of ~0.3 mW/cm2. Weekly measurements of turf quality ratings (TQ), digital image analysis, clipping yield and pigment contents were performed. At the 4th week and 8th week, pots were destructively harvested, to determine tiller density and total above, below ground biomass. Additionally during the 8th week, prior to destructive harvest, chlorophyll fluorescence data was taken to assess photosynthetic efficiency.

TQ was used to evaluate overall performance of the turfgrass based on a 1 to 9 scale with 1 representing brown dead grass, 6 representing the minimum-acceptable-quality grass while 9 being completely healthy grass. Ratings are based on leaf and canopy color, uniformity and density. Digital image analysis was conducted using a digital camera, custom LED light box, and analyzed in Image J to determine percent green cover of the canopy.

Clipping yield was determined by clipping each plant to 1 cm and putting the resulting biomass into an oven at 70° C. until dry and subsequently weighed.

Pigment content was measured using a dimethyl sulfoxide extraction and read on a spectrophotometer. The absorbance values at 665, 649 and 480 nm were measured and converted to chlorophyll and carotenoid content on dry weight basis via the formulas derived from Wellburn (1994).

Chlorophyll fluorescence was measured using an OSP 5+ chlorophyll fluorometer. Light adapted measurements were used to estimate electron transport rates (ETR) under steady state conditions, as well as dark adapted measurements to estimate maximum potential photochemical efficiency (Fv/Fm), as well as quantum yield of electron transport from Qa to final PSI acceptors (φRo), and absorbed photon flux per excited cross section of PSII (ABS/CSm).

Shoot density was measured by extracting a ~5.0 cm diameter core from each pot, counting the tiller number of the resulting core and presenting data on the basis of surface area. Above and below ground biomass were obtained by separating the above and belowground biomass, washing them, and then placing them in the over at 70° C. for determination of dry weight.

Results

Figure 24:
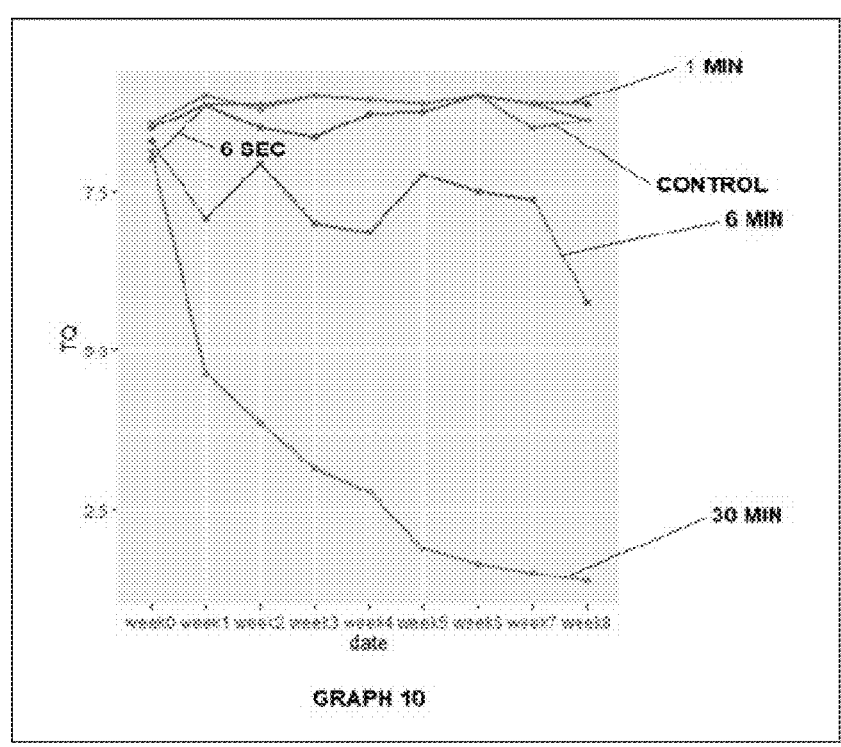
FIG. 24 provides an tenth Graph 10 that tracks weekly measurements of turf quality ratings (TQ) for at least eight weeks (week 0 to week 8)

TQ:Main effects (treatment and date) and the interaction effect were all significant. No difference in TQ existed among treatments in week 0. However, afterwards 30 min and 6 min treatments both presented significantly lower TQ scores than control throughout 8 weeks of UV-C application; no difference existed among 6 s, 1 min and control (with the exception of a slight decline in quality during week 3 for the 1 min treatment). Ultimately, the control, 6 s and 1 min all maintain exception turf quality throughout the trial, with 6 min seeing moderate damage, and 30 minutes experiencing severe damage to the point of near total canopy death. See Graph 10 of FIG. 24 that shows results.

Figure 25:
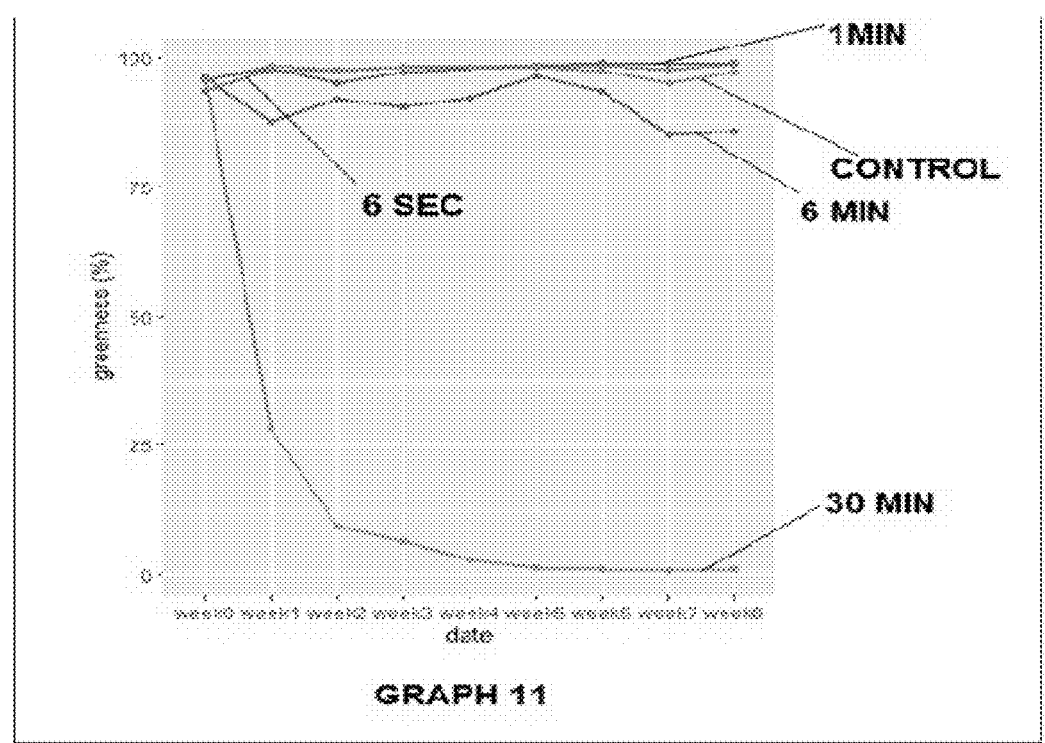
FIG. 25 provides an eleventh Graph 11 that tracks a digital image analysis of percent green cover for at least eight weeks (week 0 to week 8)

Percent Green Cover: Digital image analysis of percent green cover showed similar responses among treatments as TQ. Main effects and the interaction effect were are all significant. There was no difference among treatments in week 0. After the initiation of UV-C, both 30 min and 6 min had significantly lower greenness compared to control within each week, with the 30 min treatment experience severe damage. No difference existed among 6 s, 1 min and control except that during week 7, 1 min showed significantly greater percent green cover than control. See Graph 11 of FIG. 25 listing these results.

Figure 26:
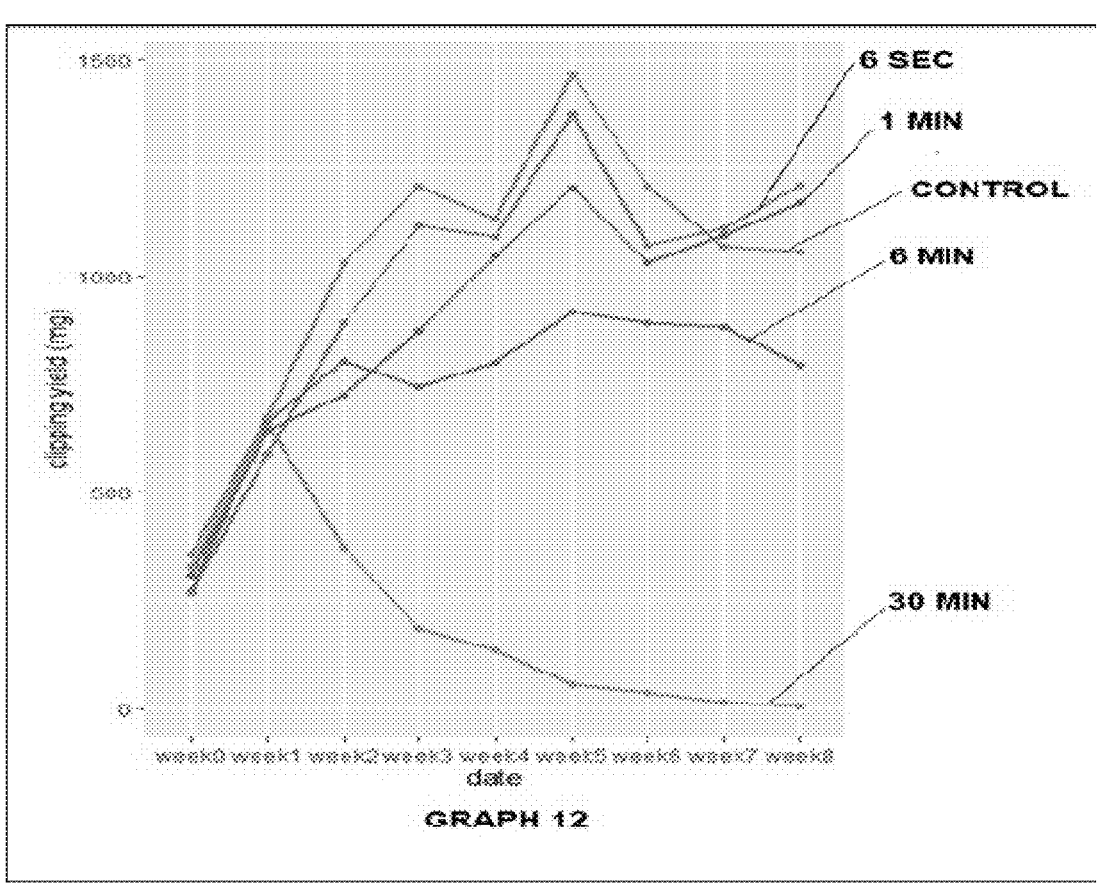
FIG. 26 provides a twelfth Graph 12 that tracks clipping yield in (mg) over a course of time of at least eight weeks (week 0 to week 8)
Figure 27:
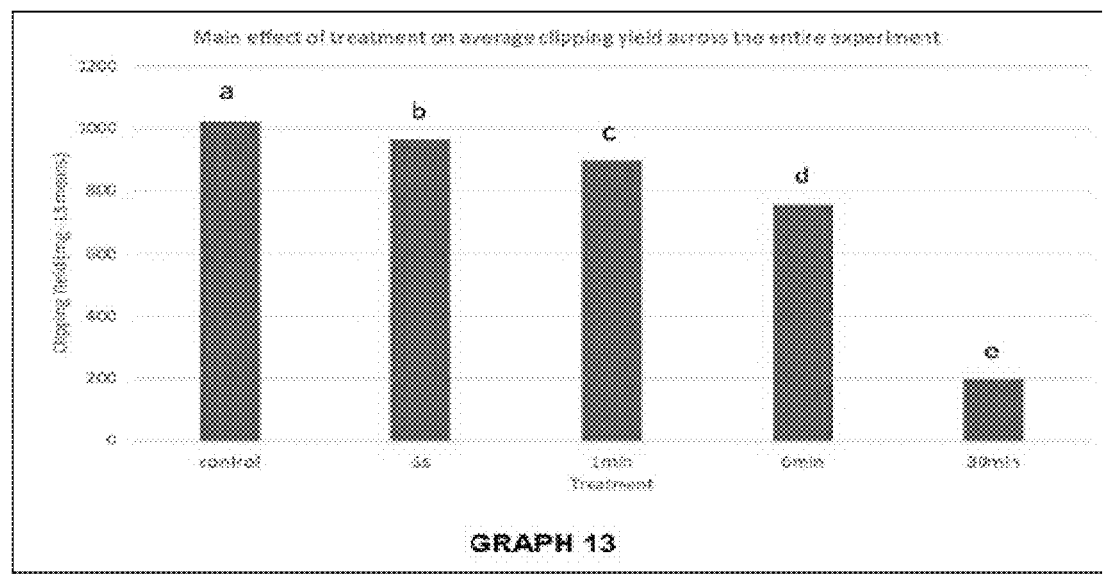
FIG. 27 provides a thirteenth Graph 13 that tracks a main effect of treatment on an average clipping yield across the entire experiment.

Clipping yield: Main effects (treatment and date) and their interaction effect were all significant. Clipping yields remained similar among treatments through 1 week of treatment. However, afterward significant differences were detected among treatments. Specifically, both 30 min and 6 min presented significantly lower clipping yield than control during week 2 through week 8 (with the exception of the 6 min treatment compared to the control during week 7). Additionally, 1 min showed a decline in clipping yield relative to control in weeks 2, 3, 5 and 6. Perhaps most interesting is looking at clipping yield main effects (irrespective of date) in which a clear dose dependent effect is seen on clipping yields based on UVC treatment. See Graphs 12-13 of FIGS. 26-27 with these results.

Figure 28:
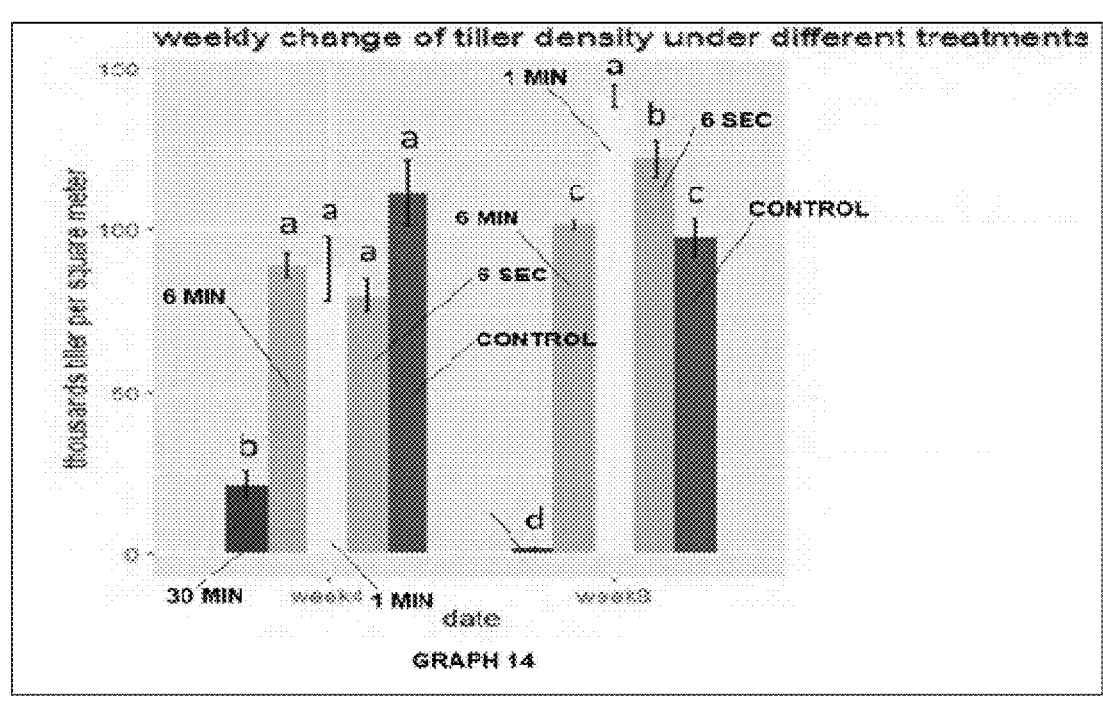
FIG. 28 provides a fourteenth Graph 14 that tracks a weekly change of tiller density for the subject grass under different treatments.

Tiller density: During week 4, 30 min decreased tiller density significantly while no significant differences existed among other treatments. During week 8, 30 min still had the lowest tiller density; both 1 min and 6 s increased tiller density significantly compared to control with 1 min having the highest value followed by 6 s; no difference was observed between 6 min and control. See Graph 14 of FIG. 28 with these results.

Figure 29:
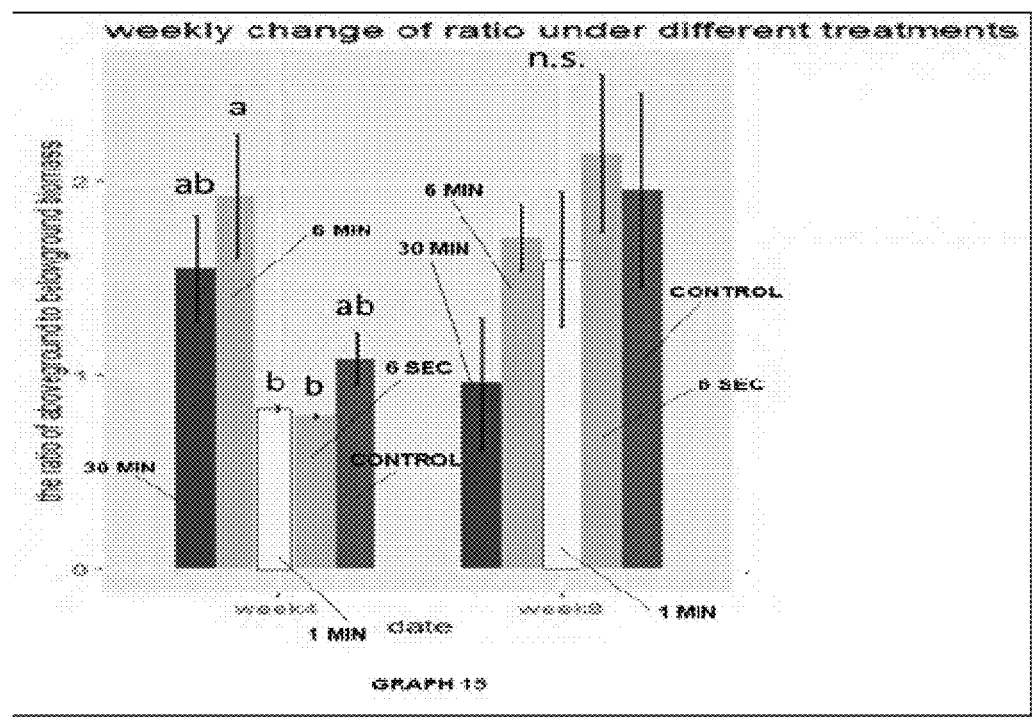
FIG. 29 provides a fifteenth Graph 15 that tracks a ratio of aboveground to belowground biomass among treatments to the subject grass.

Ratio of Above: Below-ground biomass: At week 4, no significant differences existed between any treatment and the control, however there was a trend for the lower UV-C treatments (6 s and 1 min) to have lower ratios compared to the damaging higher levels (e.g. 6 min). At week 8, there was no difference in the ratio of aboveground to belowground biomass among treatments, but there is the possibility that plant roots reaching the bottom of the pots would have effecting normal growth patterns by this stage of the experiment. See Graph 15 of FIG. 29 with these results.

Figure 30:
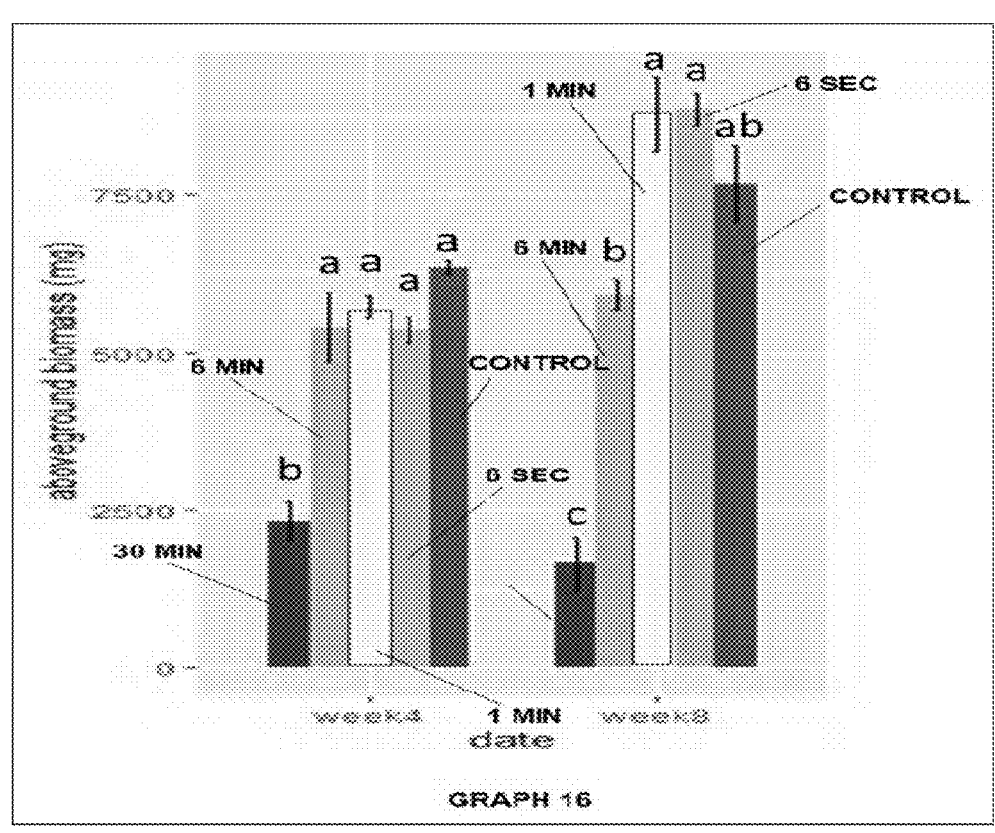
FIG. 30 provides a sixteenth Graph 16 that tracks aboveground biomass of the subject grass.

Aboveground biomass: Within both week 4 and week 8, 30 min consistently presented a significantly lower aboveground biomass than the control while no significant differences were found between any other treatments and the control. In week 8, 6 min showed significantly lower biomass compared to 1min and 6 s treatments. These differences in aboveground biomass are likely strongly related to changes in canopy density. See Graph 16 of FIG. 30 with these results.

Figure 31:
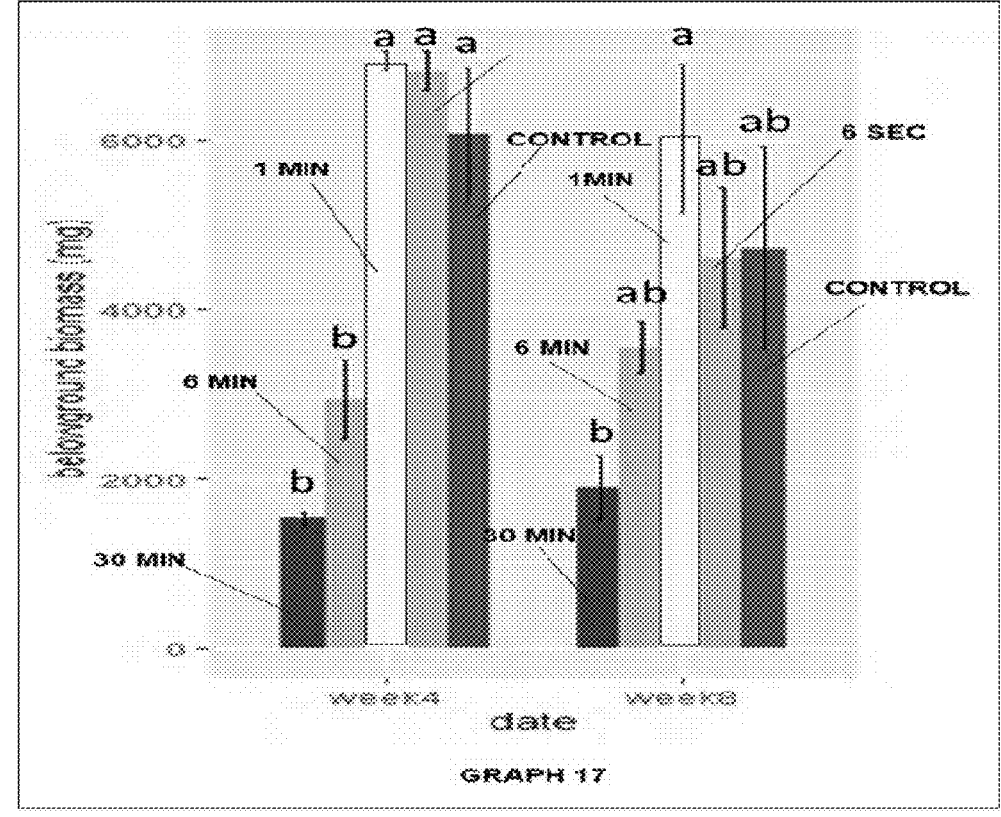
FIG. 31 provides a seventeenth Graph 17 that tracks belowground biomass of the subject grass.

Belowground biomass: Relatively few differences were seen among treatments for belowground biomass. Both the 30 min and 6 min treatments had lower belowground biomass at week 4, likely due to the amount of damage from elevated UVC exposure, limiting assimilates available for root growth. Differences were not seen among 1 min, 6 s, and control treatments, indicating that lower doses did not negatively effect root growth, despite the stunted growth demonstrated by reduced clipping yield. See Graph 17 of FIG. 31 with these results.

Figure 32:
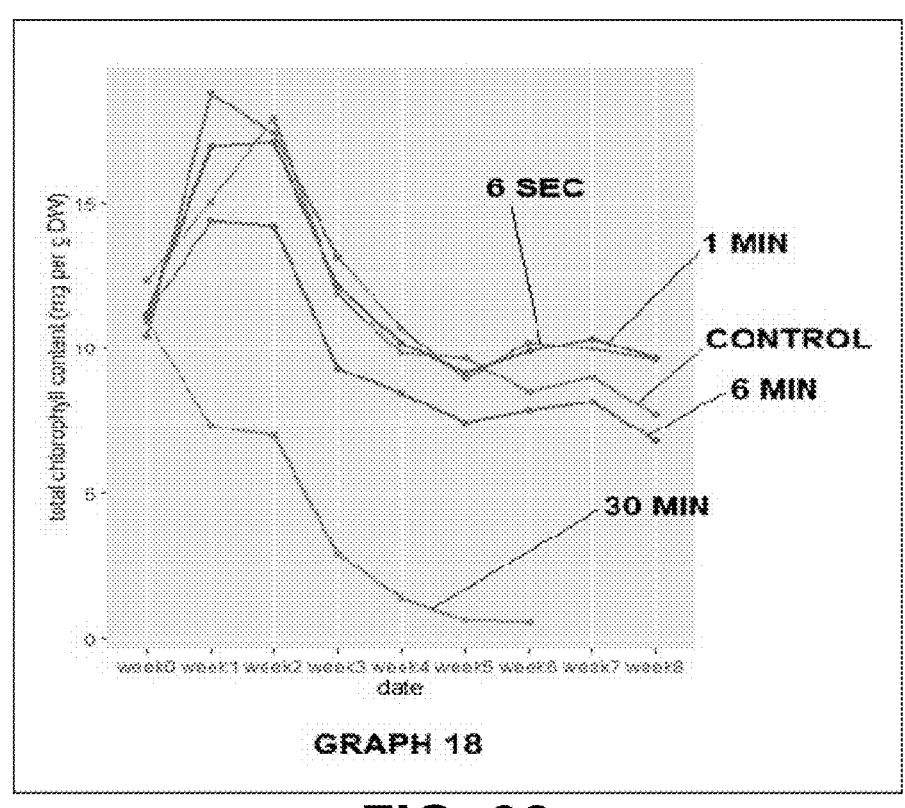
FIG. 32 provides an eighteenth Graph 18 that tracks a total chlorophyll content (mg per g DW) over a course of at least eight weeks (week 0 to week 8)

Total chlorophyll content: Total chlorophyll contents were similar among all treatments at week 0 but separated after application of UV-C treatments. After 1 week of treatment UV-C related damage was greater enough to significantly lower chlorophyll content in the highest treatment. Despite previously detecting increased chlorophyll content under field conditions, relatively fewer differences were detected during the current trial. The lower UV-C treatments of 6 s and 1 min had significantly increased chlorophyll content during weeks 1, 6 and 7. See Graph 18 of FIG. 32 with these results.

Figure 33:
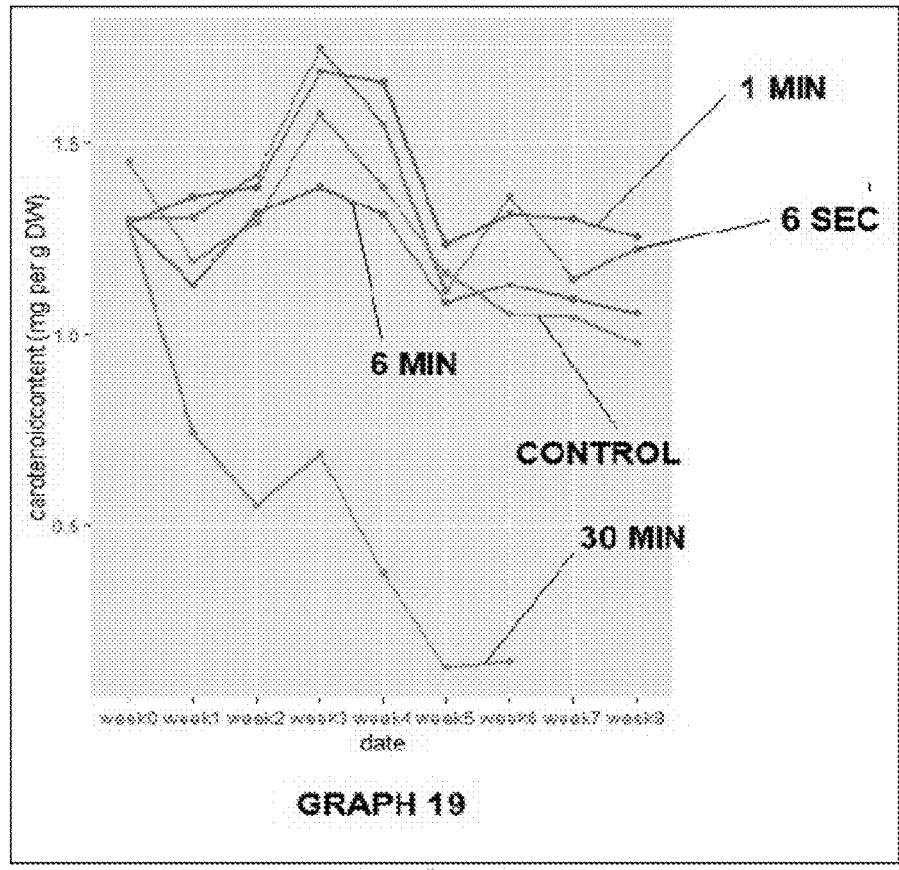
FIG. 33 provides a nineteenth Graph 19 that tracks carotenoid content (mg per g DW) over a course of at least eight weeks (week 0 to week 8)

Carotenoid content: Again main effects and the interaction effect were significant. As with other measurements, the highest level of UV-C significantly decreased carotenoid content. Lower UV-C treatments showed significantly greater carotenoid contents on certain dates. The 1 minute treatment had significantly greater carotenoid content during week 4, 6 and 7 compared to the control treatment. See Graph 19 of FIG. 33 with these results.

Figure 34:
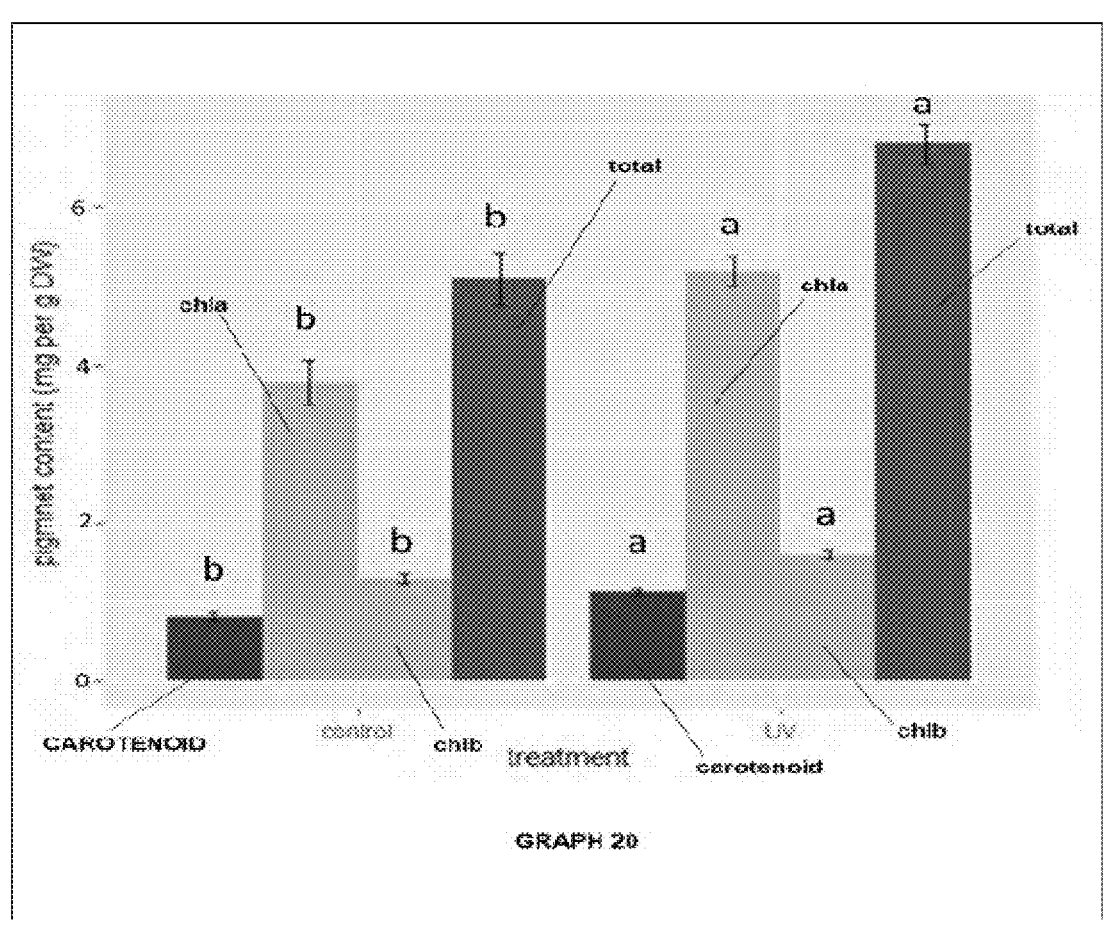
FIG. 34 provides a twentieth Graph 20 that tracks pigment content (mg per g DW) of the subject grass.

Note—Pigment Content in Field Conditions:

Under field condition (as previously described separately by Dr. Raymer), increases in chlorophyll and carotenoid content were seen when plots were treated with UVC. See Graph 20 of FIG. 34 with these results.

Figure 35:
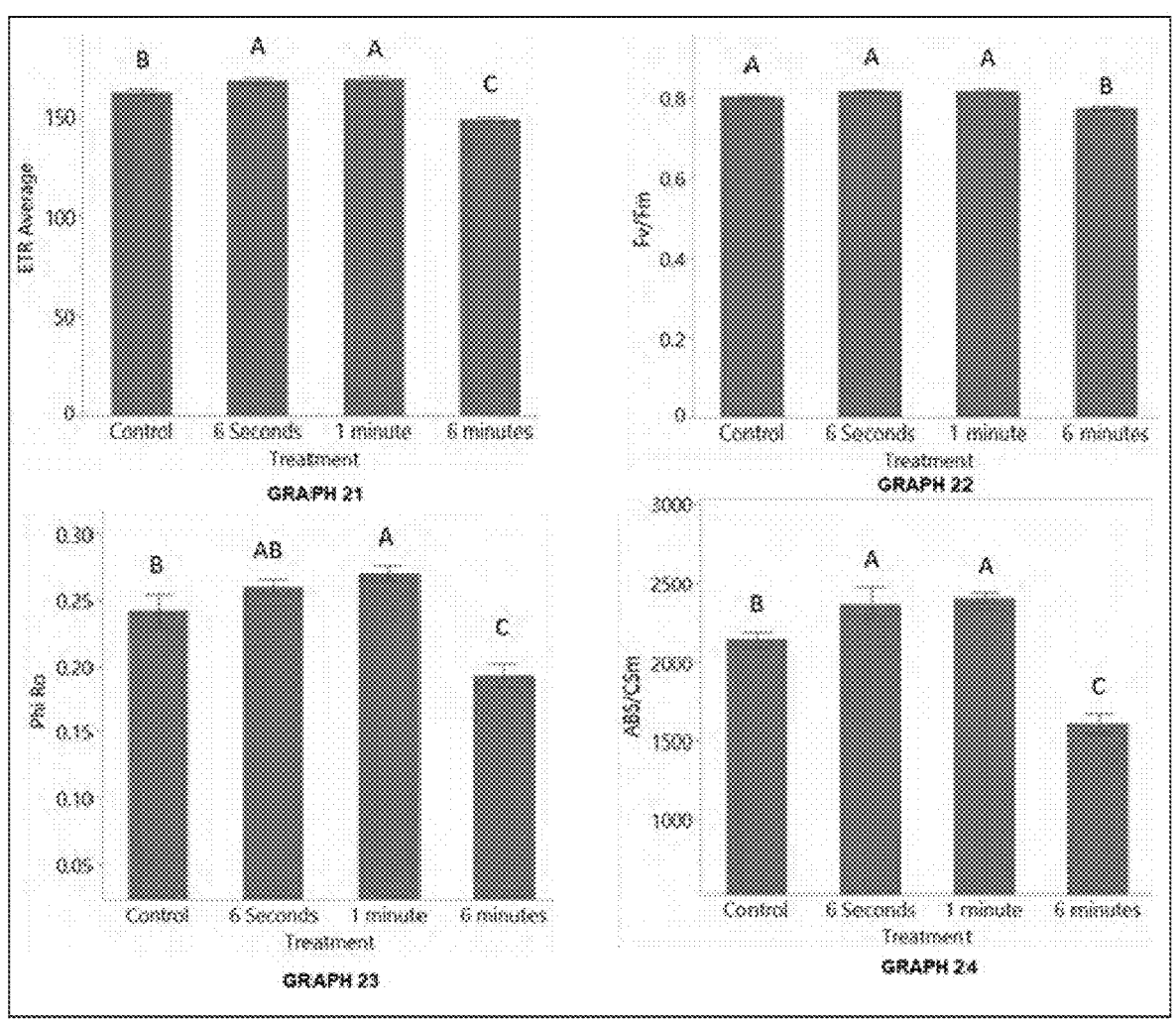
FIG. 35 provides four graphs of Graph 21 through Graph 24, where Graph 21 tracks an electron transport rate (ETR) average over several time intervals, Graph 22 tracks maximum potential photochemical efficiency (Fv/Fm) over several time intervals, Graph 23 tracks a quantum yield of electron transport from Qa to final PSI acceptors (Phi Ro) over several time intervals, and Graph 24 tracks an absorbed photon flux per excited cross section of PSII (ABS/CSm) over several time intervals.

Chlorophyll Fluorescence: At 8 weeks of treatment, chlorophyll fluorescence (used to estimate photochemical efficiency for the light harvesting steps of photosynthesis) data was collected. Due to the levels of damage in the 30 minute treatment (i.e. dead leaf tissues) data was not able to be collected for the highest UVC level. In all measured parameters, the 6 min treatment demonstrated damage to photosynthetic apparatus and reduced performance. The light adapted fluorescence measurements, estimate photochemical efficiency during steady state conditions (i.e. while the plant is actively performing photosynthesis). Under these conditions both the 6 s and 1 min treatment had greater electron transport rates (ETR) per reaction center indicating greater photosynthetic efficiency. Fv/Fm, also known as maximum potential photochemical efficiency, again indicated damage caused by the 6 min treatment, but no other difference among treatments. This measurement is widely used to demonstrate damage to light harvesting processes, which if nothing else indicate that the lower levels of UVC treatment tested had not negative effects of photosynthetic machinery. In fact other measurements such as quantum yield of electron transport from Qa to final PSI acceptors (qRo), and absorbed photon flux per excited cross section of PSII (ABS/CSm), demonstrated increased performance under UVC treatment. See Graphs 21-24 of FIG. 35 with these results.

Conclusion for Experiment 3 of 4:

The major objectives of this third experiment were to attempt to replicate the positive UV-C effects on plant growth and generate a dose response curve. Lower UV-C doses (1 minute and 6 second) improved turfgrass performance, resulting in greater density, reduced clipping yields, improved pigment contents on select dates, and improved photochemical efficiency compared to control plants. Contrastingly, higher doses (30 min, 6 min) of UV-C were damaging to seashore *Paspalum*, with a daily 30 minute UV-C treatment being lethal to the turf resulting in severe decline in all measured parameters.

Section 3.4—Experiment 4 of 4

Report on the UV-c Light Experiments Performed in Lab—Two Sections—Roman Numeral I and Roman Numeral II Section I of Experiment 4) Effect of the UV-c Lights on the Mycelial Growth on Petri Dish (In Vitro Lab Experiments):

In order to test the efficiency of the UV-c light treatments to control the development of plant pathogens, several independent in vitro experiments were performed in the lab on PDA media, with 3 to 4 replicates for each experiment. Different settings were used in order to verify the efficiency of the UV-c light treatment in reducing the pathogen development. The different experiments as well as the main results are described below.

Test 1 of Experiment 4

The first test/sub-experiment was conducted on several isolates of dollar spot sampled from Griffin campus in 2019 on seashore *Paspalum* (SSP), bermudagrass (Berm) and zoysiagrass (Zoy) and molecularly identified as *Clarireedia monteithiana* and on bentgrass (Bent), molecularly identified as *Clarireedia jacksonii*.

Figure 36:
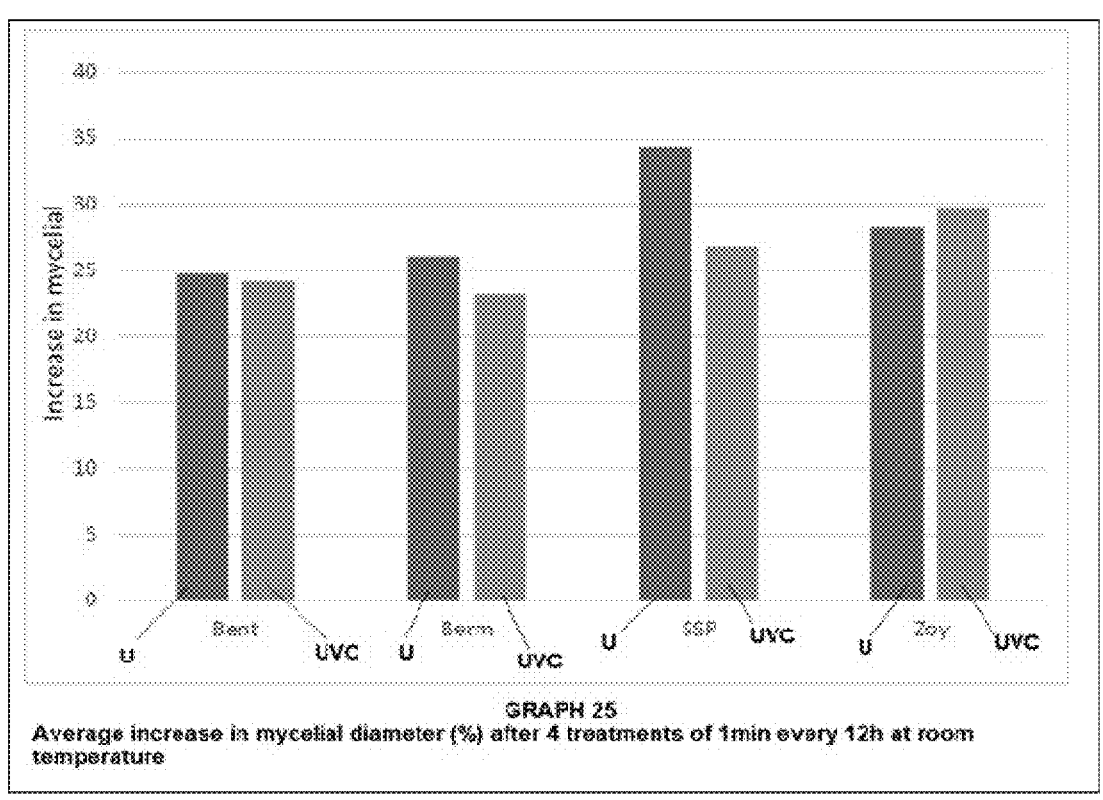
FIG. 36 provides a twenty-fifth Graph 25 that tracks a percentage of mycelial growth of the subject grasses.

The first results showed that the UV-c light was effective in controlling both pathogens responsible for dollar spot in turfgrass, *Clarireedia monteithiana* and *Clarireedia jacksonii*. With a treatment of 1 min at 35 cm from the LED lamps every 12 h for 3 days at room temperature, the UV-c light decreased the speed of the mycelial growth by 2.4% (for Bent) to 22.1% (for SSP) compared to the untreated control (see Graph 25 of FIG. 36).

All the following in vitro experiments were performed on isolate of dollar spot sampled from Griffin campus in 2019 on seashore *Paspalum* (SSP).

Test 2 of Experiment 4

Figure 37:
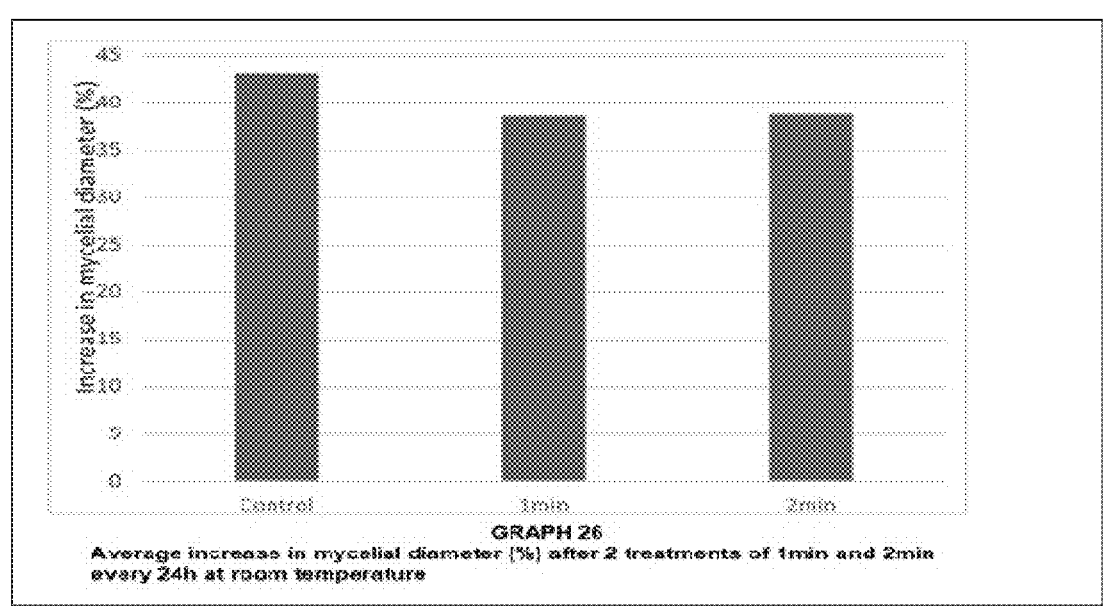
FIG. 37 provides a twenty-sixth Graph 26 that tracks percentage mycelial diameter growth of the subject grass.

The next trial was conducted with 1 min and 2 min of treatments with UV-c light at 6 cm from the LED lamps every 24 h for 3 days at room temperature. The results showed again a decrease in the speed of the mycelial growth by 10.3% (1 min of treatment) and 9.9% (2 min of treatment) compared to the untreated control (see Graph 26 of FIG. 37). No difference between 1 min or 2 min of UV-c light treatments were observed.

Test 3 of Experiment 4

Figure 38:
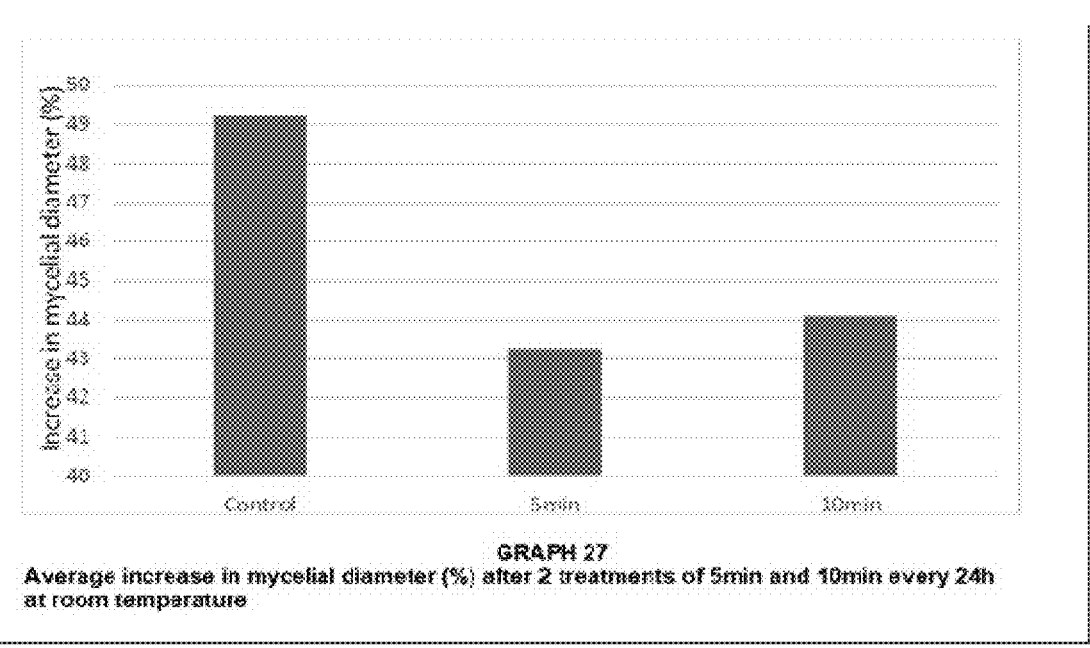
FIG. 38 provides a twenty-seventh Graph 27 that also tracks percentage mycelial diameter growth of the subject grass.

To confirm the previous results, an independent experiment was conducted with 5 min and 10 min of treatments with UV-c light at 6 cm from the LED lamps every 24 h for 3 days at room temperature. The results confirmed again a decrease in the speed of the mycelial growth by 12.2% (5 min of treatment) and 10.5% (10 min of treatment) compared to the untreated control (see Graph 27 of FIG. 38). No difference between 5 min or 10 min of UV-c light treatments were observed.

Test 4 of Experiment 4

Figure 39:
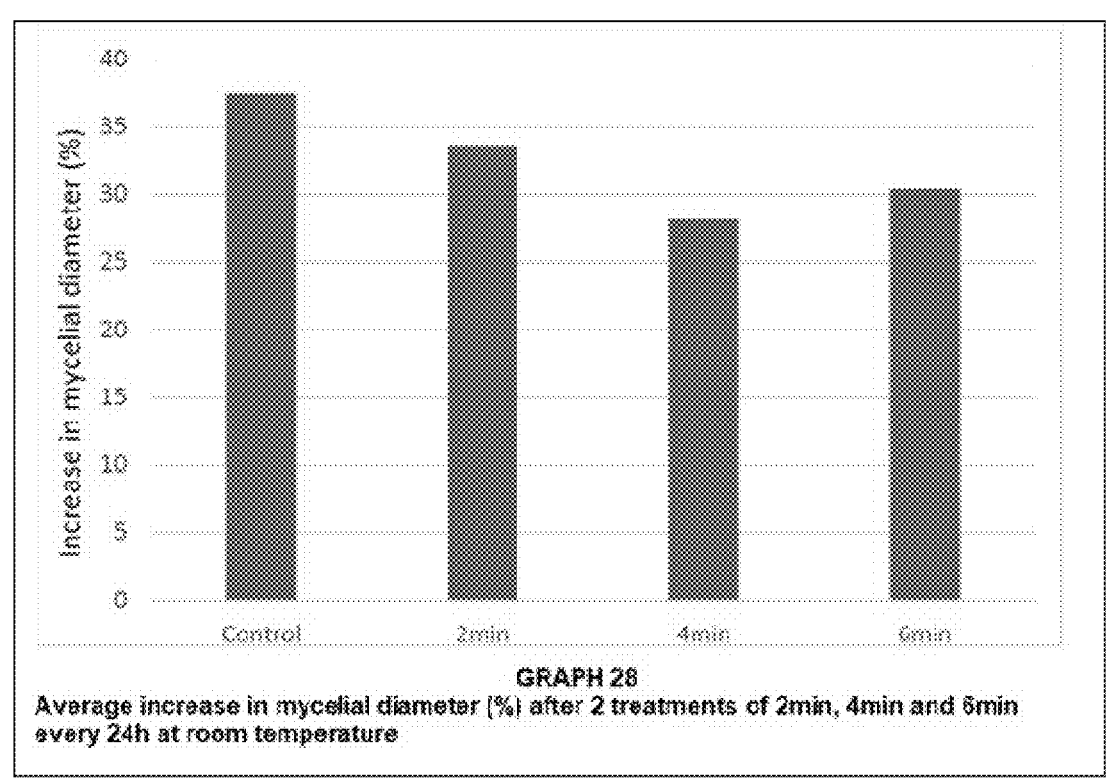
FIG. 39 provides a twenty-eighth Graph 28 that further tracks percentage mycelial diameter growth of the subject grass.

This fourth test/experiment was conducted with 2 min, 4 min and 6 min of treatments with UV-c light at 6 cm from the LED lamps every 24 h for 3 days at room temperature. The results also confirmed the decrease in the speed of the mycelial growth by 10.2% (2 min of treatment) to 24.7% (2 min of treatment) compared to the untreated control (See Graph 28 of FIG. 39). No difference between the duration of the UV-c light treatments were observed.

In order to perform in vitro tests closer to the real field conditions, the following tests were conducted with different settings.

Test 5 of Experiment 4

Figure 40:
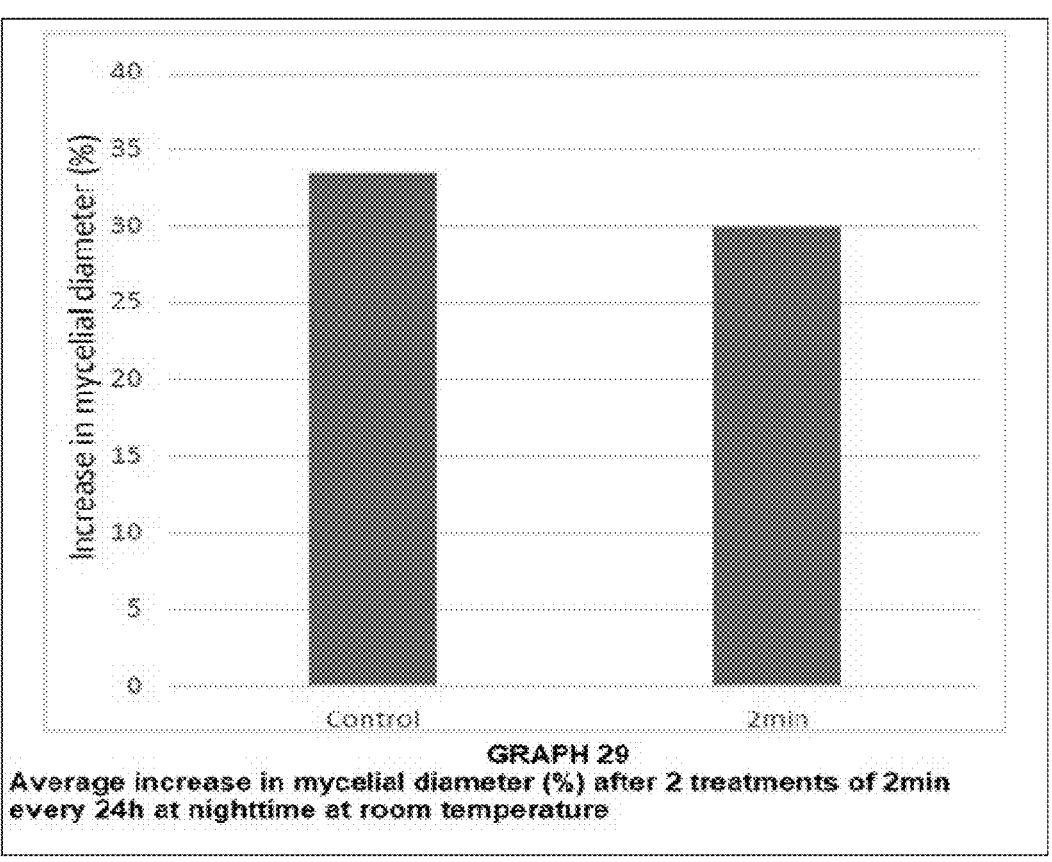
FIG. 40 provides a twenty-ninth Graph 29 that also tracks percentage mycelial diameter growth of the subject grass.

We changed the time of the day to apply the UV-c light treatment in order to simulate the field conditions. Since the robot is running in the night-time, here we performed the experiment with 2 min of UV-c light treatments at 6 cm from the LED lamps at 10 pm (1 h30 min after dark) every 24 hours for 4 days at room temperature. The results are consistent with our previous findings:

The UV-c light treatment decrease the speed of mycelial growth by 10.6% compared to the untreated control; the dark condition doesn't increase the sensitivity of the dollar spot to the UV-c treatment (See Graph 29 of FIG. 40).

Test 6 of Experiment 4

Figure 41:
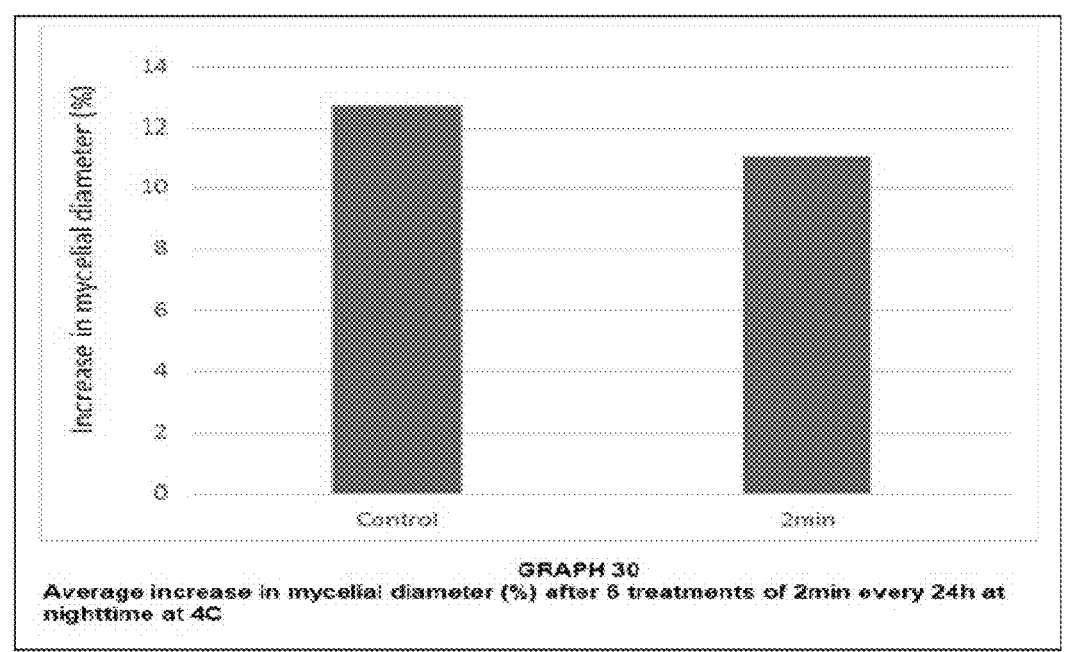
FIG. 41 provides a thirtieth Graph 30 that further tracks percentage mycelial diameter growth of the subject grass.

Since the robot is running in the night-time when the temperature drops, we also tested the effect of the UV-c light treatment at 4 C. This sixth test was conducted with 2 min of treatments with UV-c light every 24 hours at 6 cm from the LED lamps for 4 days at 4 C in the dark. The results showed that even at 4 C, the UV-c light treatments decreased the speed of the mycelial growth by 13% compared to the untreated control; low temperature condition doesn't increase the sensitivity of the dollar spot to the UV-c treatment (see Graph 30 of FIG. 41)

Test 7 of Experiment 4

Figure 42:
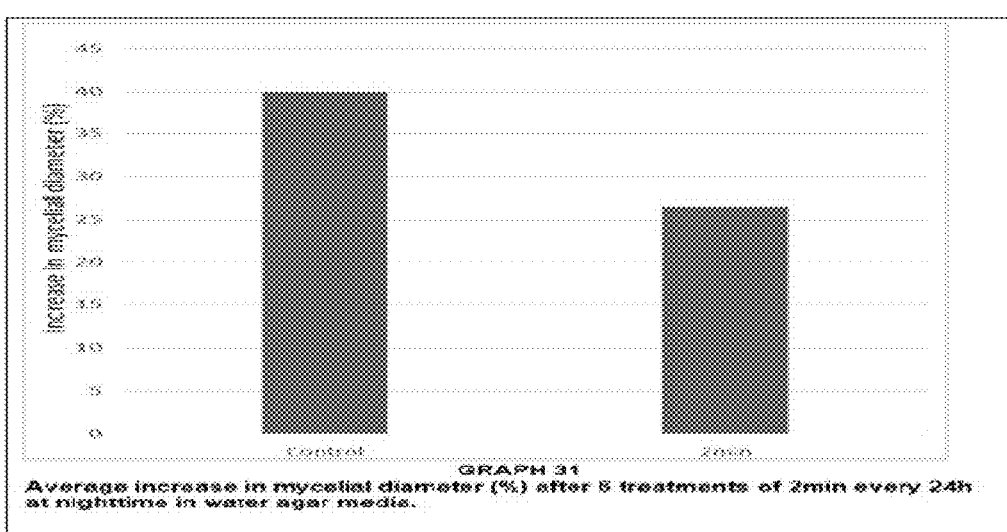
FIG. 42 provides a thirty-first Graph 31 that also tracks percentage mycelial diameter growth of the subject grass.

In order to simulate low nutrients field conditions, a minimal media was used (PDA media was replaced by water agar media. The test/experiment was performed with 2 min of treatment with UV-c light at 6 cm from the LED lamps at 10 pm (1 h30 min after dark) for 4 days. The results revealed that the UV-c light treatments decrease mycelial growth by an average of 34% compared to the control. This suggests that under minimal conditions, dollar spot is more sensitive to UV-c light (see Graph 31 of FIG. 42).

Test 8 of Experiment 4

Figure 43:
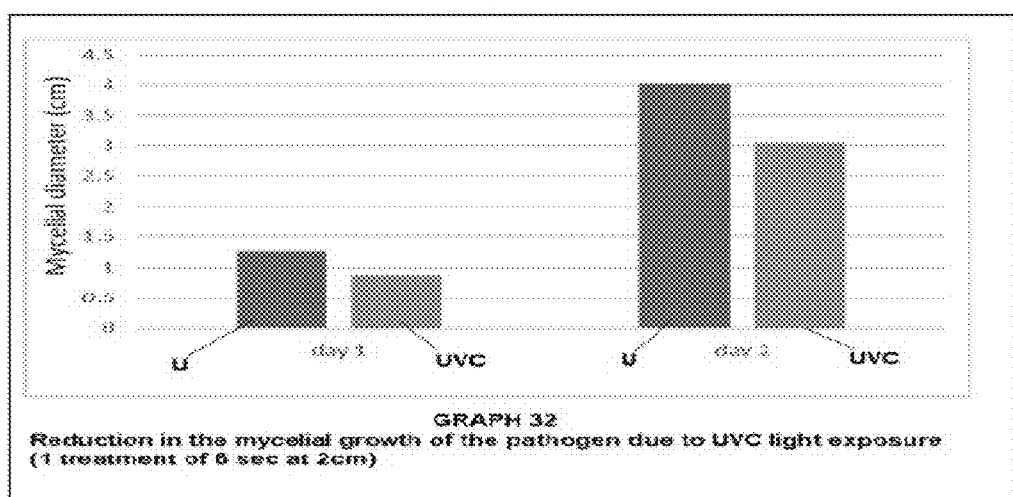
FIG. 43 provides a thirty-second Graph 32 that also tracks percentage mycelial diameter growth of the subject grass.

To be more consistent with the robot treatments in the field, the treatments in the lab were here performed at a closer distance from the LED lamps (2 cm instead of 6 cm) and during a shorter period of time (6 seconds instead of 2 min). When testing the effect of the UV-c light treatments at 2 cm from the LED lamps (approximative distance used in the field experiments), the results revealed an average reduction of 28% in mycelial growth after only 1 treatment of 6 see (approximative time of treatment per night in the field experiments) compared to the control (no treatment) (see Graph 32 of FIG. 43).

Figure 44:
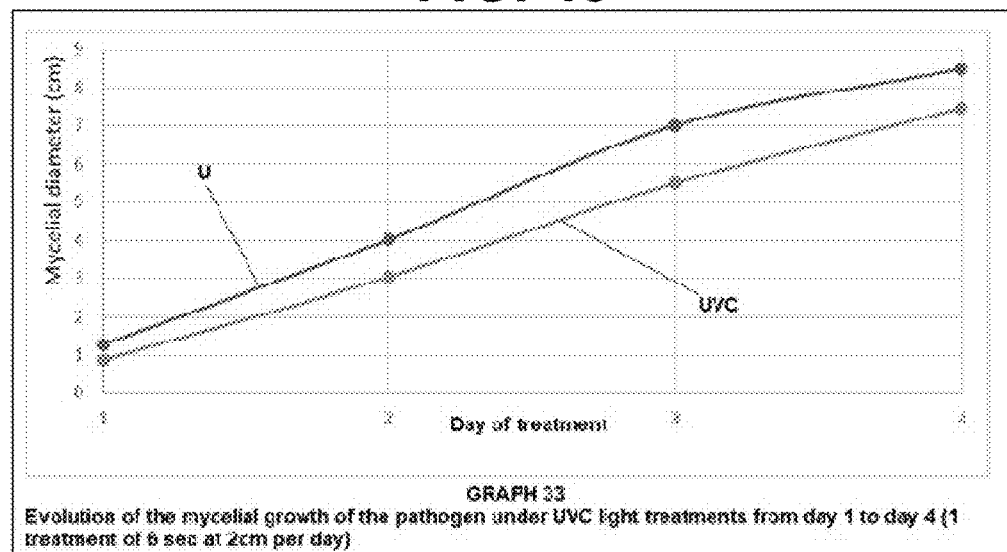
FIG. 44 provides a thirty-third Graph 33 which tracks percentage mycelial diameter growth of the subject grass from day 1 to day 4.

The reduction in the mycelial growth was consistent during the 4 days of treatments (see Graph 33 of FIG. 44). The efficiency of the UV-c treatments increased with the reduction of the distance from the LED lamps.

Other Observations:

From our observations, the UV-c treatments (at both night and day-time treatment) have also an effect on the mycelium aspect (probably also affecting the mycelial biomass) on PDA media (Photos A-C) as well as on water agar media (minimal media) (Photo D).

However, the changes caused by the UV-c light doesn't seem to be fixed. After 8 days at room temp with no treatment, the previously UV-c treated isolates form a cottony mycelium again (Photos E-F).

Figure 45:
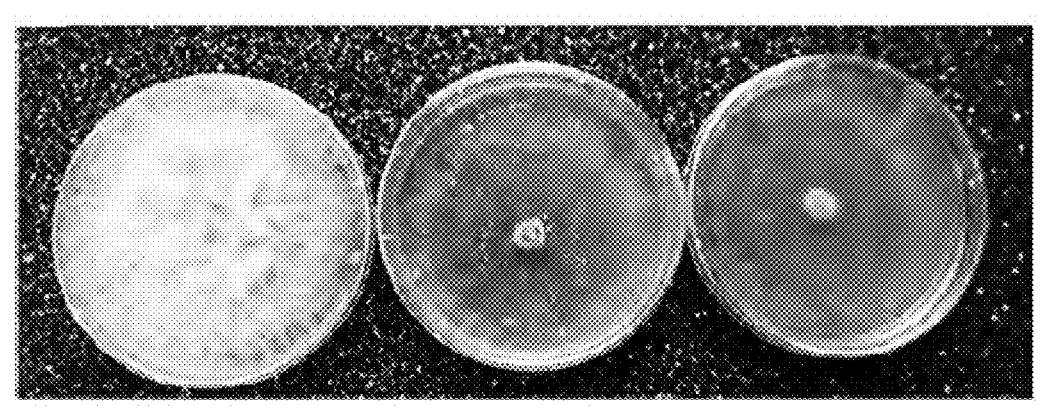
FIG. 45 is a first photograph A showing mycelial aspects of dollar spot in a petri dish after 3 days of treatments of 5 min and 10 min every 24 h at room temperature.
Figure 46:
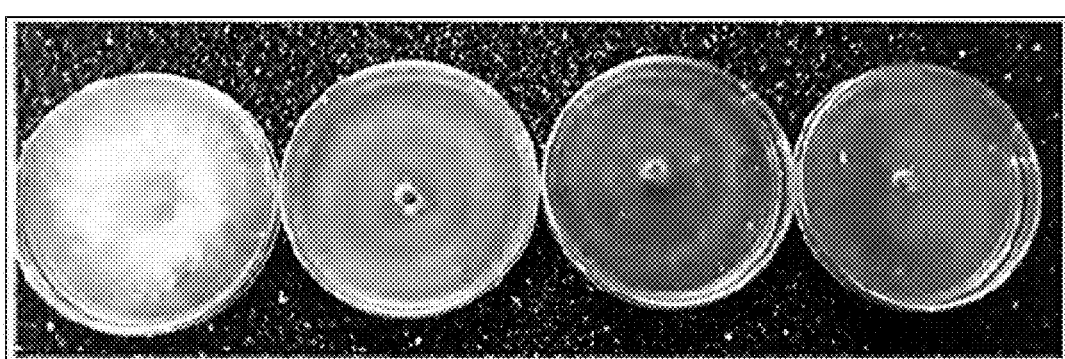
FIG. 46 is a second photograph B showing mycelial aspects of dollar spot in a petri dish after 3 days of treatments of 2 min, 4 min, and 6 min every 24 h at room temperature.
Figure 47:
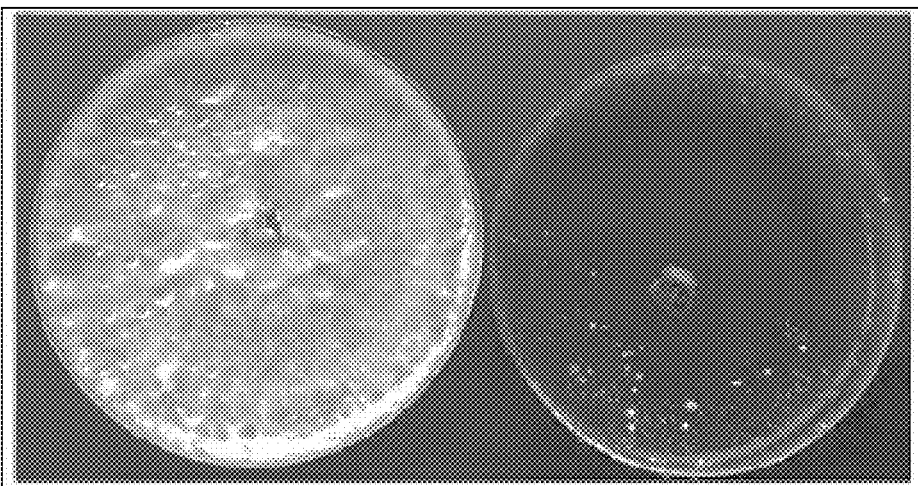
FIG. 47 is a third photograph C showing mycelial aspects of dollar spot in a petri dish after 8 days of treatments of 2 min every 24 h in the night-time at room temperature.
Figure 48:
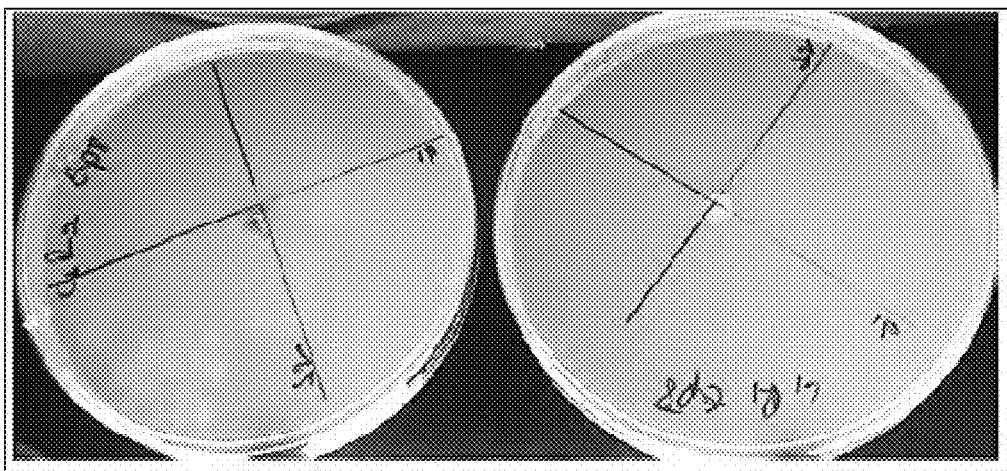
FIG. 48 is a fourth photograph D also showing mycelial aspects of dollar spot in a petri dish after 8 days of treatments of 2 min every 24 h in the night-time at room temperature.
Figure 49:
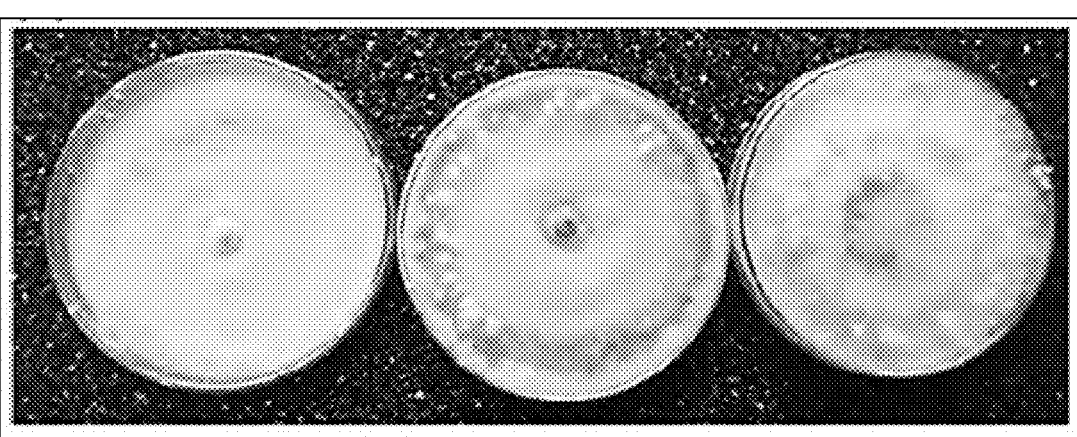
FIG. 49 is a fifth photograph E showing mycelial aspects of dollar spot in a petri dish from Test 2 after 8 days at room temperature with no treatment.
Figure 50:
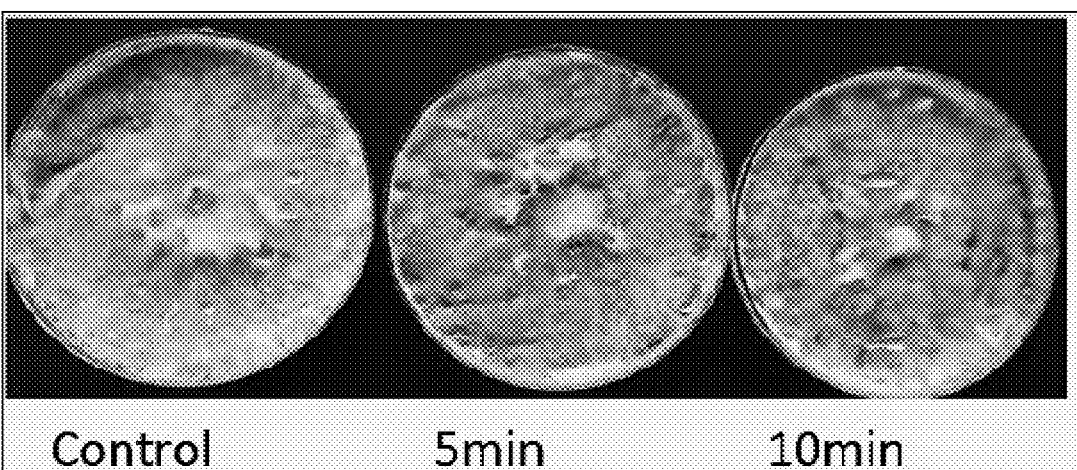
FIG. 50 is a sixth photograph F showing mycelial aspects of dollar spot in a petri dish from Test 3 after 14 days at room temperature with no treatment.

Photos A-F show Mycelial aspects of Dollar spot in a Petri dish. Aspect after 3 days of treatments of 5 min and 10 min every 24 h at room temperature (see Photo A of FIG. 45; Test 3); Aspect after 3 days of treatments of 2 min, 4 min, and 6 min every 24 h at room temperature (see Photo B of FIG. 46; Test 4);

Aspect after 8 days of treatments of 2 min every 24 h in the night-time at room temperature (see Photos C-D of FIGS. 47-48; Test 5)[ ]; Aspect of isolates from Test 2 after 8 days at room temperature with no treatment (see Photo E of FIG. 49; After Test 2); Aspect of isolates from Test 3 after 14 days at room temperature with no treatment (see Photo F of FIG. 50; After Test 3).

An additional test (Test 9) was performed in order to determine if the UV-c treated isolates continue to stay less fit than the untreated control even after the end of the treatments. The ninth test started with isolates that was previously treated with UV-c light for 2 min and 10 min every 24 hours at 6 cm from the LED lamps during 3 days and after left for 2 weeks at room temperature with no treatment.

Figure 51:
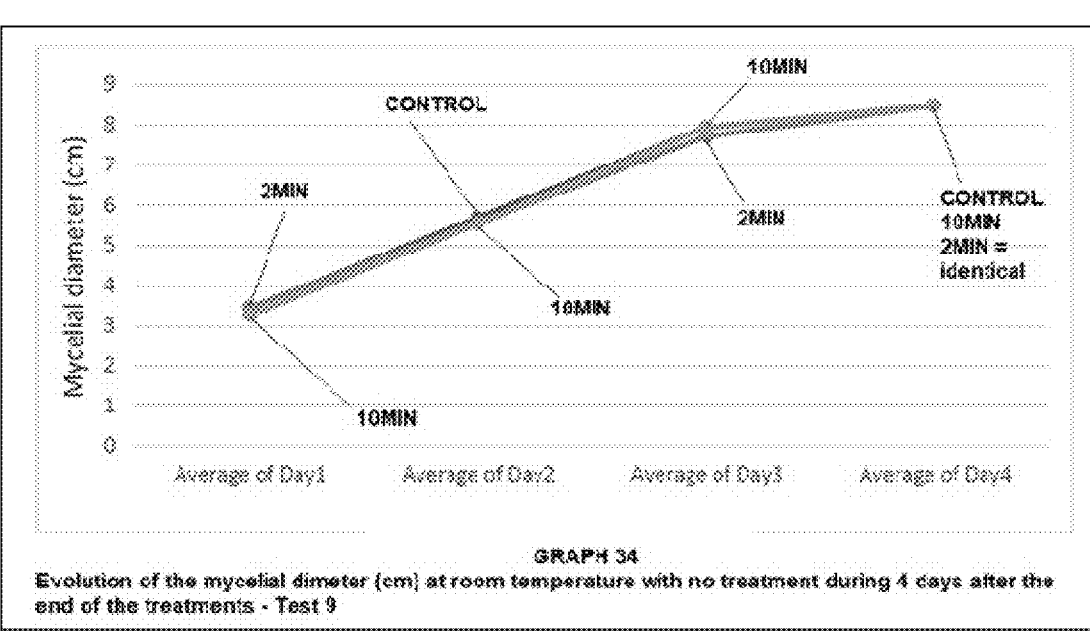
FIG. 51 is a thirty-fourth Graph 34 that tracks mycelial diameter (cm) over four days at room temperature.

The results revealed no difference in the mycelial growth between the isolates. This suggest that the reduction effects of the UV-c light on the mycelial growth is not permanent; when the UV-c treatments stop, the mycelium growth get back to its normal rate (see Graph 34 of FIG. 51).

Section II of Experiment 4) Adjustments of the Intensity of the UV-c Lights

To set up correctly the intensity of the lights several experiments were conducted in order to evaluate:

The variation on the intensity with the time of the treatment (at 15 cm from the LED lamps);

The variation on the intensity with the distance from the LED lamps (for 15 seconds of time treatment);

The variation of the intensity with the time of the treatment at 6 cm from the LED lamps (distance used for the Lab experiments done on petri dishes); and The variation of the intensity with the time of the treatment at 2 cm distance from the LED lamps (approximative distance used in the field experiments)

Figure 52:
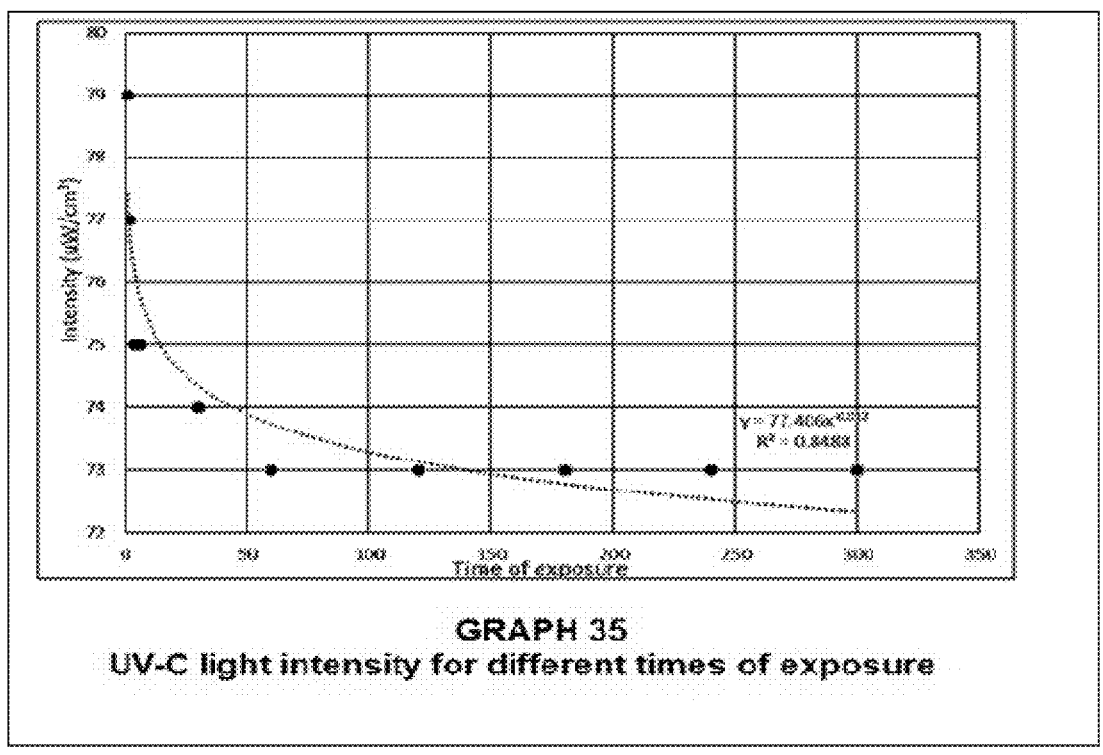
FIG. 52 is a thirty-fifth Graph 35 that tracks UV-C light intensity for different times of exposure for the subject grass.

The results revealed that:

The intensity drops very quickly with the time of the treatment, especially at the beginning (for 1-6 seconds; the time of the treatment in the field correspond to 6 sec total approximately (1 sec×6 times)) (see Graph 35 of FIG. 52);

The intensity drops very quickly with the distance from the lamps, especially at the beginning (for 1-5 cm; the distance of the treatment in the field correspond to 2 cm approximately) (see Graph 36 of FIG. 53);

The variance of in the intensity is bigger between the distances than between the times, so it is more crucial to set up correctly the distance from the lamps than the time of the treatment (Graph 36); and There is not much variation of the intensity with the time of the treatment at 6 cm (150 uW/cm2) compared to 2 cm (151 uW/cm2).

The present solution has been described using detailed descriptions of embodiments thereof that are provided by way of example and are not intended to limit the scope of the solution. The described embodiments comprise different features, not all of which are required in all embodiments of the solution. Some embodiments of the present solution utilize only some of the features or possible combinations of the features. Variations of embodiments of the present solution that are described and embodiments of the present solution comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for controlling disease incidence in a target grass area, the method comprising:

providing an autobot capable of automatically applying a UVC light treatment to the target grass area, the target grass area comprising C4 turfgrass;

coupling a UVC light subsystem to the autobot such that the UVC light subsystem is suspended above the C4 turfgrass within the target grass area between about 0.5 of an inch to about 18.0 inches;

coupling a global positioning system (GPS) module and a controller to the autobot, wherein:

the GPS module and the controller define and create a geo-fence for the target grass area; and the controller keeps the autobot within the geo-fence while the autobot applies the UVC light to the target grass area;

generating UVC light by the UVC light subsystem with a wavelength between about 100.0 nm and 300.0 nm;

emitting the UVC light from the UVC light subsystem to the C4 turfgrass; and moving the UVC light across the C4 turfgrass within the target grass area defined by the geo-fence using the autobot, wherein the automatic UVC light emission substantially controls disease incidence in the target grass area;

wherein the C4 turfgrass comprises plants using C4 photosynthesis in which a four-carbon compound is produced without photorespiration and wherein an enzyme comprising Phosphoenolpyruvate (PEP) is used during carbon fixation.

2. The method of claim 1, wherein the UVC light subsystem is suspended above the C4 turfgrass within the target grass area between about 0.75 of an inch to about 6.0 inches.

3. The method of claim 1, wherein the UVC light subsystem has a wavelength between 245.0 nm to about 275.0 nm.

4. The method of claim 1, wherein the UVC light is emitted at an intensity between about 0.5 and 300.0 Watts per square meter.

5. The method of claim 1, wherein the autobot has a speed between 0.1 MPH and about 7.0 MPH.

6. The method of claim 1, wherein the autobot has a speed between 0.3 MPH and about 3.0 MPH.

7. The method of claim 1, further comprising coupling a cutting system adjacent to the UVC light subsystem for cutting the C4 turfgrass.

8. A method for controlling disease incidence in a target grass area, the method comprising:

providing an autobot capable of automatically applying a UVC light treatment to the target grass area, the target grass area comprising C4 turfgrass;

coupling a UVC light subsystem to the autobot such that the UVC light subsystem is suspended above the C4 turfgrass within the target grass area between about 0.5 of an inch to about 18.0 inches;

generating UVC light by the UVC light subsystem with a wavelength between about 100.0 nm and 300.0 nm;

emitting the UVC light from the UVC light subsystem to the C4 turfgrass; and moving the UVC light across the C4 turfgrass within the target grass area using the autobot, wherein the automatic UVC light applications substantially controls disease incidence in the target grass area;

wherein the C4 turfgrass comprises at least one of: *paspalum vaginatum*, any turfgrass in the Poaceae family; *Paspalum* spp., *Paspalum notatum* (Bahia Grass); *Stenotaphrum* spp., *Stenotaphrum secundatum* (St. Augustine Grass); *Bouteloua* spp., *Bouteloua dactyloides* (Buffalo Grass); *Eremochloa* spp., *Eremochloa*

*ophiuroides* (Centipede Grass); *Axonopus* spp., *Axonopus affinis* (Carpet Grass); *Cynodon* spp., *Cynodon transvaalensis, Cynodon dactylon* (Bermuda Grass), and *Cynodon dactylon* x *Cynodon transvaalensis; Zoysia* spp., *Zoysia matrella, Zoysia japonica, Zoysia matrella* x *Zoysia japonica*, and *Zoysia tenuifolia*.

9. The method of claim 8, wherein the UVC light subsystem is suspended above the C4 turfgrass within the target grass area between about 0.75 of an inch to about 6.0 inches.

10. The method of claim 8, wherein the UVC light subsystem has a wavelength between 245.0 nm to about 275.0 nm.

11. The method of claim 8, wherein the UVC light is emitted at an intensity between about 0.5 and 300.0 Watts per square meter.

12. The method of claim 8, wherein the autobot has a speed between 0.1 MPH and about 7.0 MPH.

13. The method of claim 8, wherein the autobot has a speed between 0.3 MPH and about 3.0 MPH.

14. The method of claim 8, further comprising: coupling a global positioning system (GPS) module and a controller to the autobot.

15. The method of claim 14, wherein the GPS module and the controller create a geo-fence for the target grass area.

16. The method of claim 15, wherein the controller keeps the autobot within the geo-fence while the autobot applies the UVC light to the target grass area.

17. The method of claim 8, further comprising coupling a cutting system adjacent to the UVC light subsystem for cutting the C4 turfgrass.

* * * * *